United States Patent
Matsen et al.

(10) Patent No.: US 10,425,997 B2
(45) Date of Patent: Sep. 24, 2019

(54) CURING COMPOSITES OUT-OF-AUTOCLAVE USING INDUCTION HEATING WITH SMART SUSCEPTORS

(71) Applicant: The Boeing Company, Chicago, IL (US)

(72) Inventors: Marc Rollo Matsen, Seattle, WA (US); Robert James Miller, Fall City, WA (US); Mark Alan Negley, Bellevue, WA (US); Jennifer Sue Noel, Kent, WA (US)

(73) Assignee: The Boeing Company, Chicago, IL (US)

( * ) Notice: Subject to any disclaimer, the term of this patent is extended or adjusted under 35 U.S.C. 154(b) by 714 days.

(21) Appl. No.: 15/012,843

(22) Filed: Feb. 1, 2016

(65) Prior Publication Data

US 2016/0157302 A1    Jun. 2, 2016

Related U.S. Application Data

(60) Division of application No. 13/248,728, filed on Sep. 29, 2011, now Pat. No. 9,259,886, which is a
(Continued)

(51) Int. Cl.
*H05B 6/06* (2006.01)
*H05B 6/10* (2006.01)
(Continued)

(52) U.S. Cl.
CPC ............ *H05B 6/105* (2013.01); *B29C 35/00* (2013.01); *B29C 73/10* (2013.01); *B29C 73/30* (2013.01);
(Continued)

(58) Field of Classification Search
CPC ......... B29C 35/00; B29C 73/10; B29C 73/30; B29C 73/34; B29C 2035/0811;
(Continued)

(56) References Cited

U.S. PATENT DOCUMENTS 3,599,078 A    8/1971 Pelly et al.
3,875,496 A    4/1975 Carsten
(Continued)

FOREIGN PATENT DOCUMENTS

CN    1227701 A    9/1999
JP    2005158658 A    6/2005
(Continued)

OTHER PUBLICATIONS

Japanese Notice of Rejection, dated Sep. 27, 2016, regarding Patent Application No. 2012-212389, 6 pages.
(Continued)

*Primary Examiner* — Dana Ross
*Assistant Examiner* — Brandon T Harvey
(74) *Attorney, Agent, or Firm* — Yee & Associates, P.C.

(57) ABSTRACT

A composite part is cured out-of-autoclave using an inductively heated, stand-alone tooling. The part in placed on a tool and is covered by a heating blanket. One side of the part is heated by inductive coil circuits in the tool, and the other side of the part is heated by inductive coil circuits in the blanket.

20 Claims, 36 Drawing Sheets

Related U.S. Application Data continuation-in-part of application No. 13/097,846, filed on Apr. 29, 2011, now Pat. No. 9,174,398, and a continuation-in-part of application No. 12/638,960, filed on Dec. 15, 2009, now Pat. No. 8,330,086.

(51) Int. Cl.

| | | |
|---|---|---|
| *B29C 73/10* | (2006.01) | |
| *B29C 73/30* | (2006.01) | |
| *B29C 73/34* | (2006.01) | |
| *B29C 35/00* | (2006.01) | |
| *H05B 6/36* | (2006.01) | |
| B29C 35/08 | (2006.01) | |
| B29K 63/00 | (2006.01) | |
| B29K 105/12 | (2006.01) | |
| B29K 105/00 | (2006.01) | |
| B29K 307/04 | (2006.01) | |

(52) U.S. Cl.
CPC .............. *B29C 73/34* (2013.01); *H05B 6/06* (2013.01); *H05B 6/106* (2013.01); *H05B 6/36* (2013.01); *B29C 2035/0811* (2013.01); *B29C 2035/0816* (2013.01); *B29K 2063/00* (2013.01); *B29K 2105/12* (2013.01); *B29K 2105/253* (2013.01); *B29K 2307/04* (2013.01); *H05B 2206/023* (2013.01)

(58) Field of Classification Search
CPC ........ B29C 2035/0816; B29K 2105/12; B29K 2105/253; B29K 2307/04; H05B 6/105; H05B 6/106; H05B 6/36; H05B 6/40
See application file for complete search history.

(56) References Cited

U.S. PATENT DOCUMENTS

| | | | |
|---|---|---|---|
| 4,889,598 A | 12/1989 | Niskanen | |
| 5,442,156 A | 8/1995 | Westerman et al. | |
| 5,591,369 A | 1/1997 | Matsen et al. | |
| 5,645,309 A | 7/1997 | Graf | |
| 5,645,744 A | 7/1997 | Matsen et al. | |
| 5,728,309 A | 3/1998 | Matsen et al. | |
| 5,808,281 A | 9/1998 | Matsen et al. | |
| 5,833,795 A | 11/1998 | Smith et al. | |
| 5,916,469 A | 6/1999 | Scoles et al. | |
| 6,084,206 A | 6/2000 | Williamson et al. | |
| 6,114,050 A | 9/2000 | Westre et al. | |
| 6,528,771 B1 | 3/2003 | Matsen et al. | |
| 6,566,635 B1 | 5/2003 | Matsen et al. | |
| 6,653,608 B1 | 11/2003 | Matsen et al. | |
| 6,884,975 B2 | 4/2005 | Matsen et al. | |
| 6,884,976 B2 | 4/2005 | Matsen et al. | |
| 6,897,419 B1 | 5/2005 | Brown et al. | |
| 6,914,225 B2 | 7/2005 | Fischer et al. | |
| 7,034,264 B2 | 4/2006 | Kagan | |
| 7,102,112 B2 | 9/2006 | Anderson et al. | |
| 7,358,467 B2 | 4/2008 | Yang et al. | |
| 7,365,289 B2 | 4/2008 | Wilkes et al. | |
| 7,857,925 B2 | 12/2010 | Keller et al. | |
| 8,017,059 B2 | 9/2011 | Matsen et al. | |
| 8,330,086 B2 | 12/2012 | Miller et al. | |
| 2002/0020144 A1 | 2/2002 | Sarles et al. | |
| 2004/0000782 A1 | 1/2004 | Riefe | |
| 2004/0089655 A1 | 5/2004 | Matsen et al. | |
| 2004/0099660 A1 | 5/2004 | Matsen et al. | |
| 2005/0006380 A1 | 1/2005 | Kagan | |
| 2005/0035115 A1* | 2/2005 | Anderson | ............... B29C 33/04 219/759 |
| 2006/0027308 A1 | 2/2006 | MacKenzie | |
| 2008/0063025 A1 | 3/2008 | Fishman et al. | |
| 2008/0128078 A1* | 6/2008 | May | ........................ B29C 73/10 156/272.4 |
| 2008/0308210 A1 | 12/2008 | Keller et al. | |
| 2009/0071217 A1 | 3/2009 | Matsen et al. | |
| 2010/0018271 A1 | 1/2010 | Matsen et al. | |
| 2010/0108665 A1 | 5/2010 | Hirota | |
| 2011/0139769 A1 | 6/2011 | Miller et al. | |
| 2012/0145702 A1 | 6/2012 | Miller et al. | |
| 2012/0145703 A1 | 6/2012 | Matsen et al. | |
| 2013/0082047 A1 | 4/2013 | Matsen et al. | |

FOREIGN PATENT DOCUMENTS

| | | |
|---|---|---|
| JP | 2011110719 A | 11/2009 |
| WO | WO2008021420 A1 | 2/2008 |
| WO | WO2010011847 A | 1/2010 |
| WO | WO2011075250 A1 | 6/2011 |
| WO | WO2012148592 A1 | 11/2012 |

OTHER PUBLICATIONS

Extended EP Search Report dated Oct. 22, 2013, regarding Application No. EP12186038.1, 6 pages.
International Preliminary Report on Patentability, dated Oct. 29, 2013, regarding Application No. PCT/US2012/029705, 9 pages.
PCT Search Report dated Feb. 15, 2011 regarding application PCT/US2010/056536, filing date Nov. 12, 2010, reference 09-0667PCT, applicant The Boeing Company, 10 pages.
PCT Search Report dated May 23, 2012 regarding application PCT/US2012/029705, filing date Mar. 19, 2012, reference 09-0667PCT2, applicant The Boeing Company, 13 pages.
English Translation of State Intellectual Property Office of PRC Notification of First Office Action, dated Jun. 3, 2015, regarding Application No. H0521019078305, 14 pages.
"BriskHeat SR Silicone Rubber Composite Curing Heating Blankets," Brisk Heat, Inc., copyright 2009-2013, 2 pages. Accessed Apr. 12, 2013, http://www.briskheat.com/p-355-sr-silicone-rubber-composite-curing-heating-blankets.aspx.
"Heat Blankets," Applied Heat, Inc., copyright 2009-2013, 1 page. Accessed Apr. 12, 2013, http://www.appliedheat.com/blankets.htm.
Office Action regarding U.S. Appl. No. 13/248,134, dated May 15, 2014, 30 pages.
Final Office Action regarding U.S. Appl. No. 13/248,134, dated Oct. 10, 2014, 9 pages.
Office Action regarding U.S. Appl. No. 13/248,134, dated Oct. 20, 2014, 17 pages.
Office action regarding U.S. Appl. No. 13/248,728, dated Dec. 4, 2014, 42 pages.
Final Office action regarding U.S. Appl. No. 13/248,728, dated Apr. 16, 2015, 24 pages.
Notice of Allowance regarding U.S. Appl. No. 13/248,728, dated Oct. 8, 2015, 11 pages.
Office Action, dated May 14, 2012, regarding U.S. Appl. No. 12/638,960, 11 pages.
Notice of Allowance, dated Aug. 21, 2012, regarding U.S. Appl. No. 12/638,960, 11 pages.
Matsen et al., "Induction Heating Using Induction Coils in Series-Parallel Circuits," U.S. Appl. No. 13/248,134, filed Sep. 29, 2011, 10 pages.
Matsen et al., "Curing Composites Out-of-Autoclave Using Induction Heating with Smart Susceptors," U.S. Appl. No. 13/248,728, filed Jun. 14, 2012, 58 pages.
Final Office Action, dated Jun. 15, 2016, regarding U.S. Appl. No. 13/248,134, 23 pages.
State Intellectual Property Office of China Second Notification of Office Action and English translation, regarding Application No. 201210375812.5, dated Jan. 20, 2016, 8 pages.
Notice of Allowance, dated Jul. 10, 2017, regarding U.S. Appl. No. 13/248,134, 7 pages.
Office Action, dated Mar. 20, 2017, regarding U.S. Appl. No. 13/248,134, 15 pages.

* cited by examiner

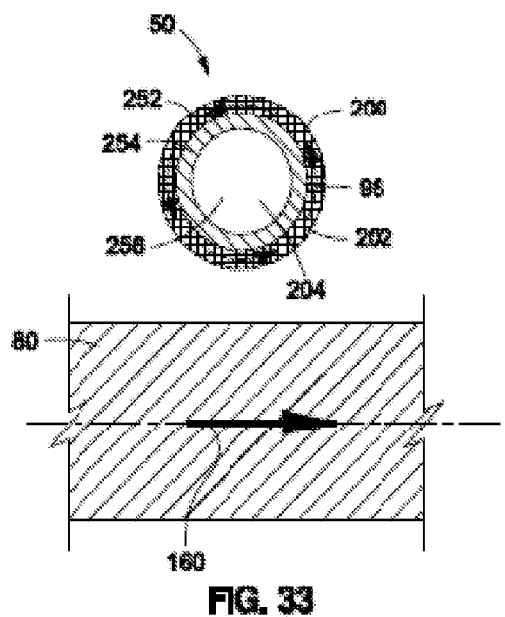
FIG. 33
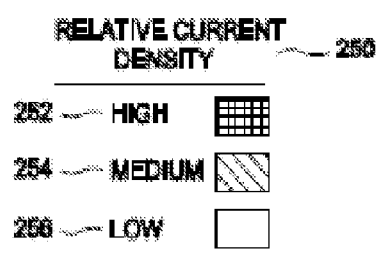
FIG. 34
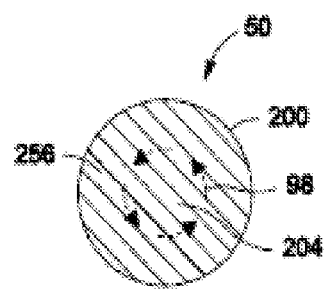
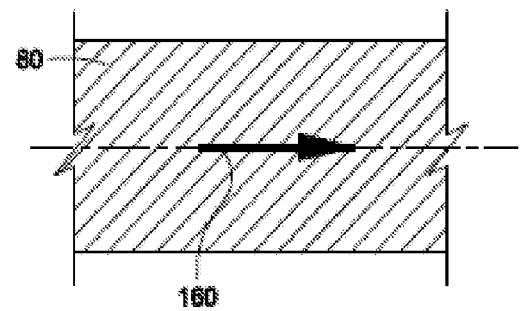
FIG. 35

CURING COMPOSITES OUT-OF-AUTOCLAVE USING INDUCTION HEATING WITH SMART SUSCEPTORS

CROSS-REFERENCE TO RELATED APPLICATIONS

This application is a divisional application of U.S. patent application Ser. No. 13/248,728, filed Sep. 29, 2011 and issued as U.S. Pat. No. 9,259,886 on Feb. 16, 2016; which is a continuation-in-part of and claims priority to U.S. application Ser. Nos. 12/638,960 filed Dec. 15, 2009 and entitled MAGNETIC HEATING BLANKET and issued as US Patent and issued as U.S. Pat. No. 8,330,086 on Dec. 11, 2012, and 13/097,846 filed Apr. 29, 2011, issued as U.S. Pat. No. 9,174,398 on Nov. 03, 2015, and entitled SMART HEATING BLANKET, the entire content of all of which applications is expressly incorporated herein by reference. This application is also related to U.S. patent application Ser. No. 13/248,134, issued as U.S. Pat. No. 9,820,339 on Nov. 14, 2017, and entitled INDUCTION HEATING USING INDUCTION COILS IN SERIES-PARALLEL CIRCUITS.

BACKGROUND INFORMATION

1. Field

The present disclosure relates generally to methods and equipment for out-of-autoclave curing of composite parts, and deals more particularly with a method and stand-alone tooling for curing relatively large parts using induction heating and smart susceptors.

2. Background

A composite part may be cured in an oven or an autoclave where heat is applied to the part while supported on a cure tool that maintains the shape of the part during the curing process. Techniques have been developed for curing composite parts without the need for an oven or autoclave, however these techniques have been limited to curing relatively small parts and/or require relatively complicated and/or expensive tooling. Out-of-autoclave curing of composite parts is made more challenging by the need for constant, evenly distributed heat over the entire area of the part being cured. Recently, curing of relatively small composite parts has been achieved using induction heating equipment employing smart susceptors that produce a maximum, constant temperature when inductively heated. For example, heating blankets using inductively heated smart susceptors have been used to cure relatively small areas of a composite rework patch applied to a structure such as an aircraft skin. Other attempts at using inductive heating to cure composite parts have been limited to smaller parts and/or involve relatively complicated tooling which may be too expensive for some applications, such as curing short-run or prototype production parts.

Accordingly, there is a need for a method and apparatus for curing composite parts out-of-autoclave that employ relatively simple and inexpensive cure tooling. There is also a need for a method and apparatus of the type mentioned above that is well suited for curing relatively large scale parts out-of-autoclave using induction heating and smart susceptors to provide precise and uniform temperature control during the curing process.

SUMMARY

The disclosed embodiments provide a method and apparatus for curing composite parts out-of-autoclave that allow precise and uniform temperature control during the curing process. The apparatus includes tooling incorporating inductive heating circuits with smart susceptors that is both simple and relatively inexpensive to fabricate. The induction heating circuits may be operated at relatively low voltages regardless of the size of the part being cured. Relatively large parts may be cured using multiple inductive heating coils which are coupled in parallel with each other and in series with an AC power supply that drives the inductive coils with an alternating current.

According to one disclosed embodiment, apparatus is provided for curing a composite part, comprising a tool having a tool surface adapted to engage a first side of the part, and a first induction heating circuit within the tool for heating the tool surface. The apparatus further comprises a heating blanket adapted to be placed over a second side of the part, and a second induction heating circuit within the heating blanket for heating the blanket. The apparatus also includes an electrical power supply coupled with first and second induction heating circuits. The power supply may be an AC power supply and at least one of the heating circuits includes a plurality of inductive coil circuits electrically coupled in parallel with each other and in series with the AC power supply. Each of the inductive coil circuits includes an inductive heating coil and a smart susceptor having a preselected Curie temperature. Each of the inductive coil circuits also includes a tuning capacitor that tunes the circuit to resonate at the frequency of the AC power supply. The tool includes a layer of substantially rigid polymer resin encasing the first induction heating circuit. The layer of polymer resin may comprise one of epoxy resin and bismaleimide resin. The tool may further comprise a tool base formed of a high temperature foam and hollowed out to dissipate heat from the tool. The heating blanket is formed of a generally flexible elastomer allowing the heating blanket to conform to the second side of the part.

According to another disclosed embodiment, apparatus is provided for out-of-autoclave curing of a composite part. The apparatus includes a substantially rigid tool on which the part may be placed. The tool includes a tool surface substantially matching and contacting a first side of the part and further includes a first induction heating circuit for heating the part. A heating blanket is adapted to be removably placed on the tool overlying the part. The heating blanket is flexible and conformable to a second side of the part, and includes a second induction heating circuit for heating the part. At least one of the first and second induction heating circuits includes at least two inductive coil circuits electrically coupled in parallel with each other. Each of the inductive coil circuits includes an inductive coil and a susceptor coupled with the coil and having a Curie temperature. The apparatus further comprises an AC power supply electrically coupled in series with the inductive coil circuits. Each of the inductive coil circuits includes a capacitor for tuning the resonant frequency of the circuit to substantially match the frequency of the AC power supply. The tool includes a layer of substantially rigid polymer resin encasing the first induction heating circuit. The heating blanket is formed of a generally flexible elastomer allowing the heating blanket to conform to a second side of the part. The heating blanket includes a pair of flexible facesheets, and a thermally conductive matrix between the facesheets for conducting heat from the second induction heating circuit to the part.

According to another embodiment, a method is provided for out-of-autoclave curing of a composite part. The method comprises placing a part to be cured on a substantially rigid tool, and heating a first side of the part by inductively heating the tool. The method also includes placing a heating blanket on a second side of the part, and using the heating blanket to heat the part from the second side thereof. Inductively heating the tool includes flowing electrical current through at least one conductor passing through the tool, using the electrical current flow to heat a susceptor within the tool and conducting heat from the susceptor through the tool to a surface of the tool in contact with the first side of the part. Inductively heating the tool further includes coupling a plurality of inductive coil circuits in parallel with each other wherein each of the circuits includes an inductive coil and a susceptor having a Curie temperature, driving each of the circuits within alternating current, and shunting power away from one of the circuits when the susceptor in the circuit reaches its Curie temperature.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 33 is a sectional illustration of the wire and conductor taken along line 33 of FIG. 31 and illustrating eddy currents circulating predominantly along a wire surface of the wire;

FIG. 34 is a legend illustrating current density levels corresponding to variations in current density in the wire cross sections of FIGS. 33 and 35;

FIG. 35 is a sectional illustration of the wire taken along line 35 of FIG. 31 and illustrating eddy currents circulating predominantly along a wire interior of the wire;

DETAILED DESCRIPTION

Figure 1:
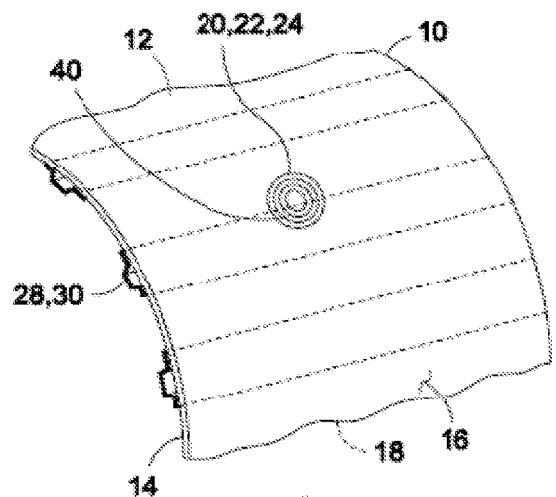
FIG. 1 is a perspective illustration of a composite structure having a rework area formed therein.

Referring now to the drawings wherein the showings are for purposes of illustrating preferred and various embodiments of the disclosure only and not for purposes of limiting the same, shown in FIG. 1 is a perspective illustration of a composite structure 10 upon which a rework process may be implemented using a heating blanket 54 illustrated in FIGS.

2-9. The heating blanket 54 illustrated in FIGS. 2-9 and as disclosed herein may be installed on a patch 40 which may be received within a rework area 20 as illustrated in FIG. 1. The heating blanket 54 of FIGS. 2-9 may apply heat to the rework area 20 in order to elevate the temperature of the rework area 20 to a uniform temperature throughout the rework area 20 in order to cure adhesive bonding the patch 40 to the rework area 20 and/or to cure the composite material forming the patch 40. In various embodiments, the heating blanket 54 as disclosed herein incorporates a combination of magnetic materials and high frequency alternating current in order to attain temperature uniformity to a structure 10 to which the heating blanket 54 is applied.

Advantageously, the temperature-dependent magnetic properties such as the Curie temperature of the magnetic materials used in the heating blanket 54 (FIGS. 2-9) may prevent overheating or under heating of areas to which the heating blanket 54 may be applied. In this manner, the heating blanket 54 facilitates the uniform application of heat to structures such as composite structures 10 (FIG. 1) during a manufacturing or rework process or any other process where uniform application of heat is required. In this regard, the heating blanket 54 compensates for heat sinks 28 (FIG. 1) that may draw heat away from portions of a structure 10 (FIG. 1) to which the heating blanket 54 is applied. More specifically, the heating blanket 54 continues to provide heat to portions of the structure 10 located near such heat sinks 28 while areas underneath the heating blanket 54 that have reached or attained the Curie temperature cease to provide heat to the rework area 20.

Figure 2:
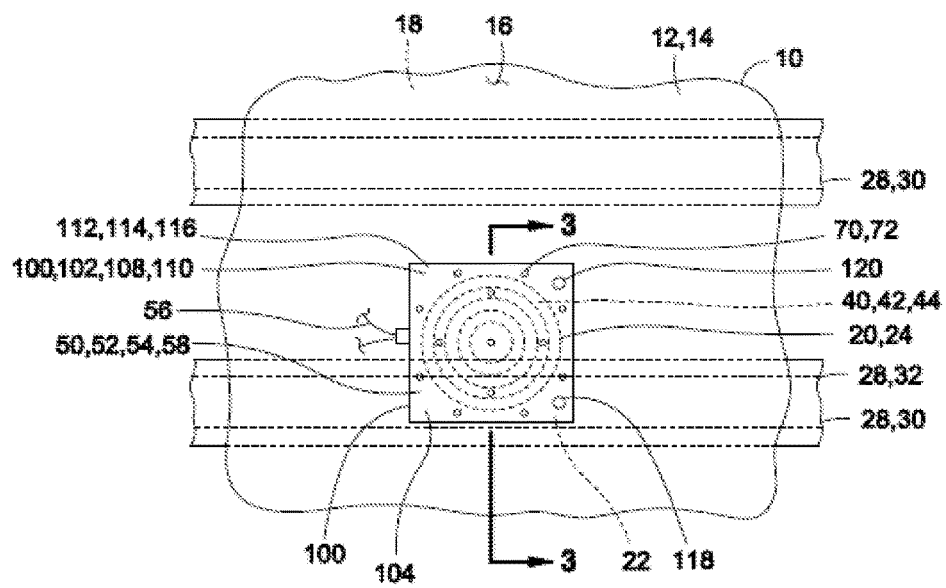
FIG. 2 is a plan view illustration of the rework area of FIG. 1 and illustrating a vacuum bag assembly and a heating blanket applied to the rework area and further illustrating a heat sink comprising a stringer extending along a portion of the rework area on a bottom surface of the composite structure.

For example, FIG. 1 illustrates a composite structure 10 which may include a skin 12 formed of plies 14 of composite material and wherein the skin 12 may have upper and lower surfaces 16, 18. The composite structure 10 may include a rework area 20 in the skin 12 formed by the removal of composite material. As can be seen in FIG. 2, the rework area 20 may be formed in the upper surface 16 and may extend at least partially through a thickness of the skin 12 although the rework area 20 may be formed in any configuration through the skin 12. Various structures may be mounted to the lower surface 18 opposite the rework area 20 such as stringers 30 which may act as heat sinks 28 drawing heat away from certain portions of the rework area 20 while the remaining portions continually receive heat from the heating blanket 54 (FIG. 2). Advantageously, the heating blanket 54 (FIG. 2) facilitates the uniform application of heat to the structure 10 by reducing heat input to portions of the rework area 20 that reach approximately the Curie temperature of the magnetic materials in the heating blanket 54 while maintaining a relatively higher level of heat input to portions of the rework area 20 that are below the Curie temperature as will be described in greater detail below.

Figure 3:
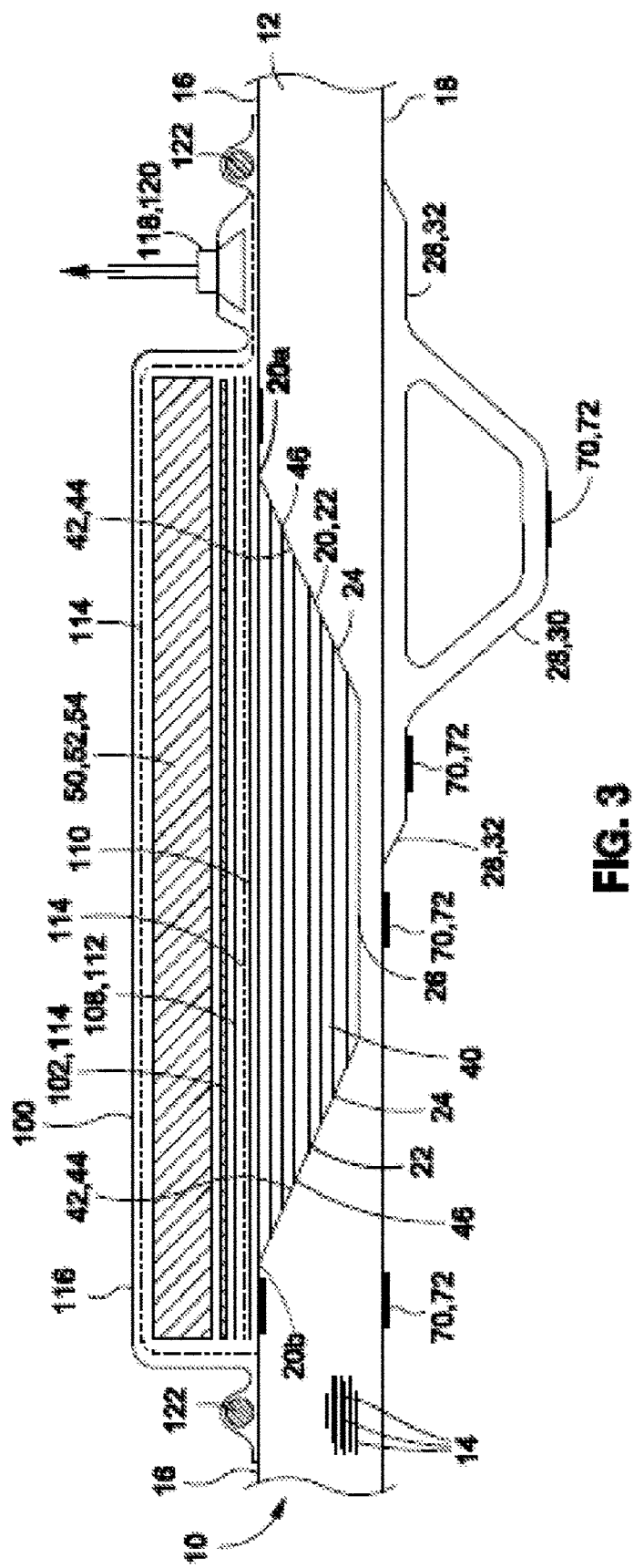
FIG. 3 is a cross-sectional illustration of the composite structure taken along line 3-3 of FIG. 2 and illustrating the stringer (i.e., heat sink) which may draw heat from localized portions of the rework area.

Referring to FIGS. 2-3, shown is a stringer 30 which may act as a heat sink 28 and which may be mounted to the lower surface 18 of the structure 10. The stringer 30 may include flanges 32 which may extend along a portion of the rework area 20 and which may partially overlap the portions of the rework area 20. For example, in FIG. 3, it can be seen that a portion of the stringer 30 and flange 32 overlap a right-hand side 20a of the rework area 20. In this regard, the stringer 30 and flange 32 may draw heat from the right-hand side 20a of the rework area 20. The remaining left-hand side 20b of the rework area 20 may lack any such heat sink 28 which would otherwise draw heat away from the rework area 20.

Referring still to FIGS. 2-3, the heating blanket 54 is illustrated as being mounted to the composite structure over the patch 40. A vacuum bag assembly 100 may be installed over the heating blanket 54. The vacuum bag assembly 100 may include a bagging film 116 covering the heating blanket 54 and which may be sealed to the upper surface 16 of the composite structure 10 by means of sealant 122. A vacuum probe 118 and vacuum gauge 120 may extend from the bagging film 116 to a vacuum generator (not shown) to provide a means for drawing a vacuum on the bagging film 116 for application of pressure and to draw out volatiles and other gasses that may be generated as a result of heating uncured composite material of the patch 40.

As can be seen in FIG. 3, the vacuum bag assembly 100 may include a caul plate 102 positioned above a porous or non-porous parting film 110, 108. The caul plate 102 may facilitate the application of uniform pressure to the patch 40. The porous or non-porous parting film 110, 108 may prevent contact between the caul plate 102 and the patch 40. The vacuum bag assembly 100 may include additional layers such as a bleeder layer 112 and/or a breather layer 114. The patch 40 may be received within the rework area 20 such that a scarf 44 formed on the patch edge 42 substantially matches a scarf 24 formed at the boundary 22 of the rework area 20. In this regard, the interface between the patch 40 and rework area 20 comprises the bondline 46 wherein adhesive is installed for permanently bonding the patch 40 to the rework area 20 and includes adhesive located at the bottom center 26 portion of the rework area 20. As shown in FIG. 2, thermal sensors 70 such as thermocouples 72 may be strategically located on upper and lower surfaces 16, 18 of the composite structure 10 such as adjacent to the rework area 20 in order to monitor the temperature of such areas during the application of heat using the heating blanket 54. In this regard, thermocouples 72 may be placed on heat sinks 28 such as the stringer 30 body and stringer flanges 32 illustrated in FIG. 3 in order to monitor the temperature of such heat sinks 28 relative to other areas of the composite structure 10.

Figure 4:
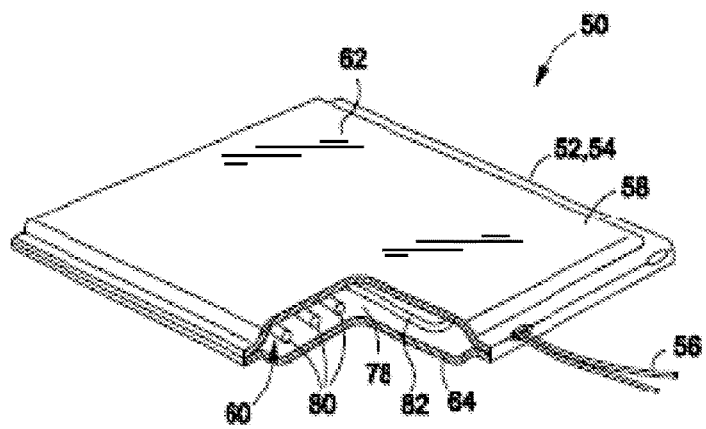
FIG. 4 is a perspective illustration of a heating blanket in an embodiment as may be used for heating the rework area of the composite structure.
Figure 6:
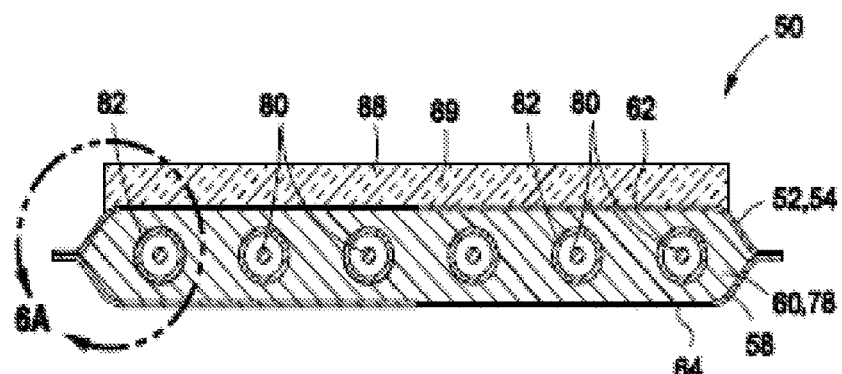
FIG. 6 is a cross-sectional illustration of the heating blanket taken along line 6-6 of FIG. 5 and illustrating the conductor having a susceptor sleeve coaxially mounted to the conductor for induction heating thereof in response to a magnetic field generated by an alternating current applied to the conductor.

Referring to FIG. 4, embodiments of the heating blanket 54 as disclosed herein may comprise three alternative techniques for employing the magnetic properties of the magnetic materials in combination with the application of high frequency alternating current (AC) electric power. FIGS. 6-6G illustrate an embodiment of the heating blanket 54 containing a susceptor sleeve 82 extending over a conductor 80 for inductive heating of the susceptor sleeve 82 in the presence of an alternating current. The inductively heated susceptor sleeve 82 thermally conducts heat to a matrix 78 best seen in FIG. 6F and which may surround the susceptor sleeve 82. The matrix 78 (FIG. 6F) may thermally conduct heat to a structure 10 to which the heating blanket 54 is mounted.

Figure 7:
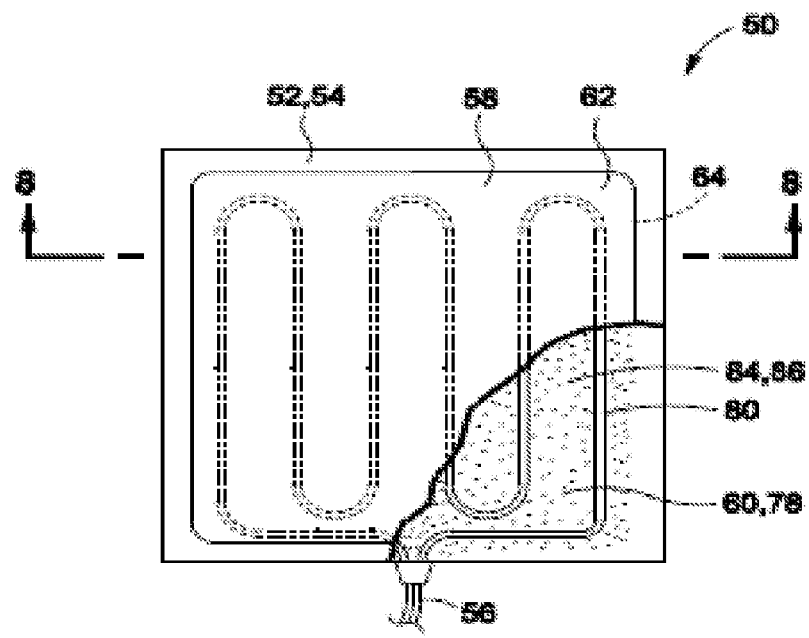
FIG. 7 is a top view illustration of an alternative embodiment of the heating blanket wherein the conductor extends through a thermally conductive matrix embedded with ferromagnetic particles.
Figure 8:
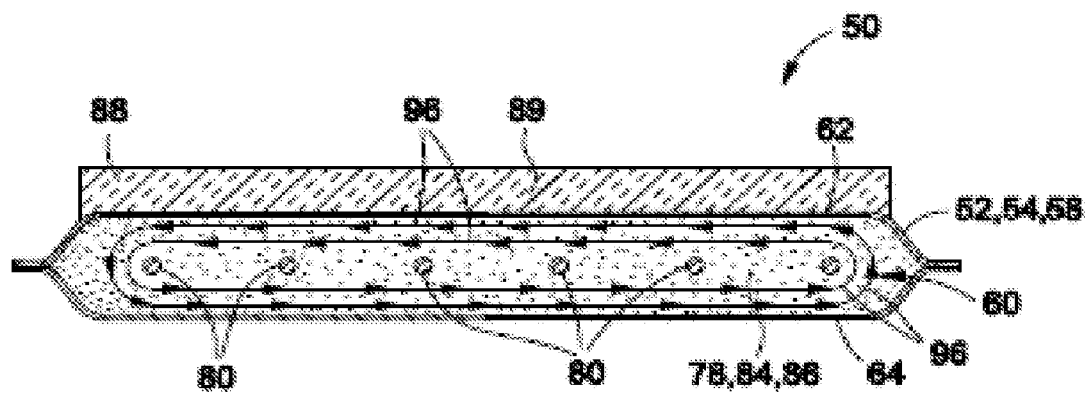
FIG. 8 is a sectional illustration of the heating blanket taken along line 8-8 of FIG. 7 and illustrating the magnetic field generated as a result of the conductor receiving alternating current.
Figure 8A:
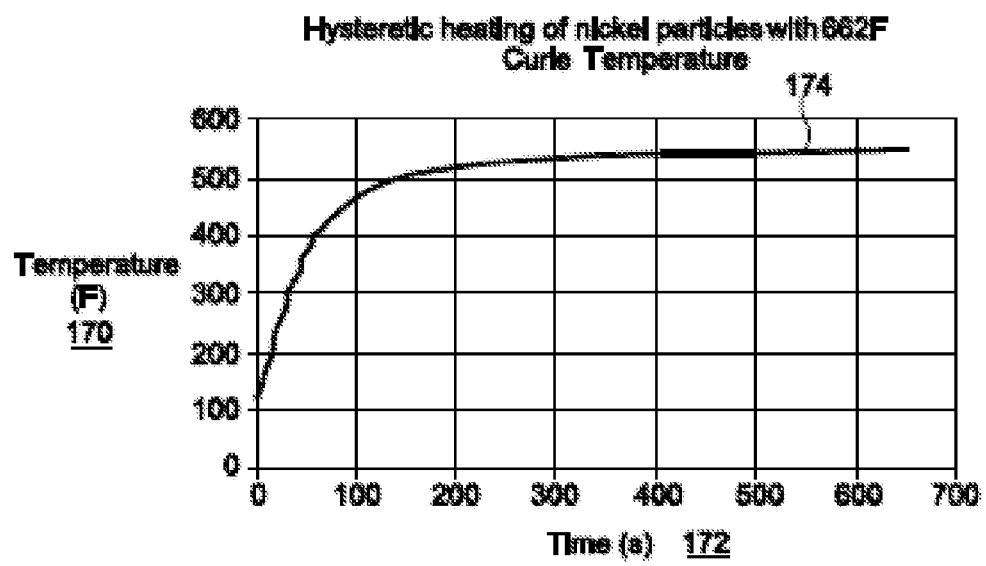
FIG. 8A is an illustration of a plot of temperature measured over a period of time during hysteretic heating of ferromagnetic particles contained within the heating blanket embodiment illustrated in FIG. 7.
Figure 8B:
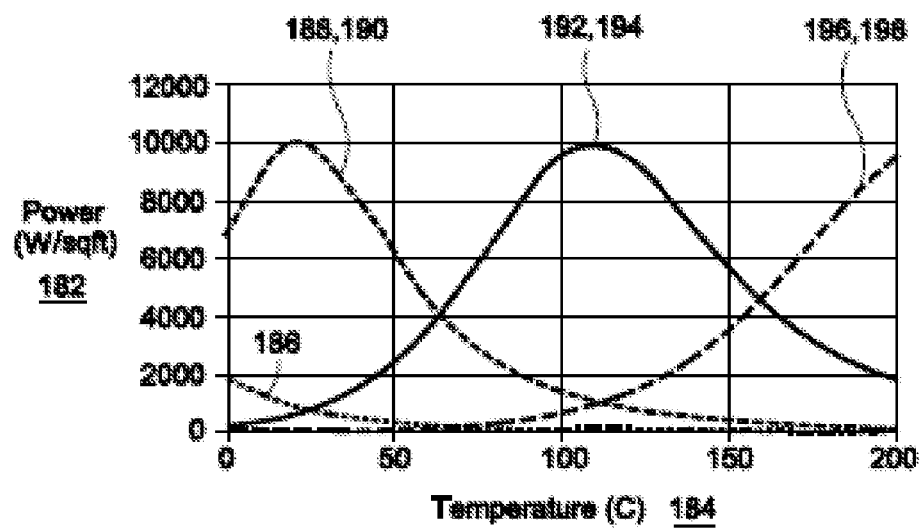
FIG. 8B is an illustration of a plot of power output relative to the temperature of superparamagnetic particles as may be contained within an embodiment of the heating blanket and wherein the superparamagnetic particles may have a corresponding plurality of Curie temperatures as a result of relaxation heating of the superparamagnetic particles in response to the magnetic field.
Figure 8C:
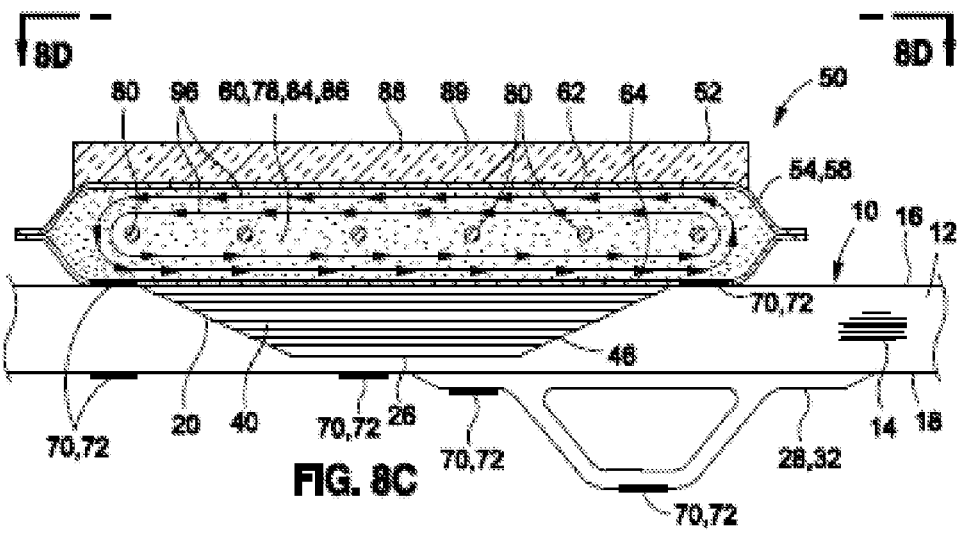
FIG. 8C is a cross-sectional illustration of the heating blanket having ferromagnetic particles or superparamagnetic particles contained therein and which may be heated by respective hysteretic and relaxation heating in response to a magnetic field.
Figure 8D:
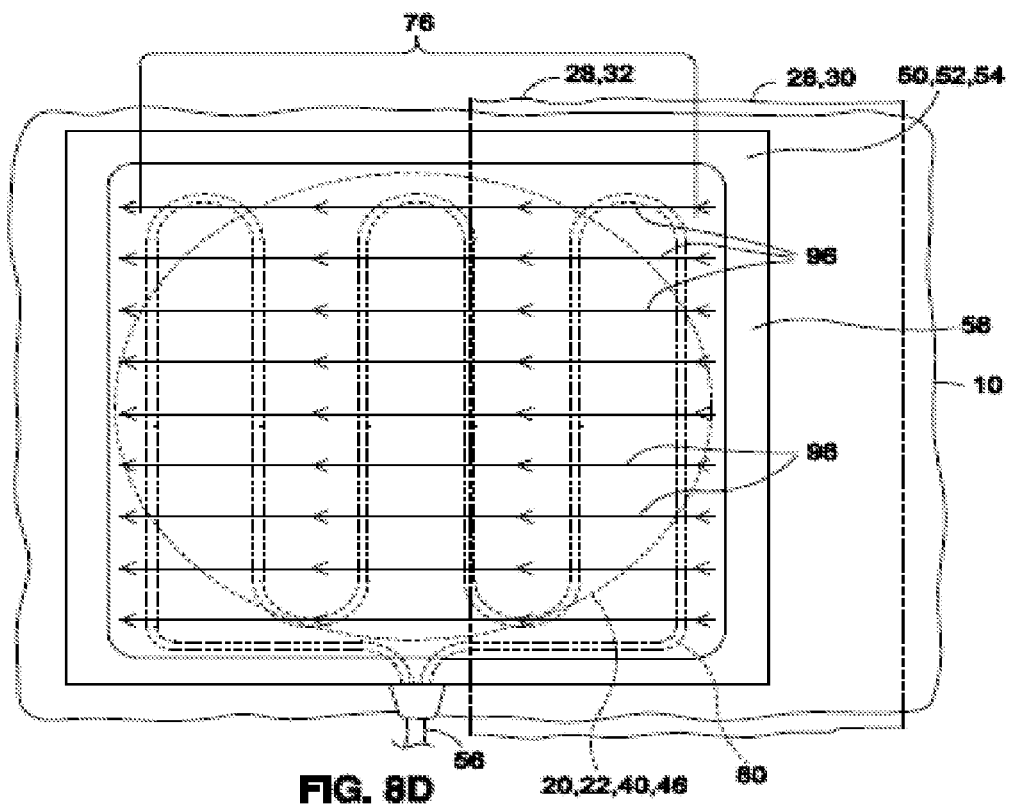
FIG. 8D is a top view illustration of the magnetic field generated by alternating current passing through the conductor as the temperatures of the particles approach the Curie temperature.
Figure 8E:
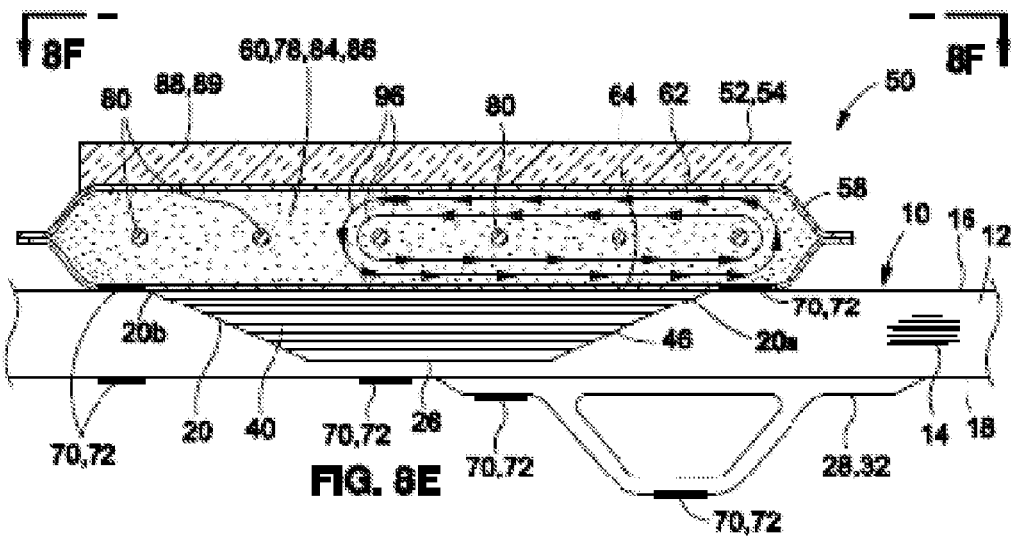
FIG. 8E is a cross-sectional illustration of the heating blanket similar to the heating blanket shown in FIG. 8C and illustrating the lack of magnetic fields on the left-hand side of the conductor and the continued generation of the magnetic field on the right-hand side of the conductor due to the continuing heating of the particles in response to heat being drawn from the rework area by the heat sink.
Figure 8F:
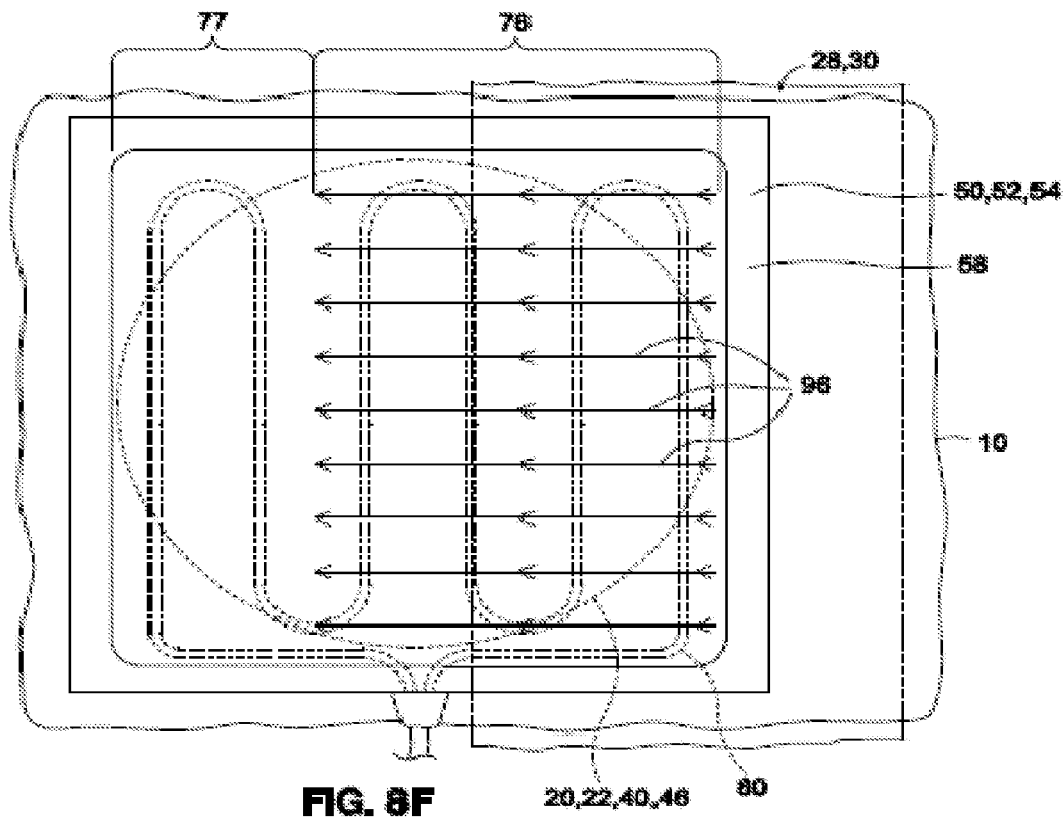
FIG. 8F is a top view illustration of the heating blanket and illustrating the lack of magnetic fields on the left-hand side of the conductor and the continued generation of the magnetic field on the right-hand side of the conductor due to the continuing heating of the particles in response to heat being drawn from the rework area by the heat sink.

FIGS. 7-8F illustrate embodiments of the heating blanket 54 containing a matrix 78 comprised of either ferromagnetic particles 84 or superparamagnetic particles 86. The embodiment containing ferromagnetic particles 84 may provide heat to a structure 10 by hysteretic heating of the ferromagnetic particles 84 to a temperature that is substantially below the Curie temperature of the ferromagnetic particles 84. The matrix 78 within which the ferromagnetic particles 84 are embedded may be heated by thermal conduction from the heat of the ferromagnetic particles 84. The embodiment containing superparamagnetic particles 86 may provide heat to a structure 10 by relaxation heating of the superparamagnetic particles 86 in correspondence to a Curie temperature range corresponding to a size or diameter of the superparamagnetic particles 86. The matrix 78 within which the superparamagnetic particles 86 are embedded may be heated by thermal conduction which is then conducted to the structure 10 to which the heating blanket is mounted.

In each of the configurations, the heating blanket may include an electrical conductor 80 which may be arranged in a meandering formation or other suitable arrangement within an interior 60 of a housing 58 of the heating blanket 54. The conductor 80 may be arranged in any arrangement and is not limited to a meandering pattern. For example, the conductor 80 may be arranged in a circular coil formation or in any other arrangement that facilitates the desired spacing between adjacent portions of the conductor 80.

Referring still to FIG. 4, the heating blanket 54 may include a housing 58 defining an interior 60 and which may be formed of a suitable material which is preferably thermally conductive and which may also be flexible and/or resilient such that the heating blanket 54 may conform to curved areas to which it may be applied. In this regard, the housing 58 is preferably formed of a pliable and/or conformable material having a relatively high thermal conductivity and relatively low electrical conductivity. The housing 58 may comprise upper and lower face sheets 62, 64 formed of silicone, rubber, polyurethane or other suitable elastomeric or flexible material that provides dimensional stability to the housing 58 while maintaining flexibility for conforming the heating blanket 54 to curved surfaces. Although shown as having a generally hollow interior 60 bounded by the upper and lower face sheets 62, 64, the housing 58 may comprise an arrangement wherein the conductor 80 and the associated magnetic material are integrated or embedded within the housing 58 such that the conductor 80 is encapsulated within the housing 58 to form a unitary structure 10 that is preferably flexible for conforming to curved surfaces.

Figure 5:
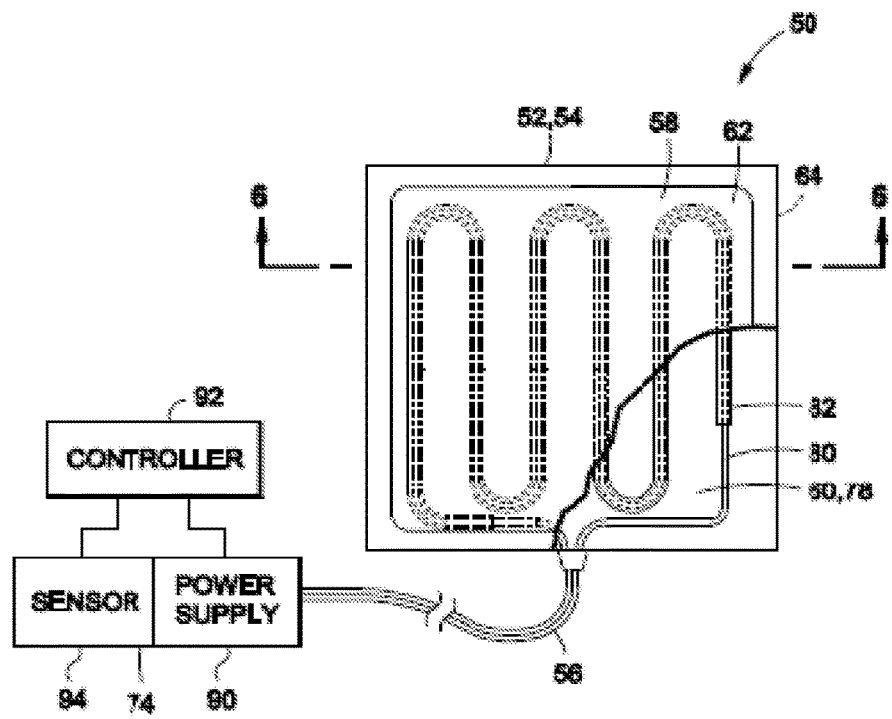
FIG. 5 is a schematic illustration of the heating blanket connected to a power supply, a controller and a sensor and illustrating a conductor housed within a housing of the heating blanket.

FIG. 5 illustrates a top view of the heating blanket 54 showing the meandering pattern of the conductor 80 within the housing 58. A power supply 90 providing alternating current electric power may be connected to the heating blanket 54 by means of the heating blanket wiring 56. The power supply 90 may be configured as a portable or fixed power supply 90 which may be connected to a conventional 60 Hz, 110 volt or 220 volt outlet. Although the power supply 90 may be connected to a conventional 60 Hz outlet, the frequency of the alternating current that is provided to the conductor may preferably range from approximately 1000 Hz to approximately 300,000 Hz although higher frequencies are contemplated.

It should be noted that for certain applications, care should be taken in selecting the frequency and amperage of the alternating current to avoid non-optimal heating of the structure 10. Electrical current of relatively high frequency and a relatively high amperage may lead to unwanted induction heating of electrically conductive structures 10 (FIG. 3). For example, a composite structure 10 (FIG. 3) comprised of electrically conductive graphite fibers may be susceptible to excess heating due to inductive heating of the fibers in response to the high frequency (e.g., 300 kHz) and high amperage current (e.g., 10 amps). In an embodiment, the voltage provided to the conductor 80 may range from approximately 10 volts to approximately 300 volts but is preferably less than approximately 60 volts. Likewise, the magnitude of the alternating current provided to the conductor 80 by the power supply is preferably between approximately 1 amp and approximately 100 amps although higher amperages are contemplated. In this regard, the power supply 90 may be provided in a constant-current configuration wherein the voltage across the conductor 80 may decrease as the magnetic materials within the heating blanket 54 approach the Curie temperature at which the voltage may cease to increase when the Curie temperature is reached as described in greater detail below.

Figure 6A:
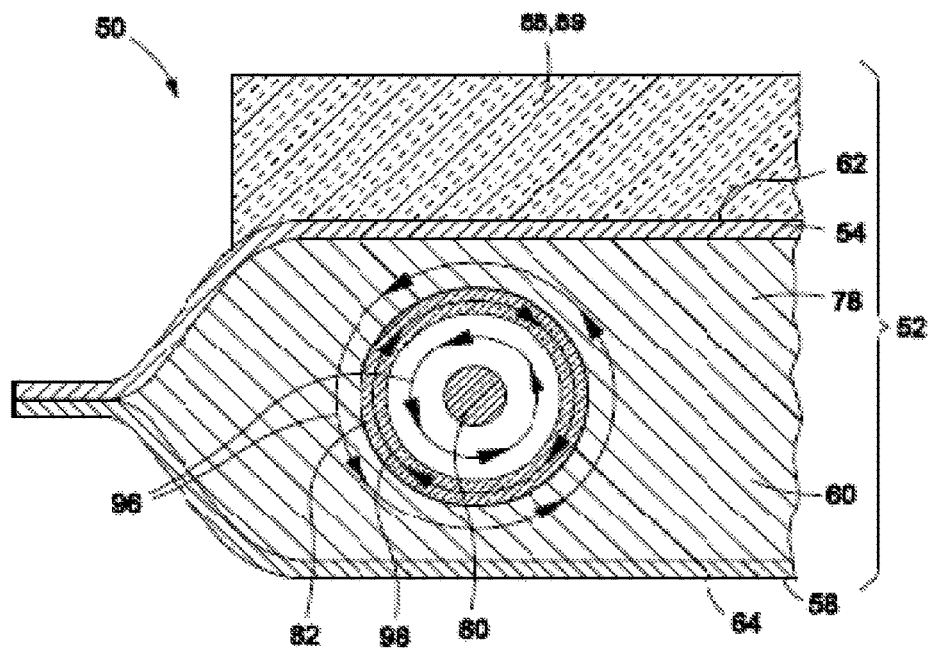
FIG. 6A is an enlarged sectional illustration of the conductor and susceptor sleeve surrounded by thermally conductive matrix and illustrating a magnetic field encircling the susceptor sleeve and generating an eddy current in the susceptor sleeve oriented in a direction opposite the direction of the magnetic field.

Referring to FIGS. 6-6A, shown is an embodiment of the magnetic blanket 54 having a susceptor sleeve 82 formed of magnetic material having a Curie temperature. The susceptor sleeve 82 may be formed as a solid or unitary component in a cylindrical arrangement or preferably from braided material in a sleeve configuration around the conductor 80 in order to enhance the flexibility of the heating blanket 54. As can be seen in FIG. 6A, the susceptor sleeve 82 may extend along a length of the conductor 80 within the housing 58. The susceptor sleeve 82 may be coaxially mounted relative to the conductor 80 and is preferably electrically insulated from the conductor 80. The application of alternating current to the conductor 80 produces an alternating magnetic field 96. The magnetic field 96 is absorbed by the magnetic material from which the susceptor sleeve 82 is formed causing the susceptor sleeve 82 to be inductively heated.

More particularly and referring to FIG. 6A, the flow of alternating current through the conductor 80 results in the generation of the magnetic field 96 surrounding the susceptor sleeve 82. Eddy currents 98 generated within the conductor 80 sleeve as a result of exposure thereof to the magnetic field 96 causes inductive heating of the susceptor sleeve 82. The housing 58 may include a thermally conductive matrix 78 material such as silicone to facilitate thermal conduction of the heat generated by the susceptor sleeve 82 to the surface of the heating blanket 54. The magnetic material from which the susceptor sleeve 82 is formed preferably has a high magnetic permeability and a Curie temperature that corresponds to the desired temperature to which the structure (FIG. 6D) is to be heated by the heating blanket 54. The susceptor sleeve 82 and conductor 80 are preferably sized and configured such that at temperatures below the Curie temperature of the magnetic material, the magnetic field 96 is concentrated in the susceptor sleeve 82 due to the magnetic permeability of the material.

As a result of the close proximity of the susceptor sleeve 82 to the conductor 80, the concentration of the magnetic field 96 results in relatively large eddy currents 98 in the susceptor sleeve 82. The induced eddy currents 98 result in resistive heating of the susceptor sleeve 82. The susceptor sleeve 82 conductively heats the matrix 78 and the structure 10 (FIG. 6D) in thermal contact with the heating blanket 54. The heating of the susceptor sleeve 82 continues during application of the alternating current until the magnetic material approaches the Curie temperature. Upon reaching the Curie temperature, the susceptor sleeve 82 becomes non-magnetic at which point the magnetic fields 96 are no longer concentrated in the susceptor sleeve 82. The induced eddy currents 98 and associated resistive heating diminishes to a level sufficient to maintain the temperature of the susceptor sleeve 82 at the Curie temperature.

Figure 6B:
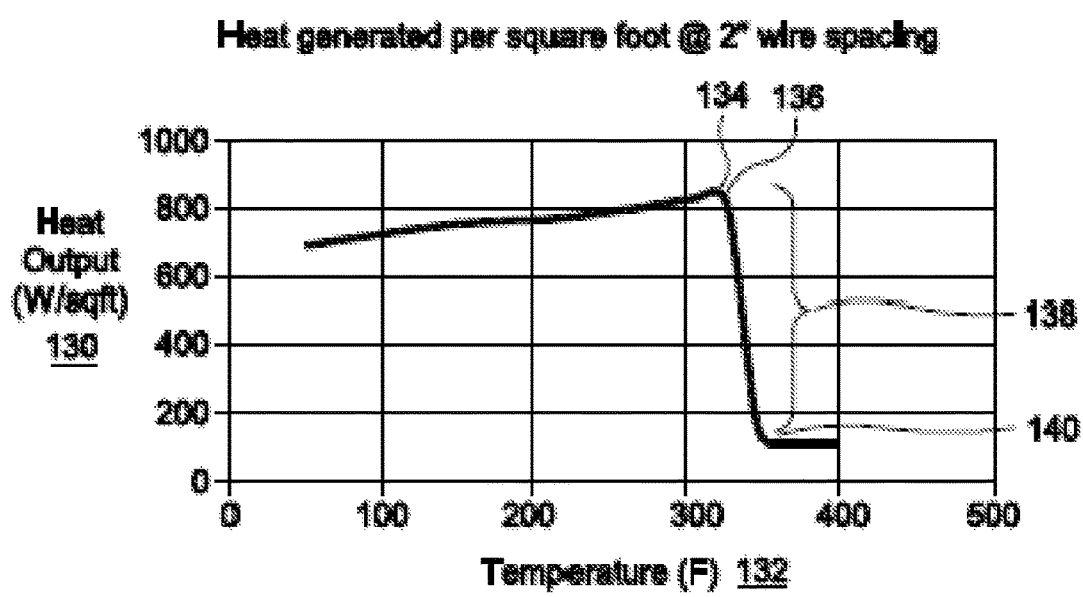
FIG. 6B is an illustration of a plot of heat output measured over temperature for an embodiment of the heating blanket containing the susceptor sleeve and illustrating a reduction in the inductive heat output of the susceptor sleeve upon becoming non-magnetic when reaching the Curie temperature.

As an example of the heating of the magnetic material to the Curie temperature 134, FIG. 6B illustrates a plot of heat output 130 measured over temperature 132 for a heating blanket 54 (FIG. 6) comprised of a susceptor sleeve 82 mounted on a conductor 80 wherein the conductor 80 is formed in a meandering pattern as illustrated in FIG. 6. As can be seen in FIG. 6B, heat output 130 of the heating blanket gradually increases from approximately 700 watts per square foot (W/sqft) to 850 W/sqft during a temperature increase of from 50° F. to approximately 320° F. at which point the Curie temperature 134 is reached at the magnetic 136 limit of the magnetic material from which the susceptor sleeve is formed. Heat output 130 of the heating blanket decreases from 800 W/sqft to approximately 100 W/sqft during a transient section 138 illustrated in FIG. 6B while the temperature maintains relatively constant at between approximately 320° F. and 350° F. The magnetic material of the susceptor sleeve becomes non-magnetic 140 at the temperature of 350° F. at which point the induced currents in the susceptor sleeve diminish to a level for maintaining the temperature of the susceptor sleeve at the Curie temperature 134.

FIG. 6B is an example of a magnetic material having a Curie temperature 134 of approximately 350° F. In this regard, it can be seen that the magnetic material may be selected to provide any temperature corresponding to the desired temperature of the structure 10 (FIG. 6D) to which the heating blanket 54 (FIG. 6D) is mounted. For example, for bonding a composite patch 42 (FIG. 6D) to a rework area 20 (FIG. 6D), the adhesive may require a curing temperature of from approximately 250° F. to 350° F. In this regard, the susceptor sleeve 82 (FIG. 6D) may be comprised of a suitable material having a Curie temperature of between 250° F. to 350° F. However, the susceptor sleeve 82 may be comprised of material having any suitable Curie temperature.

The magnetic material may be provided in a variety of compositions including, but not limited to, a metal, an alloy, or any other suitable material that is electrically conducting and having a Curie temperature that approximates a desired temperature in the structure 10 to be heated. For example, the susceptor sleeve 82 (FIG. 6D) may be formed of an alloy having a composition of 25 wt. % Cu-75 wt. % Ni which has a Curie temperature of approximately 250° F. The alloy may also be selected as having a composition of 18 wt. % Cu-82 wt. % Ni which has a Curie temperature of approximately 350° F. However, the susceptor sleeve 82 may be formed of a variety of other magnetic materials such as alloys which have Curie temperatures in the range of the particular application such as the range of the adhesive curing temperature or the curing temperature of the composite material from which the patch may be formed. Metals comprising the magnetic material may include iron, cobalt or nickel. Alloys from which the magnetic material may be formed may comprise a combination of the above-described metals including, but not limited to, nickel, iron cobalt, molybdenum, and chromium.

Likewise, the conductor 80 (FIG. 6D) may be formed of any suitable material having low electrical resistance. Furthermore, the conductor 80 is preferably formed of flexible material to facilitate the application of the heating blanket to curved surfaces. In this regard, the conductor 80 may be formed of litz wire or other similar wire configurations having a flexible nature and which are configured for carrying high frequency alternating current with minimal weight. The conductor 80 material preferably possesses a relatively low electrical resistance in order to minimize unwanted and/or uncontrollable resistive heating of the conductor 80. The conductor may be provided as a single strand of wire of unitary construction or the conductor 80 may be formed of braided material such as braided cable. In addition, the conductor 80 may comprise a plurality of conductors which may be electrically connected in parallel in order to minimize the magnitude of the voltage otherwise required for relative long lengths of the conductor such as may be required for large heating blanket configurations.

Referring to FIGS. 6 and 6A, the housing may be formed of a flexible material to provide thermal conduction of heat generated by the susceptor sleeve to the structure 10 to which the heating blanket is applied. In order to minimize environmental heat losses from the heating blanket 54, an insulation layer 88 may be included as illustrated in FIGS. 6 and 6A. The insulation layer 88 may comprise insulation 89 formed of silicone or other suitable material to minimize heat loss by radiation to the environment. In addition, the insulation layer 88 may improve the safety and thermal efficiency of the heating blanket 54. As was indicated above, the housing 58 may be formed of any suitable high temperature material such as silicone or any other material having a suitable thermal conductivity and low electrical conductivity. Such material may include, but is not limited to, silicone, rubber and polyurethanes or any other thermally conductive material that is preferably flexible.

Referring to FIG. 5, the heating blanket 54 may include thermal sensors (not shown) such as thermocouples or other suitable temperature sensing devices for monitoring heat at locations along the area of the heating blanket 54 in contact with the structure 10 (FIG. 3). Alternatively, the heating blanket 54 may include a voltage sensor 94 or other sensing device connected to the power supply 90 as illustrated in FIG. 5. As was indicated above, the power supply 90 may be provided as a constant current configuration to minimize inductive heating of electrically conductive materials such as graphite-epoxy composites typically used in composite construction. Furthermore, a constant current configuration for the power supply 90 may minimize unwanted resistive heating in the conductor 80 wiring.

Referring still to FIG. 5, the sensor 94 may be configured to indicate the voltage level provided by the power supply 90. For a constant current configuration of the heating blanket 54, the voltage may decrease as the magnetic material approaches the Curie temperature. The power supply may also be configured to facilitate adjustment of the amplitude of the alternating current in order to alter the heating rate of the magnetic material. In this regard, the power supply 90 may be coupled to a controller 92 to facilitate adjustment of the alternating current over a predetermined range in order to facilitate the application of the heating blanket 54 to a wide variety of structures having different the heating rate requirements which may range from a few minutes to one hour or more.

Figure 6C:
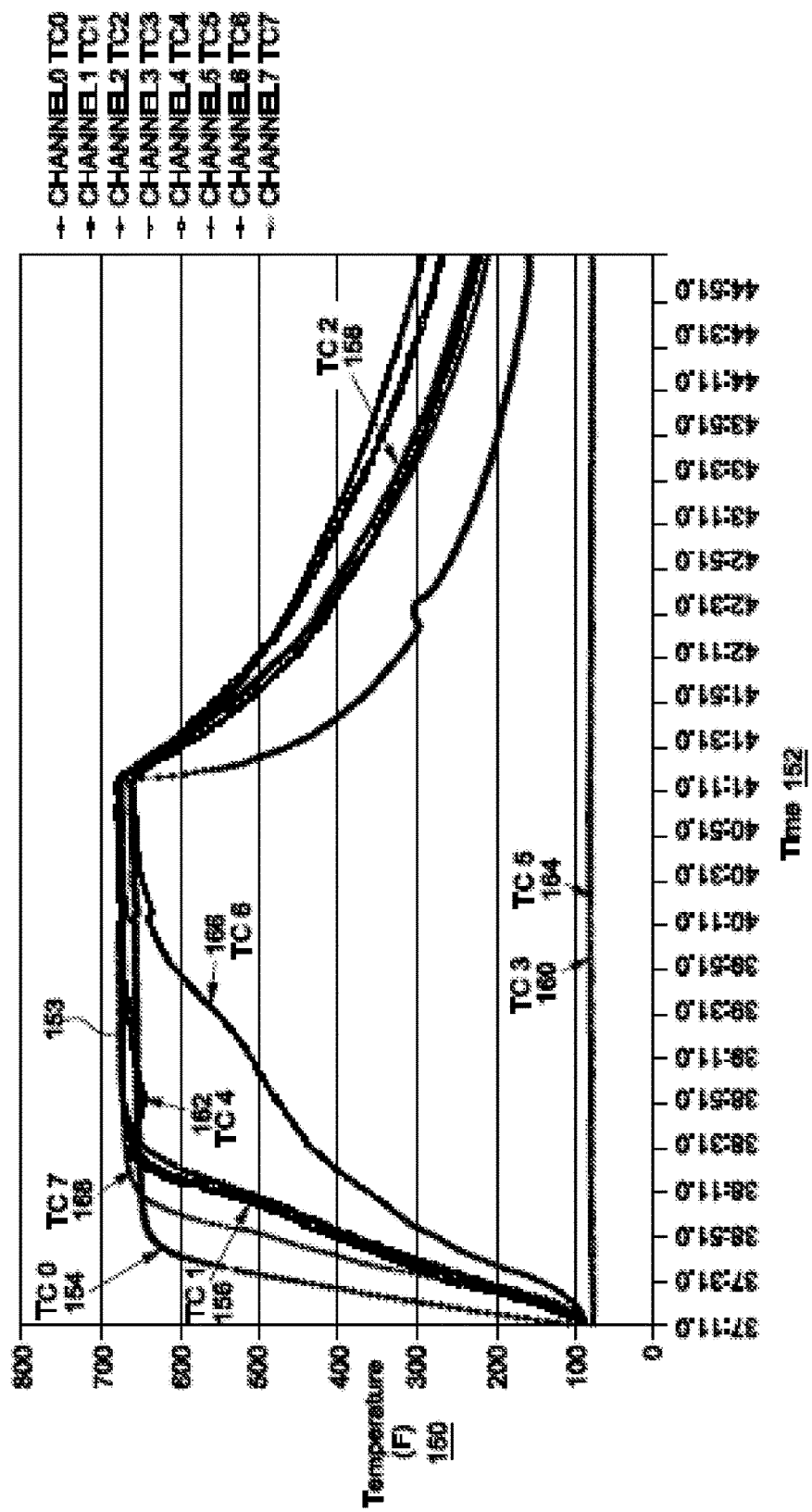
FIG. 6C is an illustration of a plot of experimental temperature data over time as recorded by thermal sensors located at various portions of a structure having differing thermal environments and illustrating the attainment of a substantially uniform temperature at the differing thermal environments across the structure.
Figure 6D:
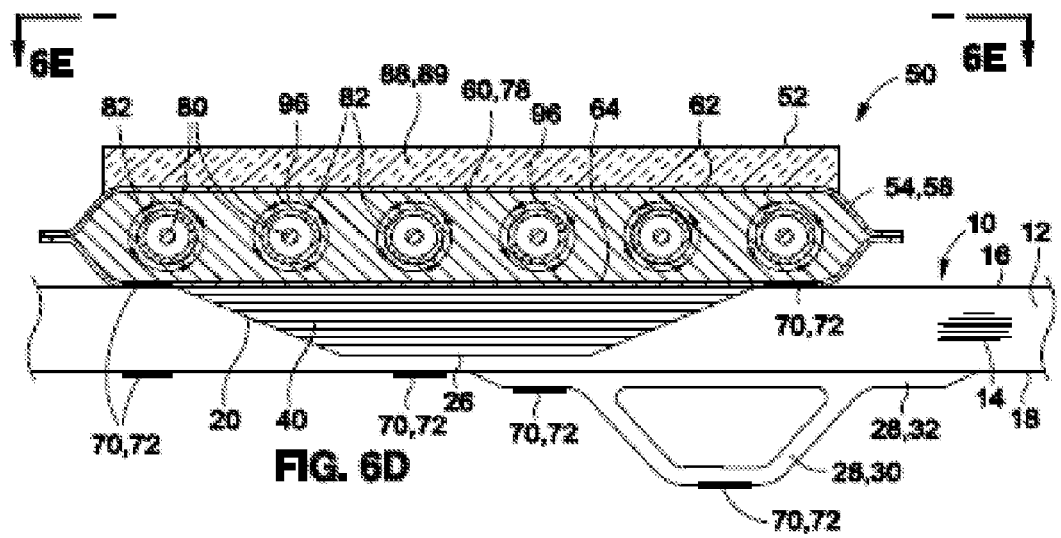
FIG. 6D is a sectional illustration of the heating blanket shown in FIG. 6 and illustrating the mounting of the heating blanket to a rework area of a composite structure having a heat sink (i.e., stringer) positioned on a right-hand side of the rework area.

Referring to FIG. 6C, shown is a graph of temperature 150 measured over a period of time 152 during heating of a test article using a heating blanket 54 (FIG. 6) having a susceptor sleeve 82 (FIG. 6) extending along the conductor. FIG. 6C illustrates the measurement of temperature 150 recorded during testing of the heating of a relatively large structure (not shown) for thermoplastic forming thereof. As can be seen in FIG. 6C, temperatures were measured and recorded by thermocouples TC0, TC1, TC2, TC3, TC4, TC5, TC6, TC7 corresponding to reference numbers 154, 156, 158, 160, 162, 164, 166, 168, respectively, positioned at several locations of the structure having differing thermal environments. The differing thermal environments resulted in different heating rates of the structure as measured by the thermocouples 154, 156, 158, 160, 162, 164, 166, 168. For example, the thermocouple TC6 166 measured temperature of at a location of the structure having a relatively slower heating rate as compared to the locations of the structure such as those represented by the thermocouples 154 and 168 which exhibited relatively high heating rates. FIG. 6C further illustrates that the heating blanket 54 (FIG. 6) heated all locations of the structure to the same Curie temperature 153 during the application of a relatively constant supply of alternating current to the conductor 80 (FIG. 6). In this regard, the heating blanket 54 increased and maintained the temperature of all locations of the structure to approximately 670° F. which was the desired temperature for thermoplastic forming. Upon attaining the desired temperature at all locations of the structure, the power supply was deactivated at 41 minutes and 11 seconds as illustrated in the graph of FIG. 6C.

Figure 6E:
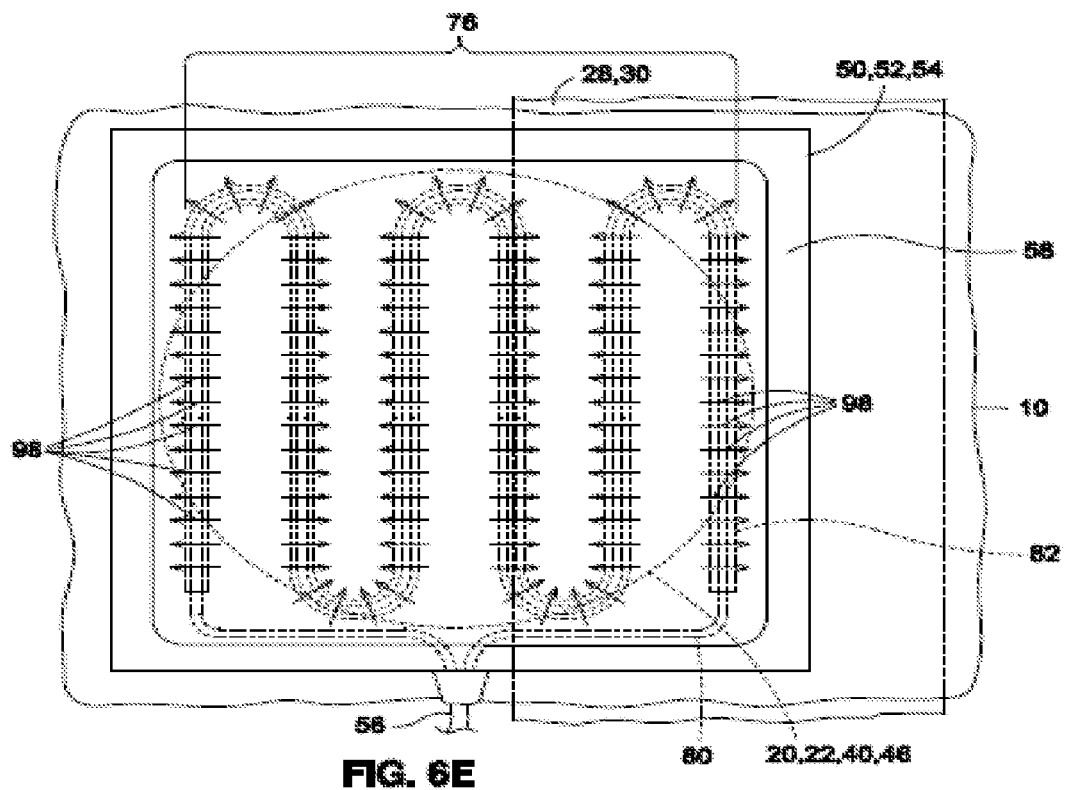
FIG. 6E is a top view illustration of the heating blanket applied to a patch and illustrating magnetic fields generated along the length of the susceptor sleeve in response to the application of alternating current to the conductor.
Figure 6F:
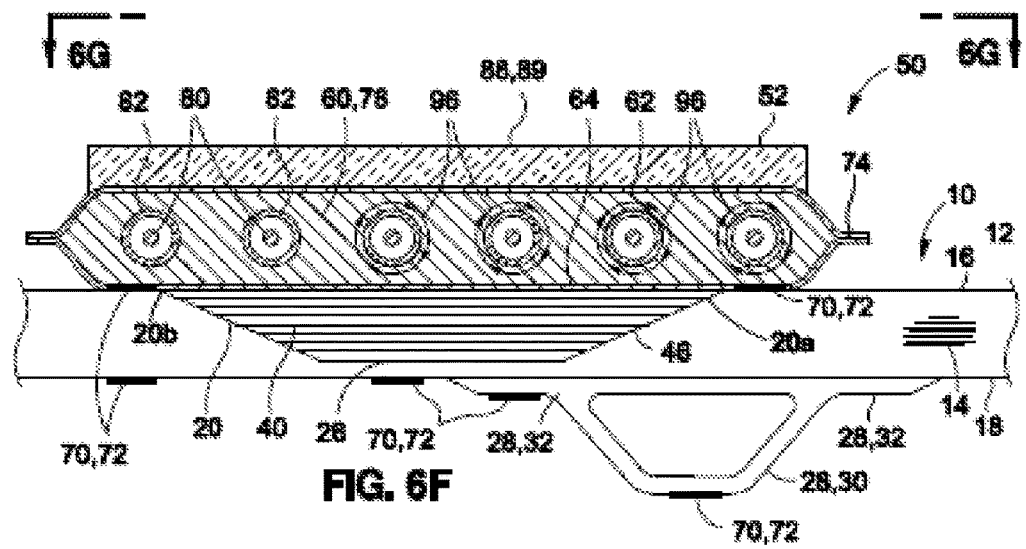
FIG. 6F is a cross-sectional illustration of the heating blanket of FIG. 6E and illustrating the lack of magnetic fields along the left-hand side of the conductor as a result of the susceptor sleeve becoming non-magnetic upon attaining the Curie temperature and the continued generation of the magnetic field on the right-hand side of the conductor as a result of the susceptor sleeve being below the Curie temperature in response to heat being drawn from the rework area by the heat sink (i.e., stringer)
Figure 6G:
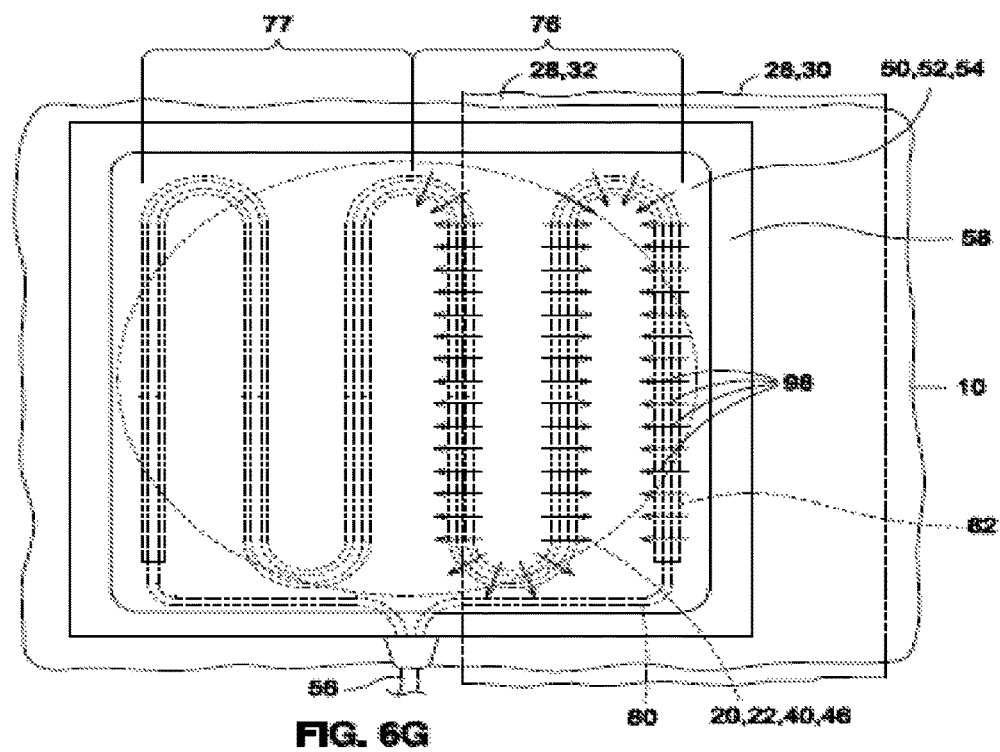
FIG. 6G is a top view illustration of the heating blanket of FIG. 6F and illustrating the lack of magnetic fields on the left-hand side of the conductor and the continued generation of the magnetic field on the right-hand side of the conductor in response to heat being drawn from the rework area by the heat sink.

Referring to FIGS. 6D-6G, shown is the heating blanket 54 configuration having the susceptor sleeve 82 substantially coaxially mounted to the conductor 80 and wherein the heating blanket 54 is installed over a patch 40 mounted within a rework area 20. As can be seen, the structure 10 includes a heat sink 28 configured as a stringer 30 on the lower surface 18 of the structure 10 which may draw heat from the rework area 20. FIG. 6E is a top view illustration of the heating blanket 54 installed on the patch of FIG. 6D and illustrating magnetic field 96 lines generated during the application of alternating current to the conductor 80. As can be seen, the magnetic field 96 lines occur uniformly throughout the length of the conductor 80 as may occur during the initial stages of heating a composite structure 10 rework area 20. The application of the alternating current to the conductor 80 generates a magnetic field 96 which is concentrated in the susceptor sleeve 82 along the length of the conductor 80 causing induced currents which resistively heat the susceptor sleeve 82 and adjacent materials such as the matrix 78 within which the susceptor sleeve 82 and conductor 80 may be embedded. As the susceptor sleeve 82 is initially heated, the magnetic material in the susceptor sleeve 82 maintains its magnetic properties resulting in continuous inductive heating thereof.

Referring to FIGS. 6F-6G, it can be seen that the magnetic material in the susceptor sleeve 82 adjacent the heat sink 28 and stringer 30 on the right-hand side 20a (FIG. 6F) of the heating blanket 54 continues to be magnetic while the portion of the conductor 80 and susceptor sleeve 82 located away from the heat sink 28 on the left-hand side 20b (FIG. 6F) have reached the Curie temperature such that the magnetic properties of the susceptor sleeve 82 disappear as the magnetic fields 96 are no longer concentrated in the susceptor sleeve 82. The susceptor sleeve 82 becomes non-magnetic in such portions and the induced currents and resistive heating of the susceptor sleeve 82 diminishes to a level sufficient to maintain a temperature of the susceptor sleeve 82 at the Curie temperature. In this regard, the non-magnetic portion 77 of the heating blanket 54 illustrated in FIG. 6G provides reduced heat to the rework area 20 while the magnetic portion 76 continues to provide a greater amount of heat to the rework area 20 in order to attain the adhesive curing temperature and/or composite material curing temperature. Once the magnetic portion 76 illustrated in FIG. 6G reaches the Curie temperature, the magnetic material of the susceptor sleeve 82 in that portion becomes non-magnetic and the resistive heating is reduced to a sufficiently low level to maintain the rework area 20 at the desired temperature.

As can be seen in FIG. 6F, the magnetic blanket may include thermal sensors 70 such as thermocouples 72 which may be strategically located between the blanket and the upper surface 16 of the structure 10 adjacent to the rework area 20 for monitoring the temperature of the structure 10. Data from the thermocouples 72 may be provided to the controller in order to monitor the power supply. Likewise, thermal sensors may provide a means for sensing and monitoring the temperature of the heating blanket to facilitate regulation of the magnitude or frequency of alternating current supplied to the conductor. The heating blanket may include an indicating mechanism 74 such as a blinking light (not shown) in order to indicate the attainment of the Curie temperature by the susceptor sleeve 82.

Referring now to FIGS. 7-8, shown is an alternative embodiment of the heating blanket 54 having ferromagnetic particles 84 embedded within the matrix 78. The heating blanket 54 may be constructed similar to that which was described with regard to the induction heating embodiment illustrated in FIGS. 4-6G. The heating blanket 54 shown in FIGS. 7-8 may include a power supply 90 (FIG. 5) for generating alternating current at a relatively high frequency. For example, the frequency of alternating current provided to the heating blanket 54 may be approximately 1 kHz to 300 kHz at an amperage of between approximately 10 amps and 1000 amps and a voltage of between approximately 10 volts to 300 volts. However, the alternating current may be provided in a frequency in the megahertz or gigahertz range such as upon attaining Federal Communications Commission approval. As was indicated above, care may be taken in selecting the characteristics of the alternative current to avoid a combination of relatively high frequency and relatively high amperage that may lead to unwanted induction heating of a conductive structure 10 (FIG. 3).

The housing 58 of the heating blanket 54 configuration shown in FIGS. 7-8 may be similar to the housing 58 described above with reference to FIGS. 4-6G wherein the housing 58 is preferably formed of a flexible material and which contains a thermally conductive matrix 78. The housing 58 may include an insulation layer 88 on one side thereof in order to minimize heat loss to the environment. The conductor 80 may likewise be formed of materials similar to that described above with regard to the induction heating configuration illustrated in FIGS. 4-6G wherein the conductor 80 is formed of flexible wire such as litz wire and is arranged in a meandering pattern or other suitable arrangement.

In the embodiment illustrated in FIGS. 7-8, the ferromagnetic particles 84 have a Curie temperature that is preferably substantially greater than the desired temperature of the structure (not shown) to be heated by the heating blanket 54. In this regard, the ferromagnetic particles 84 preferably have high hysteretic losses which manifest as heat given off at a temperature that is lower than the Curie temperature of the ferromagnetic particles 84. The ferromagnetic particles 84 are preferably dispersed or embedded within at least a portion of the matrix 78 or throughout the entire matrix 78 in a uniform manner. The ferromagnetic particles 84 in the configuration illustrated in FIGS. 7-8 are heated by hysteretic heating in response to the magnetic field 96 resulting from the application of the alternating current to the conductor 80.

FIG. 8 illustrates the magnetic field 96 pattern circulating through the ferromagnetic particles 84 embedded within the matrix 78 inside the housing 58. The ferromagnetic particles 84 are preferably selected such that the Curie temperature thereof is substantially greater than the desired temperature of the structure (not shown) to be heated in order to account for diminishing hysteretic heating as temperatures increase in the ferromagnetic particles 84. Hysteretic heating of the ferromagnetic particles 84 causes a leveling off of the temperature prior to the ferromagnetic particles 84 reaching the Curie temperature. The leveling off of the temperature is due in part to the decrease in the amount of heat that is generated with increasing temperature. The decrease in generated heat may also be in response to thermal conduction of heat from the ferromagnetic particles 84 such as into a structure (not shown) being heated.

Referring to FIG. 8A, shown is a graph of temperature 170 versus time 172 and illustrating a plot of temperatures measured during hysteretic heating of nickel ferromagnetic particles having a Curie temperature of approximately 660° F. It can be seen that temperature increases at a relatively rapid rate during the initial heating of the ferromagnetic particles. The temperature of the ferromagnetic particles attains a leveling off at approximately 550° F. (i.e., the hysteretic temperature 174) which is approximately 25% less than the Curie temperature. In this regard, the heating blanket 54 (FIG. 8) may include ferromagnetic particles 84 (FIG. 8) that are selected such that the Curie temperature thereof is greater by a predetermined amount than the temperature at which the structure 10 (FIG. 8C) is to be heated. The ferromagnetic particles for which the temperature plot is illustrated in FIG. 8A may comprise a 2% concentration of a matrix formed of polyetheretherketone (PEEK). However the matrix may comprise any suitable material having thermally conductive properties and which preferably exhibits low electrical resistivity.

Referring to FIGS. 7 and 8, in a further embodiment, the heating blanket 54 may include superparamagnetic particles 86 that absorb energy from the magnetic field 96 produced by applying alternating current to the conductor 80. The superparamagnetic particles 86 undergo relaxation heating in response to exposure to the magnetic field 96 generated by the alternating current passing through the conductor 80. The Curie temperature of the superparamagnetic particles 86 is dependent in part on the size of the superparamagnetic particles 86. More specifically, the superparamagnetic particles 86 convert heat from the magnetic field 96 by relaxation heating at a rate which is dependent upon the size (i.e., diameter) of the superparamagnetic particles 86.

The Curie temperature of the superparamagnetic particles 86 may also be dependent upon a temperature range of the relaxation heating of the superparamagnetic particles 86. For example, the temperature range may correspond to a frequency of the alternating current and/or an amplitude of the alternating current. The temperature range may be altered by adjusting the frequency and/or the amplitude of the alternating current provided to the conductor 80. The superparamagnetic particles 86 generate heat within a relatively narrow temperature band such that the size of the superparamagnetic particles 86 may be selected to correspond to the desired temperature at which the structure (not shown) is to be heated. For example, a superparamagnetic particle 86 formed of iron oxide having a size ranging from approximately to 24 nm generates a heat in the range of from 0° C. (i.e., room temperature) to approximately 150° C.

Referring to FIG. 8B, shown is a plot of power output 182 (i.e., heat) measured in watts-per-square-foot versus temperature 184 for iron oxide superparamagnetic particles in response to a conductor receiving alternating current at a frequency of 3000 Hz. In the plot of FIG. 8B, shown is a first particle size 186 having a Curie temperature band that falls below 0° C. and is therefore not visible on the graph. The second particle size 188 illustrated in FIG. 8B has a diameter of approximately 22 nm which occupies a Curie temperature 190 band that is different than the temperature band at which the third particle size 192 generates heat. More specifically, the third particle size 192 has a diameter of approximately 24 nm and generates heat at a Curie temperature 194 in the range of approximately 0° C. to approximately 150° C. The fourth particle size 196 illustrated in the graph of FIG. 8B generates heat at a Curie temperature 198 starting at approximately 100° C.

As may be appreciated, the superparamagnetic particles 86 (FIG. 8) may be selected in order to provide a plurality of particle sizes generating heat within a corresponding plurality of temperature ranges. The location of the temperature ranges can also be adjusted by changing the frequency of the alternating current passing through the conductor 80 (FIG. 8). In this manner, a heating blanket 54 (FIG. 8) formed with superparamagnetic particles 86 can be configured to provide heat at different temperatures by changing the frequency of the alternating magnetic field such as by changing the frequency of the alternating current. The frequency of the alternating magnetic field may also be changed by adjusting the voltage output of the power supply 90 (FIG. 5).

The superparamagnetic particles 86 for the configurations illustrated in FIGS. 7-8 may be comprised of any suitable magnetic material including, but not limited to, any suitable metal, alloy, metal oxide or ferrite as described above with regard to the magnetic material from which the susceptor sleeve 82 may be formed. For example, the metals or metal alloys from which the superparamagnetic particles 86 may be fabricated may include, but are not limited to, iron, cobalt, nickel and copper or any other suitable metal or alloy thereof.

Referring now to FIGS. 8C-8D, shown is the heating blanket 54 comprising either the ferromagnetic particles 84 or the superparamagnetic particles 86 embedded within the matrix 78. The heating blanket 54 is shown installed on a patch 40 received within a rework area 20. The ferromagnetic 84 or superparamagnetic particles 86 which may be embedded in all or a portion of the matrix 78 are directly heated by the magnetic field 96 which, in turn, thermally heats the matrix 78 by conduction. The structure 10 to which the heating blanket 54 is installed is likewise heated by thermal conduction when the superparamagnetic particles 86 continue to exhibit magnetic properties below the Curie temperatures. In this regard, FIG. 8D illustrates that the entirety of the matrix is magnetic as indicated by the magnetic portion 76.

Referring to FIGS. 8E-8F, shown is a cross-sectional illustration and a top view illustration of the heating blanket 54 showing the magnetic field 96 being concentrated on the right-hand side 20*a* (FIG. 8E) of the heating blanket 54 relative to the left-hand side 20*b* (FIG. 8E) representing a reduction in heat generated by the ferromagnetic particles 84 as the temperature approaches a hysteretic temperature of the ferromagnetic particles 84. As was indicated above, the hysteretic temperature represents the temperature at which the ferromagnetic particles 84 have relatively large hysteresis losses. The hysteresis losses of the ferromagnetic particles 84 diminish to relatively low levels at temperatures below the Curie temperature. In this regard, FIG. 8E represents those portions of the ferromagnetic particles 84 within the matrix 78 that undergo a relatively rapid decrease in heat generation with increasing temperature such that the temperature in the non-magnetic portion 77 illustrated in FIG. 8F is below the Curie temperature of the ferromagnetic particles 84. However the magnetic portion 76 of the heating blanket 54 illustrated in FIG. 8F continues to provide heat to the rework area 20 of the composite structure 10 as a result of the heat being absorbed by the heat sink 28 on the lower surface 18 of the composite structure 10.

Referring still to FIGS. 8E-8F, for the configuration of the heating blanket 54 having superparamagnetic particles 86, the magnetic portion 76 illustrated in FIG. 8F continues to undergo relaxation heating at a rate which is dependent upon the size or diameter of the superparamagnetic particles 86. Temperature increase slows as the superparamagnetic particles 86 approach or exceed the Curie temperature. In this regard, heat output from a heating blanket 54 having superparamagnetic particles 86 is reduced when the temperature of the superparamagnetic particles 86 is either greater than or less than the Curie temperature.

In the embodiments illustrated in FIGS. 7-8F, the density of the ferromagnetic particles 84 or superparamagnetic particles 86 in the matrix 78 may be selected in consideration of the desired flexibility of the heating blanket 54. For example, the density or amount of ferromagnetic 84 or superparamagnetic particles 86 in the matrix 78 has an effect on the stiffness or flexibility of the heating blanket 54. A higher density of particle may reduce the flexibility of the heating blanket 54. In this regard, the ferromagnetic 84 or superparamagnetic particles 86 may be as large as practical but may be limited to approximately 45% by volume of the matrix 78 and, more preferably, may be limited to less than 20% by volume of the matrix 78 in order to retain flexibility of the heating blanket 54.

In each of the above-described embodiments including the induction heating embodiment illustrated in FIGS. 4-6G and the hysteretic heating and relaxation heating embodiments comprising, respectively, ferromagnetic 84 and superparamagnetic particles 86 illustrated in FIGS. 7-8F, magnetic materials for each of the configurations may be selected depending upon the desired temperature of the structure 10 (FIG. 1) to be heated. For example, magnetic materials may be available for temperature ranges from approximately 150° F. to approximately 2050° F. by selecting magnetic materials having appropriate Curie temperatures. However, magnetic materials for each of the configurations may be selected to provide heat at any temperature or within any temperature range.

In the above-described heating blanket 54 (FIG. 4) configurations, uniform heating of a structure 10 (FIG. 1) may be attainable by virtue of the rate of heat reduction and the ability to maintain a desired temperature being dependent upon the temperature at any location of the heating blanket 54. More specifically, the temperature of the heating blanket 54 is dependent upon the temperature of the adjacent location of the structure 10 that is in thermal contact with the heating blanket 54. The Curie temperature may be selected to correspond to the desired article temperature. For example, for a composite structure 10 (FIG. 1) formed of graphite-epoxy and/or fiberglass composite material, a patch 40 (FIG. 3) formed in a composite skin 12 (FIG. 3) thickness of one-half inch will include a bondline 46 (FIG. 3) that may be generally cooler than the temperature at the interface of the heating blanket 54 with the composite structure 10 (FIG. 1).

Locations in the rework area 20 (FIG. 3) such as the bondline 46 (FIG. 3) that have attained the adhesive curing temperatures may continue to receive a diminished level of heat that is sufficient to maintain the temperature of the magnetic material and heating blanket 54 (FIG. 4) at the Curie temperature or at the hysteretic temperature for the hysteretic heating configuration. Locations in the patch 40 (FIG. 3) that are at a relatively lower temperatures as a result of a heat sink 28 (FIG. 3) or other thermal variations may continue to receive heat at a greater rate until reaching the adhesive curing temperature or composite material curing temperature which may be selected to be close to the Curie temperature of the magnetic material in the heating blanket 54. Advantageously, once the magnetic materials are selected and assembled with the blanket assembly 52 (FIG. 4), the heating blanket 54 may be operated substantially autonomously to uniformly heat the structure 10 (FIG. 3) without manual control of the temperature of the heating blanket. In this manner, the heating blanket 54 provides a means for uniformly heating the structure 10 (FIG. 3) without overheating or under heating any locations.

Figure 9:
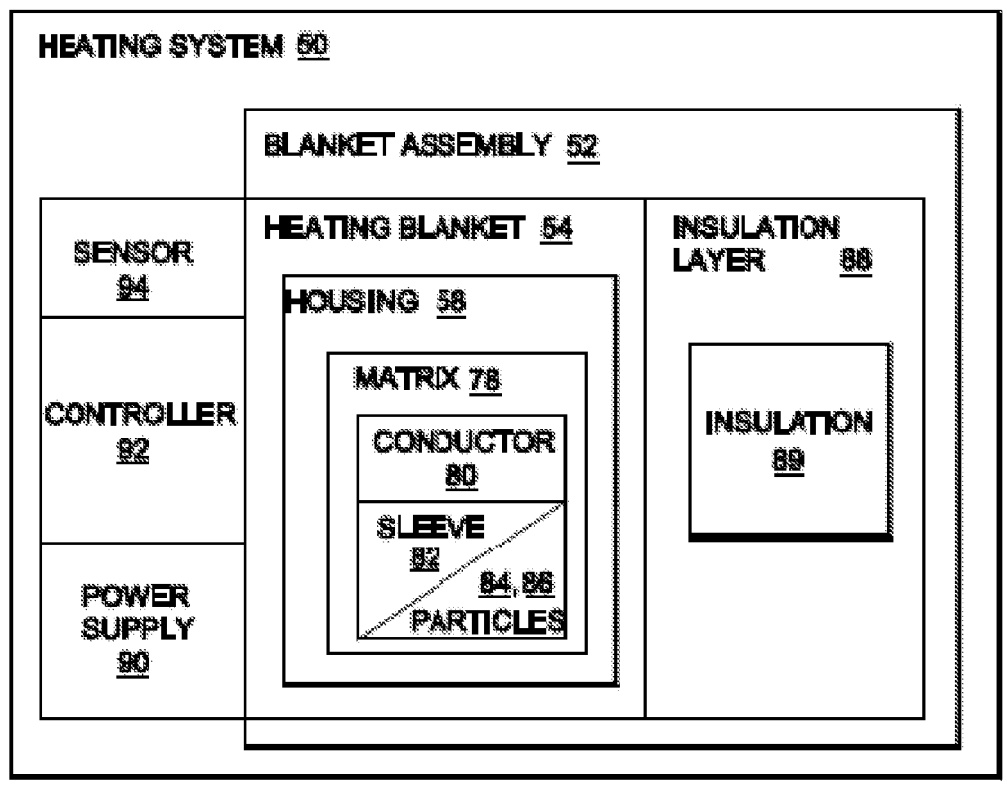
FIG. 9 is an illustration of a functional block diagram of a heating system comprising a blanket assembly which may be powered by a power supply.

Referring briefly to FIG. 9, shown is a block diagram illustrating a heating system 50 as may be implemented in any one of the configurations described above. The heating system 50 may include a blanket assembly 52 which may comprise a heating blanket 54 and insulation layer 88 applied thereto. The heating blanket 54 may include a housing 58 which may form an interior for housing 58 the conductor 80 and the magnetic material in any one of the above-described configurations. The housing 58 may include a matrix 78 through which the conductor 80 may be extended. The conductor 80 may include the susceptor sleeve 82 extending along a length of the conductor 80. The susceptor sleeve 82 may be formed as a continuous tube or cylinder extending along the conductor 80 or as a flexible braided sleeve extending along the conductor 80. The susceptor sleeve 82 may preferably, but optionally, be disposed in non-electrically contacting relation to the conductor 80 along any portion thereof.

Referring still to FIG. 9, in a further configuration, the heating blanket 54 may include ferromagnetic particles 84 embedded in the matrix 78 which are exposed to a magnetic field that is generated when the alternating current is applied to the conductor 80. Ferromagnetic particles 84 may be selected to have a Curie temperature that is greater than the desired temperature of the structure to be heated. In this regard, the ferromagnetic particles 84 preferably have high hysteresis losses when exposed to the magnetic field. The Curie temperature of the ferromagnetic particles 84 is preferably greater than the desired temperature of the structure to be heated in consideration of the reduction in hysteresis losses to relatively low levels below the Curie temperature as described above. The matrix 78 may also include superparamagnetic particles 86 embedded within the matrix 78 for heating by relaxation at a rate and within a temperature range corresponding to the size or diameter of the superparamagnetic particles 86 and the frequency of the alternating current.

The heating blanket 54 may include the insulation layer 88 which may be bonded to one of the upper and lower face sheets 62, 64 (FIG. 4). The insulation layer 88 may include any suitable insulation 89 such as, without limitation, silicone. The insulation layer 88 may prevent heat losses to the environment on the side of the heating blanket 54 opposite the structure. The blanket assembly 52 may be connected to a power supply 90 for providing alternating current to the conductor 80 which may be connected to a controller 92 and/or a sensor 94 for controlling the power supply 90 and sensing the voltage thereof.

Figure 10:
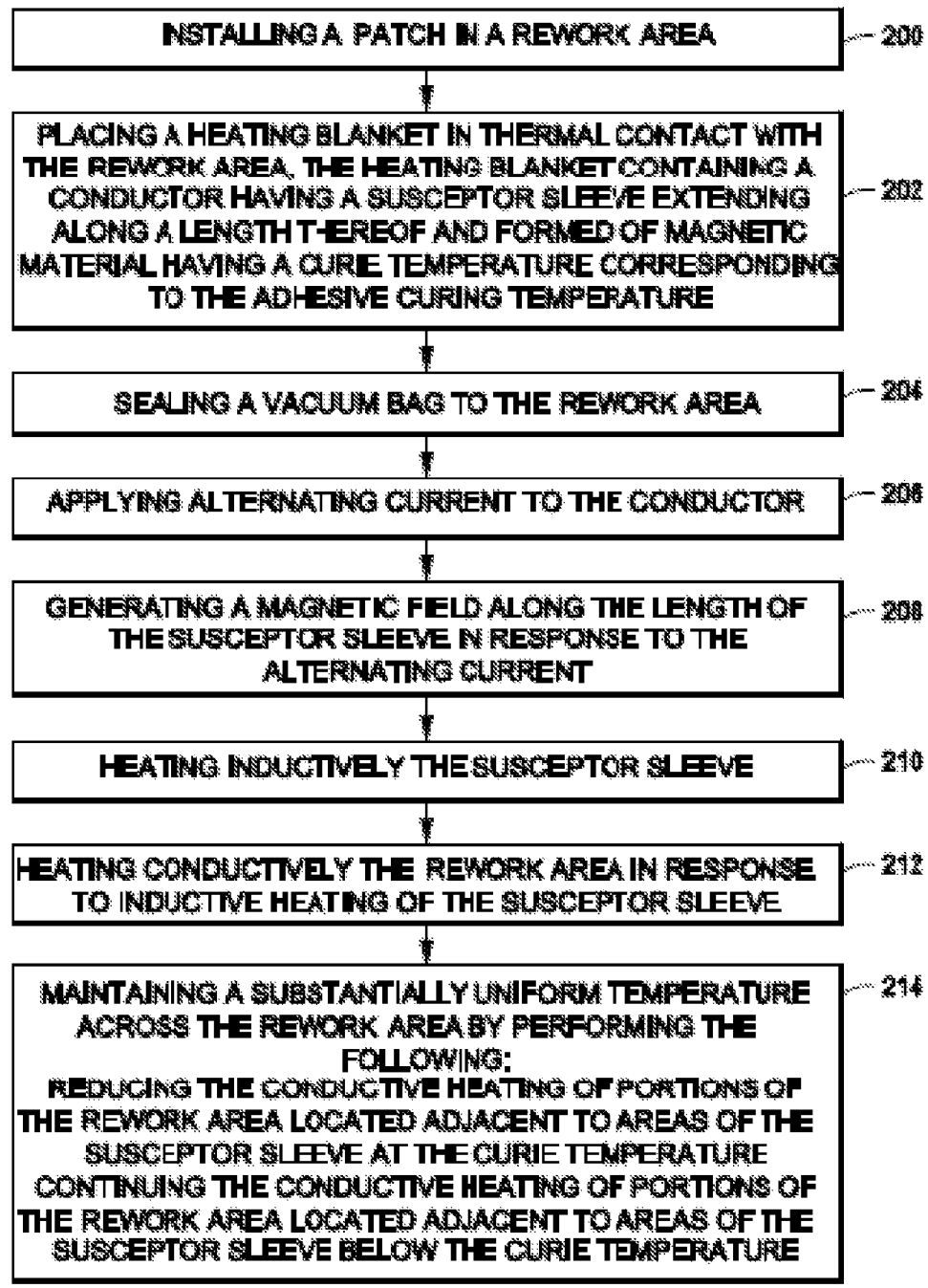
FIG. 10 is an illustration of a flow diagram of a methodology of uniformly heating a composite structure rework area by inductively heating a susceptor sleeve mounted to a conductor upon the application of alternating current thereto.

Referring to FIG. 10, shown is an illustration of a methodology for heating a structure 10 (FIG. 3) such as a composite structure 10 using a heating blanket 54 (FIG. 4) having a susceptor sleeve 82 (FIG. 4) extended along a conductor 80 (FIG. 4). The method may comprise preparing the structure 10 (FIG. 3) for the heating blanket such as by installing a patch 40 (FIG. 1) in a rework area 20 (FIG. 3) of the composite structure 10. Adhesive may be applied between the patch 40 (FIG. 1) and the rework area 20 (FIG. 1) for which the heating blanket 54 may be employed to increase the curing temperature in step 200. In step 202, the heating blanket 54 may be placed in thermal contact with the rework area 20 (FIG. 1). As indicated above, the susceptor sleeve 82 (FIG. 4) may be formed of a magnetic material having a Curie temperature that corresponds to the desired temperature of the structure 10. For example, the Curie temperature may correspond to the adhesive curing temperature for bonding the patch 40 to the rework area 20 (FIG. 1).

Upon application of the heating blanket 54 to the structure 10 (FIG. 3), a vacuum bag assembly 100 (FIG. 2) may be applied to seal the rework area 20 (FIG. 1) to the composite structure 10 (FIG. 3) in step 204. Alternating current may be applied to the conductor in step 206 in order to generate a magnetic field 96 (FIG. 6) in step 208 which may extend along the length of the susceptor sleeve 82 (FIG. 4) in response to the application of the alternating current. Step 210 may comprise heating the susceptor sleeve 82 inductively in response to the magnetic field. The heating rate may be increased by increasing the frequency and/or or amplitude of the alternating current. However, the alternating current may be maintained below a predetermined level to minimize inductive heating of adjacent structure 10 (FIG. 3) and to minimize uncontrolled resistive heating of the conductor 80 (FIG. 4).

Step 212 may comprise heating the rework area 20 (FIG. 1) due to thermal conduction of the heat from the heating blanket 54 (FIG. 4) into the structure 10 (FIG. 3). The heat from the inductively heated susceptor sleeve 82 (FIG. 4) is transmitted from the matrix 78 surrounding the susceptor sleeve 82 into the structure 10 to which the heating blanket is mounted. The method may further comprise altering the rate of inductive heating of the susceptor sleeve 82 (FIG. 4) by adjusting the frequency of the altering current applied to the conductor 80 (FIG. 4). Step 214 may comprise maintaining a substantially uniform temperature such as at the approximate Curie temperature of the susceptor sleeve 82 (FIG. 4) without substantial variation across the rework area 20 (FIG. 1).

The step of maintaining the uniform temperature may include reducing the conductive heating of those portions of the rework area 20 (FIG. 1) that are located adjacent to the areas of the susceptor sleeve 82 (FIG. 4) that have become non-magnetic upon attaining the Curie temperature. In this regard, the inductive heating of the susceptor sleeve 82 may be reduced in correspondence to a reduction in the voltage occurring across the conductor 80 (FIG. 4) due to the relatively constant alternating current that may be provided by the power supply 90 (FIG. 4). More specifically, during operation, the susceptor sleeve 82 imposes an impedance to the electric current in the conductor 80. The impedance to the electric current is overcome by the constant current power supply 90. The impedance decreases when the Curie temperature of the susceptor sleeve 82 is attained allowing the power supply 90 to reduce the voltage in the conductor 80 to maintain the constant current. The reduction of voltage across the conductor 80 (FIG. 4) may be such that the susceptor sleeve 82 (FIG. 4) is maintained at the Curie temperature. In this manner, the structure 10 (FIG. 3) may be uniformly heated by reducing the inductive heating of the portions of the susceptor sleeve that are at the Curie temperature while continuing the inductive heating of the portions of the susceptor sleeve 82 (FIG. 4) that are below the Curie temperature.

The magnetic material for the susceptor sleeve 82 (FIG. 4) may be selected such that the Curie temperature thereof corresponds to the desired temperature of the structure 10 (FIG. 3). For example, in applying heat to a patch 40 (FIG. 3) being adhesively bonded to a rework area 20 (FIG. 1), the Curie temperature preferably corresponds to the adhesive curing temperature. As the temperature of the adhesive approaches the Curie temperature, the inductive heating of the susceptor sleeve 82 (FIG. 4) may be reduced by an autonomous reduction in the voltage across the conductor 80 (FIG. 4) while maintaining the alternating current at a constant level. The conductor 80 (FIG. 4) voltage may be automatically monitored by the constant current power supply 90 such that upon attainment of the desired temperature (i.e., adhesive curing temperature), the conductor 80 voltage may stabilize at a reduced level. The heating blanket 54 (FIG. 4) may include an indicating mechanism such as a blinking light or other suitable device to indicate attainment of the desired temperature when the conductor 80 voltage stabilizes. In this regard, certain portions of the structure 10 (FIG. 3) may attain the desired temperature prior to other portions of the other structure 10. The inductive heating of the portions of the susceptor sleeve 82 (FIG. 4) located proximate the portions of the structure 10 that have attained the desired temperature may be reduced while portions of the structure 10 (FIG. 3) located proximate portions of the susceptor sleeve 82 that are below the Curie temperature may continue to be heated.

Figure 11:
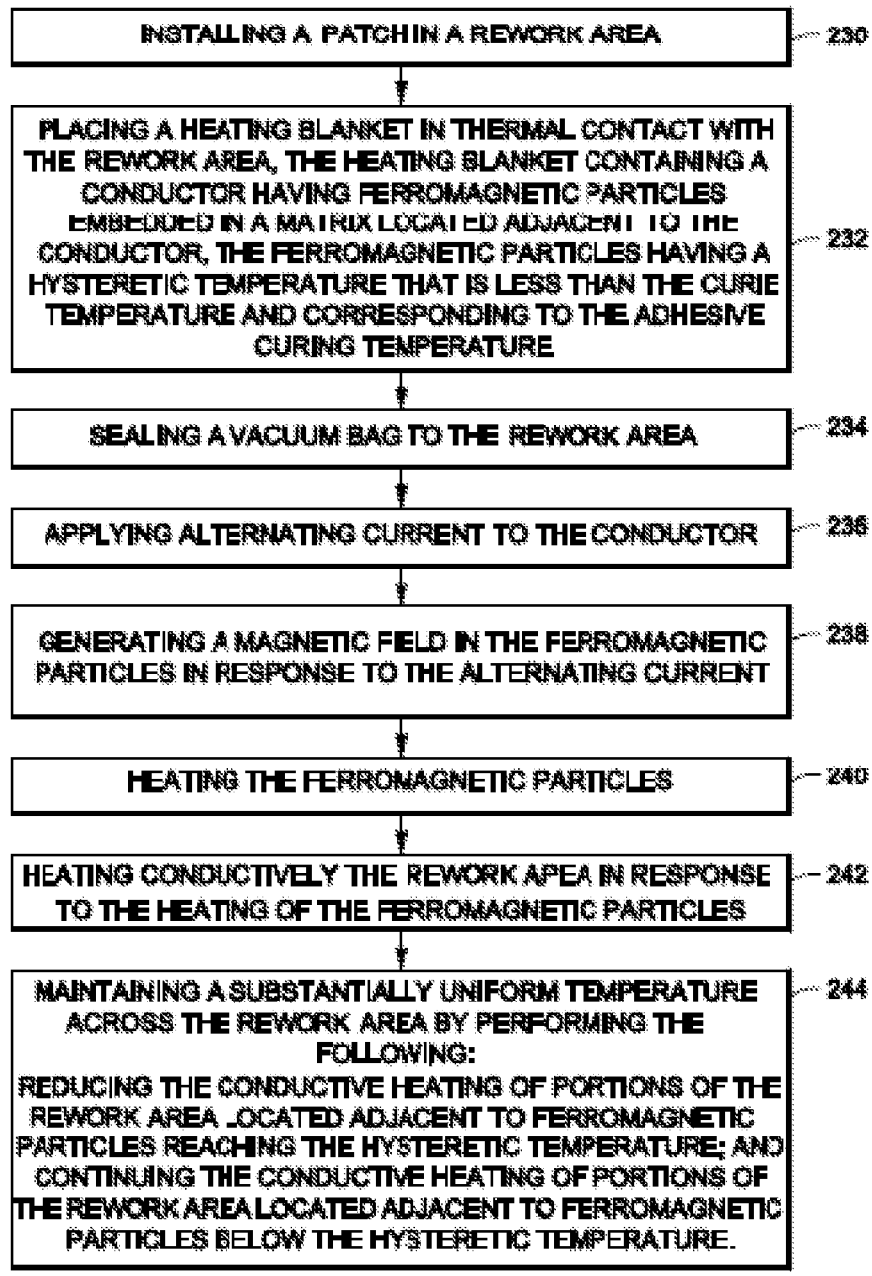
FIG. 11 is an illustration of a flow diagram of a methodology of uniformly heating a composite structure rework area by hysteretic heating of ferromagnetic particles embedded within a matrix surrounding the conductor.

Referring to FIG. 11, shown is an illustration of a flow diagram illustrating a methodology for heating a structure 10 (FIG. 3) such as a composite structure for repair of a rework area 20 (FIG. 1) by hysteretic heating. The method may comprise step 230 of installing the patch 40 (FIG. 3) in the rework area 20 followed by placing the heating blanket 54 (FIG. 4) in thermal contact with the rework area 20 in step 232. As was indicated above, the heating blanket may contain the conductor 80 (FIG. 4) having ferromagnetic particles 84 (FIG. 7) embedded in the matrix 78. The ferromagnetic particles are heated by exposure to the magnetic field generated during application of the alternating current to the conductor 80 (FIG. 4). The ferromagnetic particles 84 are preferably selected such that the hysteretic temperature thereof is less than the Curie temperature and which preferably corresponds to the desired temperature of the structure 10 such as the desired temperature of the adhesive bonding a patch 40 (FIG. 3) to the rework area 20.

Step 234 of FIG. 11 may include sealing the rework area 20 with a vacuum bag 100 (FIG. 3) as described above and applying alternating current to the conductor 80 (FIG. 4) extending through the heating blanket 54 (FIG. 4) in step 236. Step 238 may comprise generating the magnetic field in response to the alternating current such that the ferromagnetic particles 84 (FIG. 7) are exposed thereto. Step 240 may comprise heating the ferromagnetic particles 84 hysteretically wherein the temperature of the ferromagnetic particles 84 increases toward the Curie temperature and wherein the ferromagnetic particles 84 are selected to have high hysteretic losses. Step 242 may comprise heating the rework area 20 (FIG. 1) conductively in response to the hysteretic heating of the ferromagnetic particles 84 within the matrix 78.

Step 244 may include maintaining a substantially uniform temperature across the rework area 20 (FIG. 1) of the structure 10 (FIG. 3) by either reducing the conductive heating for those portions of the rework area 20 (FIG. 1) that are located adjacent to ferromagnetic particles 84 reaching the hysteretic temperature, or, continuing to conductively heat the portions of the rework area 20 (FIG. 1) that are located adjacent to ferromagnetic particles 84 that are below the hysteretic temperature.

Figure 12:
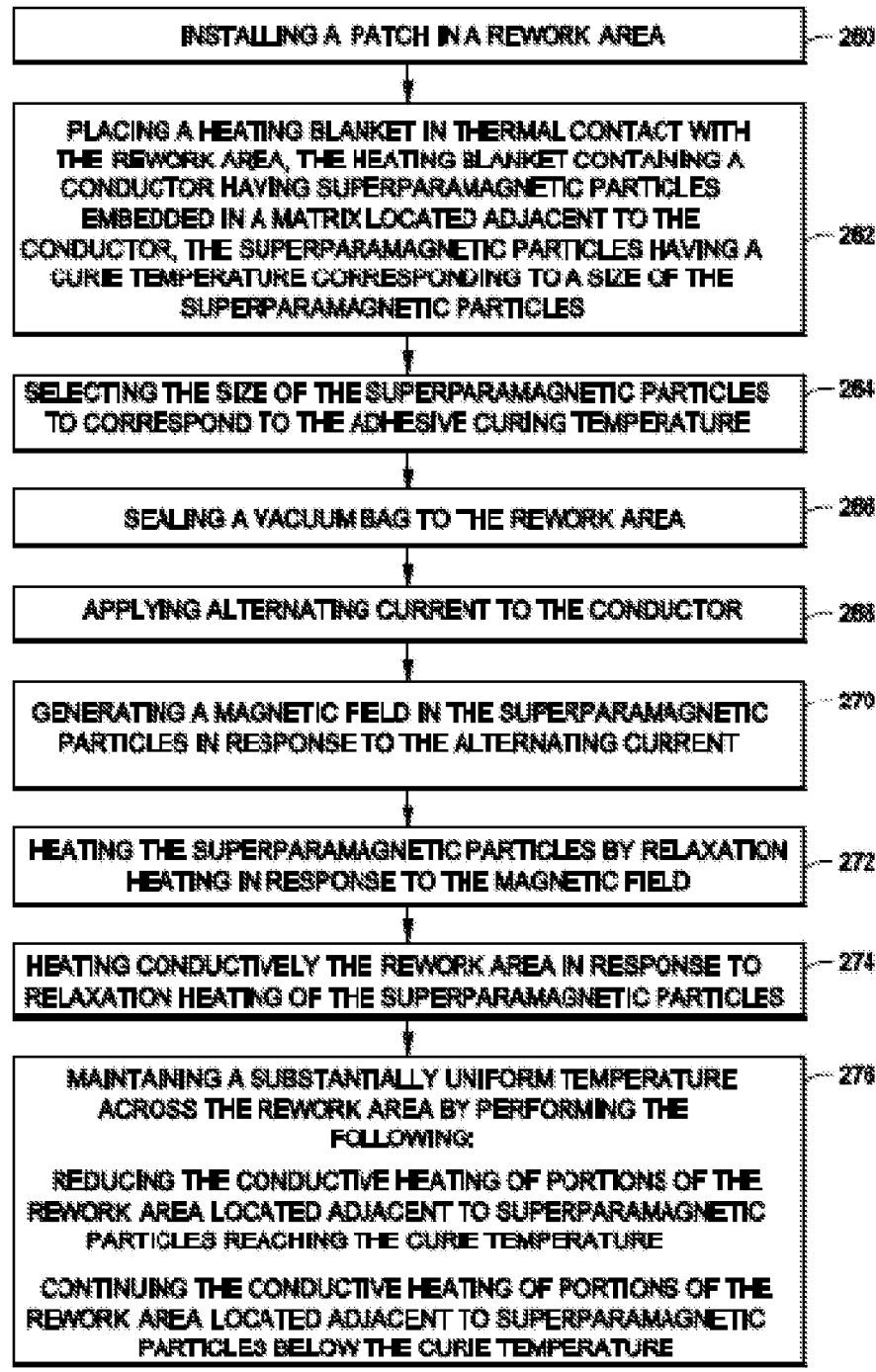
FIG. 12 is an illustration of a flow diagram of a methodology for uniformly heating a composite structure rework area by relaxation heating of superparamagnetic particles embedded within a matrix surrounding the conductor.

Referring to FIG. 12, shown is an illustration of a flow diagram illustrating a methodology for uniformly heating a structure 10 (FIG. 3) such as a composite structure rework area 20 (FIG. 1) to which a patch 40 (FIG. 3) may be bonded using adhesive. The method illustrated in FIG. 11 may include installing the patch 40 in the rework area 20 in step 260 and placing the heating blanket 54 (FIG. 4) in thermal contact with the rework area 20 in step 262 as described above. The heating blanket 54 may include superparamagnetic particles 86 (FIG. 7) embedded in the matrix that are preferably located adjacent to the conductor 80 (FIG. 4) for exposure of superparamagnetic particles 86 to the magnetic field. The superparamagnetic particles 86 preferably have a Curie temperature corresponding to the size of the superparamagnetic particles 86 as was described above.

In this regard, the method may comprise step 264 of selecting the size of the superparamagnetic particles 86 (FIG. 7) to correspond to the desired temperature of the structure (FIG. 3) such as the adhesive curing temperature used in the patch 40 (FIG. 3). For example, the superparamagnetic particles may be selected to have a Curie temperature that comprises a temperature range for relaxation heating thereof. The temperature range preferably corresponds to the desired temperature at which the adhesive in the patch is to be cured or to the desired temperature of another location in the structure 10 (FIG. 3). In this regard, the method may comprise selecting particle sizes of the superparamagnetic particles 86 (FIG. 7) in order to generate heat within a corresponding plurality of Curie temperature ranges. In this manner, the structure 10 (FIG. 3) may be heated at different temperatures corresponding to the plurality of Curie temperatures.

Step 266 may comprise sealing a vacuum bag assembly 100 (FIG. 2) to the rework area 20 (FIG. 1) as described above. Step 268 may comprise applying alternating current to the conductor 80 (FIG. 4) in order to generate the magnetic field in step 270 and to which the superparamagnetic particles (FIG. 7) may be exposed. Step 272 may comprise heating the superparamagnetic particles by relaxation heating. The rework area 20 (FIG. 1) may, in turn, be heated conductively in step 274 in response to the relaxation heating of the superparamagnetic particles. Step 276 of FIG. 12 may include maintaining the substantially uniform temperature across the rework area 20 (FIG. 1) by reducing the conductive heating of the portions of the structure 10 (FIG. 3) of or rework area that are located adjacent to superparamagnetic particles 86 (FIG. 7) that are approaching or nearing attainment of the Curie temperature (i.e., relaxation temperature). The method may further comprise continuing the conductive heating of those portions of the rework area 20 (FIG. 1) that are adjacent to superparamagnetic particles 86 that are below the Curie temperature.

Figure 13:
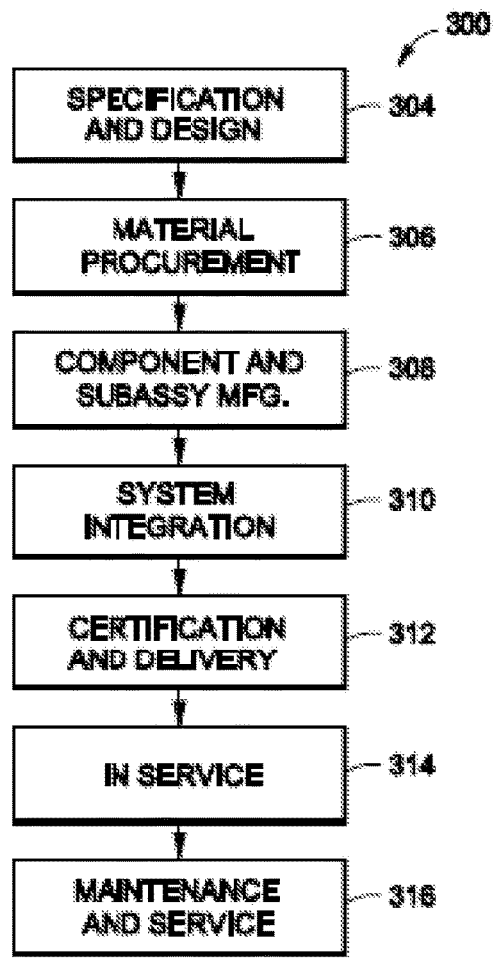
FIG. 13 is an illustration of a flow diagram of an aircraft production and service methodology.
Figure 14:
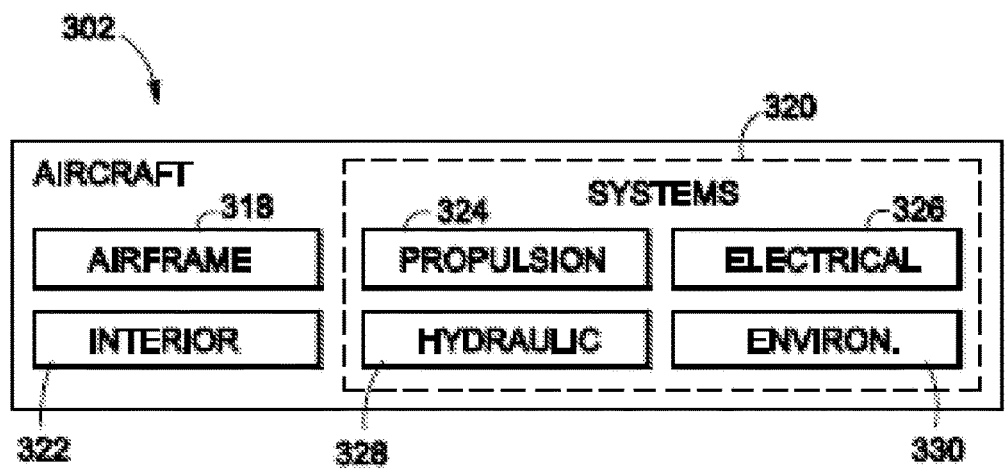
FIG. 14 is an illustration of a block diagram of an aircraft.

Referring to FIGS. 13-14, embodiments of the disclosure may be described in the context of an aircraft manufacturing and service method 300 as shown in FIG. 13 and an aircraft 302 as shown in FIG. 14. During pre-production, exemplary method 300 may include specification and design 304 of the aircraft 302 and material procurement 306. During production, component and subassembly manufacturing 308 and system integration 310 of the aircraft 302 takes place. Thereafter, the aircraft 302 may go through certification and delivery 312 in order to be placed in service 314. While in service 314 by a customer, the aircraft 302 is scheduled for routine maintenance and service 316 (which may also include modification, reconfiguration, refurbishment, and so on).

Each of the processes of method 300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 14, the aircraft 302 produced by exemplary method 300 may include an airframe 318 with a plurality of systems 320 and an interior 322. Examples of high-level systems 320 include one or more of a propulsion system 324, an electrical system 326, a hydraulic system 328, and an environmental system 330. Any number of other systems may be included. Although an aerospace example is shown, the principles of the disclosed embodiments may be applied to other industries, such as the automotive industry.

Apparatus and methods embodied herein may be employed during any one or more of the stages of the production and service method 300. For example, components or subassemblies corresponding to production process 308 may be fabricated or manufactured in a manner similar to components or subassemblies produced while the aircraft 302 is in service 314. Also, one or more apparatus embodiments, method embodiments, or a combination thereof may be utilized during the production stages 308 and 310, for example, by substantially expediting assembly of or reducing the cost of an aircraft 302. Similarly, one or more of apparatus embodiments, method embodiments, or a combination thereof may be utilized while the aircraft 302 is in service 314, for example and without limitation, to maintenance and service 316.

Figure 15:
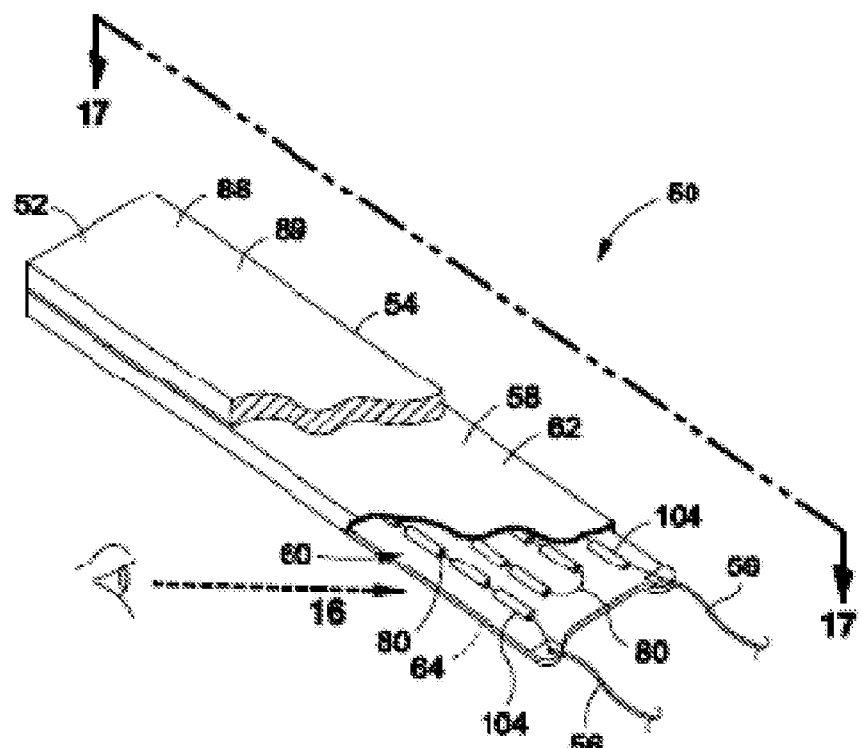
FIG. 15 is a perspective illustration of a heating blanket in an embodiment having a plurality of sleeve segments mounted to the conductor.

Referring to FIG. 15, shown is a further embodiment of the heating blanket 54 having a plurality of sleeve segments 104 mounted on the conductor 80. The sleeve segments 104 may be mounted in end-to-end spaced relation to one another. The conductor 80 and the sleeve segments 104 may be housed within an interior 60 of the housing 58. The housing 58 may be formed of a material that is preferably thermally conductive and which is also preferably resiliently flexible such that the heating blanket 54 may conform to curved surfaces. In an embodiment, the housing 58 may be formed of pliable material having a relatively high thermal conductivity and relatively low electrical conductivity. Non-limiting examples of materials from which the housing 58 may be formed include silicone, rubber, polyurethane and other elastomeric materials which are preferably highly thermally conductive and which are preferably resiliently flexible to allow the heating blanket 54 to conform to a wide variety of surfaces of different curvature.

In an embodiment, the housing 58 may be formed with the upper and lower face sheets 62, 64 defining a generally hollow interior 60 containing the conductor 80 and the sleeve segments 104. Alternatively, the housing 58 may be formed as a homogenous matrix 78 (FIG. 17) material encapsulating the conductor 80 and sleeve segments 104. The conductor 80 may be connected at opposite ends to heating blanket wiring 56. The heating blanket wiring 56 may be coupled to an appropriate power source (FIG. 17) as described below. An insulation layer 88 may be mounted to the heating blanket 54 such as to the upper face sheet 62 of the heating blanket 54. The insulation layer 88 may comprise insulation 89 formed of silicone or other suitable insulative material to minimize heat loss to the environment.

Figure 16:
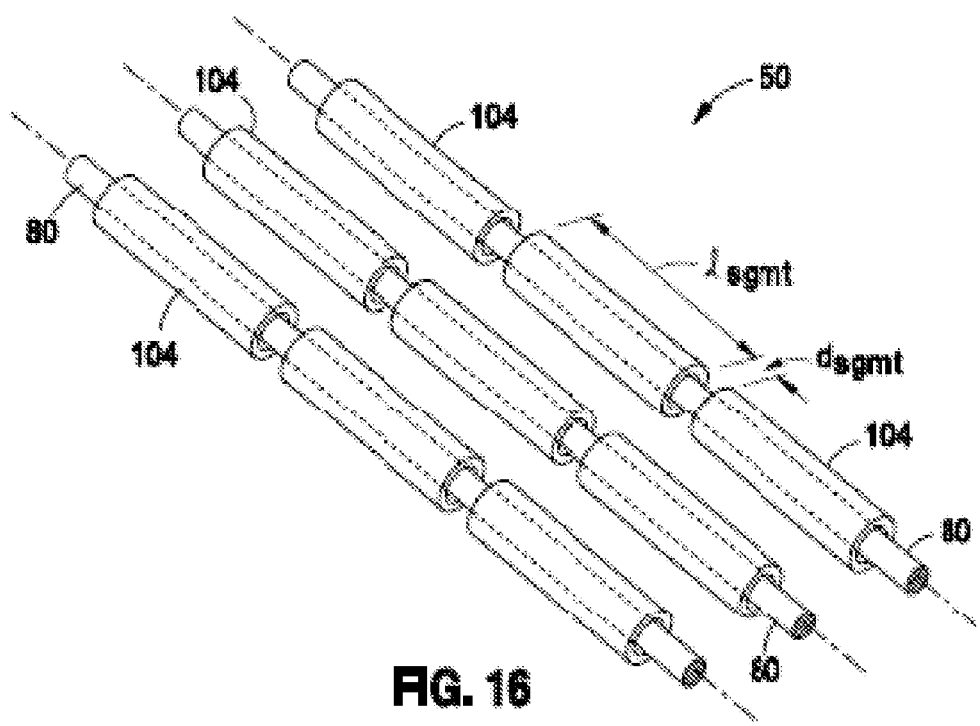
FIG. 16 is a top perspective illustration of the sleeve segments mounted to the conductor.

Referring to FIG. 16, the sleeve segments 104 may be mounted in end-to-end relation to one another on the conductor 80. In an embodiment, the sleeve segments 104 may be mounted in non-contacting end-to-end relation to one another forming a gap $d_{sgmt}$ between the sleeve segments 104 although arrangements are contemplated where at least a portion of the sleeve segments 104 are in contact with one another. The end-to-end spacing or gap $d_{sgmt}$ between adjacent sleeve segments 104 may be less than the length $l_{sgmt}$ of a single sleeve segment 104 although gaps $d_{sgmt}$ between adjacent sleeve segments 104 may be greater than the length $l_{sgmt}$ of an individual one of the sleeve segments 104. Advantageously, the gap $d_{sgmt}$ between the sleeve segments 104 allows the magnetic field 96 (FIG. 20) generated by the conductor to reach the outer surface of each sleeve segment 104 providing increased eddy currents 98 (FIG. 19) to generate heat and increase the overall efficiency of the heating blanket 54 as described in greater detail below. Furthermore, the gap $d_{sgmt}$ between the sleeve segments 104 facilitates the ability of the heating blanket 54 to conform to curved surfaces (not shown). The end-to-end spacing of the sleeve segments 104 may also reduce the weight of the heating blanket 54 relative to the weight of a continuous susceptor sleeve (FIG. 5).

Referring still to FIG. 16, each one of the sleeve segments 104 may be formed in a generally tubular or cylindrical shape. Each sleeve segment 104 may be formed as a seamless tubular element that may be installed on the conductor 80 by sliding over an end of the conductor 80. Alternatively, the sleeve segments 104 may include a slot (not shown) extending axially along a length of the sleeve segment 104 to allow the sleeve segment 104 to be installed over the conductor 80 by passing the conductor 80 through the slot (not shown). Such a slotted sleeve segment (not shown) may optionally be crimped or clamped after installation on the conductor 80 to retain the sleeve segment 104 on the conductor 80. The sleeve segments 104 are preferably mounted in non-contacting relation to the conductor 80 to electrically isolate the sleeve segments 104 from the conductor 80. In an embodiment, each one of the sleeve segment 104 is preferably substantially coaxially mounted to the conductor 80 to facilitate uniform heating of each sleeve segment 104 as described below. However, the sleeve segments 104 may be non-coaxially mounted to the conductor 80.

The material composition of the sleeve segments 104 may be selected based upon the temperature requirements for a given application. In this regard, the material composition of the sleeve segments 104 may be selected such that the Curie temperature of the material corresponds to the temperature requirements of the application. For example, a nickel-iron alloy composition commercially known as Alloy 30 (e.g., approximately 30% nickel-70% iron) may be selected based on the known Curie temperature of approximately 160° F. of such alloy and which may correspond to the desired temperature to which a structure (not shown) may be heated by the heating blanket 54. Other non-limiting examples of material compositions for the sleeve segments 104 include Alloy 32 (e.g., approximately 32% nickel-68% iron) which may have a Curie temperature of approximately 300° F. The sleeve segments 104 may be formed of other alloy compositions based upon the Curie temperature of such compositions and are not limited to nickel-iron compositions. For example, the sleeve segments 104 may be formed of a nickel-iron-molybdenum alloy such as 4% molybdenum Permalloy (e.g., approximately 80% nickel-16% iron-4% molybdenum) having a Curie temperature of approximately 700° F. As may be appreciated, the material for the sleeve segments 104 may be selected from a wide variety of material compositions based on the Curie temperature and other desired magnetization properties of the composition.

Figure 17:
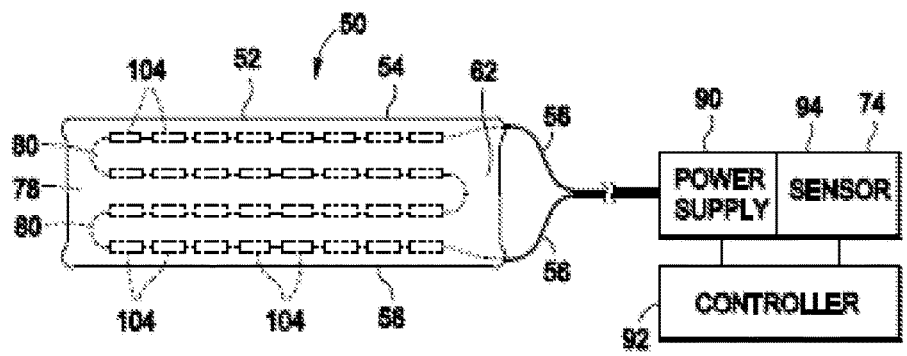
FIG. 17 is a top view schematic illustration of the heating blanket embodiment taken along line 17 of FIG. 15 and illustrating the heating blanket connected to a power supply, a controller, and a sensor.

Referring to FIG. 17, shown is a top view of the heating system 50 including the heating blanket 54 electrically coupled to a power supply 90, a controller 92 and/or a sensor 94. The electrical conductor 80 may be arranged in a meandering formation within an interior 60 (FIG. 15) of the housing 58. However, the conductor 80 may be provided in other arrangements such as in a coil shape (not shown). The conductor 80 is preferably arranged to provide substantially uniform spacing between adjacent portions of the conductor 80 such that substantially uniform heat is generated across a length and a width of the heating blanket 54. The conductor 80 may be formed from a single strand of conductor material or from multiple strands that may be either braided or non-braided. The conductor 80 is preferably formed of flexible material such as litz wire to facilitate the application of the heating blanket 54 to curved surfaces and to improve the electrical conducting efficiency of the conductor 80 in response to electrical current (not shown). In addition, the litz wire may compensate for the tendency of relatively high-frequency alternating electrical current (not shown) to concentrate near the surface of the conductor 80 rather than as a uniform current density throughout a cross section of the conductor 80. The conductor 80 also preferably has relatively low electrical resistance to minimize resistive heating of the conductor 80.

The heating system 50 may include the power supply for providing electrical current 106 (FIG. 19) to the conductor 80. The electrical current 106 is preferably alternating current to produce an alternating magnetic field (FIG. 20) for the sleeve segments 104 causing the sleeve segments 104 to be inductively heated as described below. The power supply 90 may be connected to the conductor 80 by means of the heating blanket wiring 56. The electrical current 106 provided by the power supply 90 is preferably a relatively high frequency alternating current. For example, the alternating current may be in the range of from approximately 1000 Hz (i.e., 1 kHz) to approximately 300,000 Hz (i.e., 300 kHz). In a preferred embodiment, the alternating current may have a frequency of approximately 150 kHz to 250 kHz. The combination of relatively high frequency (e.g., 300 KHz) and relatively high amperage (e.g., 10 amps) current may be avoided in certain applications to prevent unwanted induction heating of structures formed of electrically conductive material such as graphite fibers.

Figure 19:
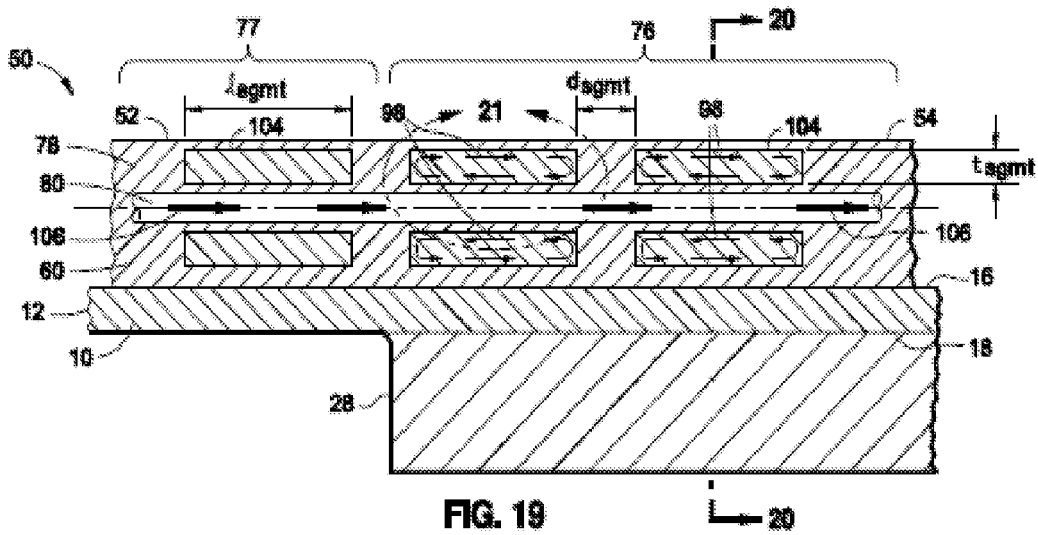
FIG. 19 is a sectional illustration of the heating blanket taken along line 19 of FIG. 18 and illustrating the mounting of the heating blanket on a structure having a heat sink.

Advantageously, a relatively high frequency alternating current may allow for the use of relatively thin-walled sleeve segments 104 (FIG. 19) due to the propensity of the electrical current 106 (FIG. 19) to concentrate near the surface of the sleeve segments 104 as mentioned earlier. For example, alternating current may be provided in any frequency without limitation such as frequency in the megahertz or gigahertz range upon attaining approval of the appropriate regulatory agency (e.g., the Federal Communications Commission). The use of a relatively high frequency current 106 (FIG. 19) would allow for a reduced amperage of the current 106 and would permit the use of relatively thin-walled sleeve segments 104 (FIG. 19). Advantageously, the use of relatively thin-walled sleeve segments 104 may reduce the overall weight and cost of the heating blanket 54 (FIG. 19). In an embodiment where the heating blanket 54 is operated on a 200 kHz alternating current applied to the conductor 80, the sleeve segments 104 may have a wall thickness of 15-30 mils (i.e., 0.015-0.030 inch) and may be formed of a nickel-iron alloy (e.g., 30% nickel-70% iron) having a Curie temperature of approximately 160° F.

The voltage provided by the power supply 90 to the heating blanket 54 conductor 80 may range from approximately 10 volts to approximately 300 volts. The voltage is preferably minimized for safety reasons. In an embodiment, the voltage applied to the conductor 80 is preferably less than 70 volts. The amperage of the electrical current (not shown) is preferably between approximately 1 amp and approximately 1000 amps although higher amperages are contemplated. In a preferred embodiment, the amperage of the electrical current (not shown) is less than approximately 5 amps. The power supply 90 may be operated in a constant-current configuration wherein the voltage across the conductor 80 may decrease as the sleeve segments 104 approach the Curie temperature. The voltage across the conductor 80 may also cease to increase and may be relatively constant upon attainment of the Curie temperature as described in detail below.

Figure 18:
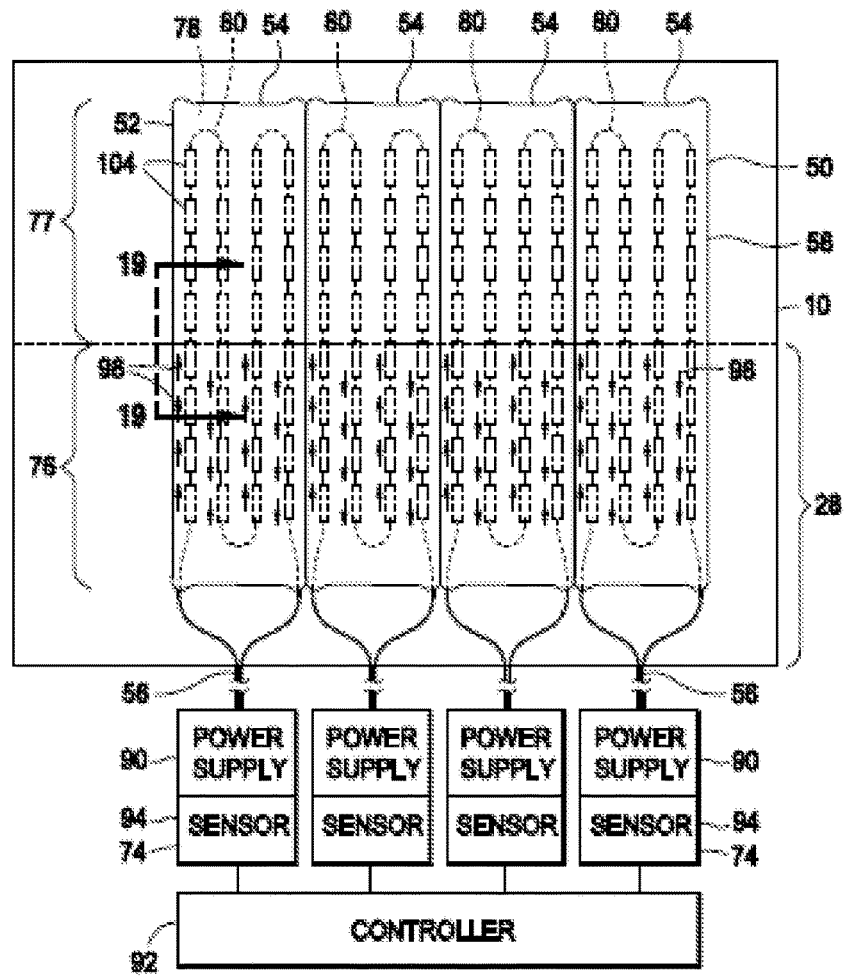
FIG. 18 is a top view illustration of a plurality of the heating blankets arranged in side-by-side relation to one another.

Referring to FIG. 18, shown is an embodiment of the heating system 50 comprising a plurality of (e.g., four) heating blankets 54 arranged side-by-side to one another. In the non-limiting embodiment shown, each one of the heating blankets 54 includes a dedicated power supply 90. Advantageously, by assembling a plurality of heating blankets arranged in side-by-side relation to one another, the length of the conductors 80 can be minimized by breaking the conductor 80 up into a separate conductor 80 for each heating blanket 54. By minimizing the length of each conductor 80, the voltage in the conductor 80 may be minimized as compared to a higher voltage that would be necessary for a single conductor (not shown) having a combined length of the individual conductors 80 of the four heating blankets 54. In a further embodiment, the heating system 50 may be formed as a single large heating blanket (not shown) which may optionally include a plurality of conductors that may be electrically connected in parallel to minimize the voltage.

The heating system 50 illustrated in FIG. 18 may include one or more thermal sensors (not shown) for monitoring the temperature of the heating blanket 54 or the temperature of the structure 10 to which the heating blanket 54 may be placed in contact with. Alternatively, the heating blanket 54 may include a voltage sensor 94 or other device for sensing the level of power provided to each blanket assembly 52 for monitoring the performance of the heating blanket 54. One or more controllers 92 may be included with the heating system 50 to control the operation of each heating blanket 54. For example, the controller 92 may regulate the frequency of the electrical current (not shown) applied to each heating blanket 54 as a means to alter or control the rate of heating of the sleeve segments 104 and thereby control the rate of heating of the structure 10 as described below.

Referring to FIG. 19, shown is a cross section of a portion of the heating blanket 54 and structure 10. The conductor 80 and sleeve segments 104 may be encapsulated within the matrix 78. The matrix 78 may maintain the sleeve segments 104 in fixed position relative to the conductor 80. The matrix 78 may also electrically isolate the sleeve segments 104 from the conductor 80. The heating blanket 54 may be mounted to the upper surface 16 of the structure 10 which may include a heat sink 28 associated with a portion of the structure 10. For the sleeve segments 104 that are below the Curie temperature of the sleeve segment 104 material, the electrical current 106 flowing though the conductor 80 produces the magnetic field 96 (FIG. 20) which generates eddy currents 98 (FIG. 19) in the sleeve segments 104 causing inductive heating of the sleeve segments 104.

Figure 20:
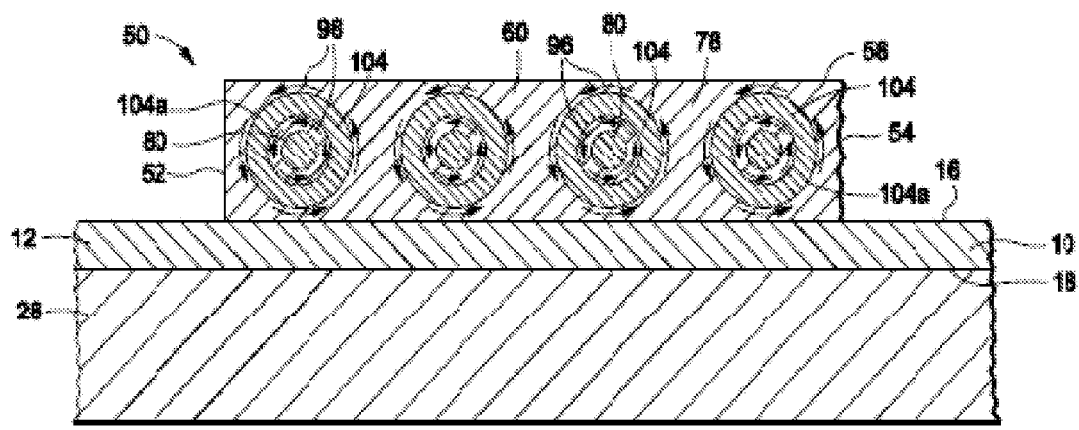
FIG. 20 is a sectional illustration of the heating blanket taken along line 20 of FIG. 19 and illustrating a magnetic field encircling the sleeve segments.

In this regard, FIG. 19 illustrates a magnetic portion 76 of the heating blanket 54 wherein the two right-most sleeve segments 104 may be at a temperature that is lower than the Curie temperature as a result of the heat sink 28 drawing heat from the heating blanket 54. As shown in FIG. 20, the magnetic field 96 circulates circumferentially around the conductor 80 and is generated by the electrical current 106 (FIG. 19) flowing through the conductor 80. FIG. 19 shows the eddy currents 98 circulating within each sleeve segment 104 and which result from the magnetic field 96 (FIG. 20). The eddy currents 98 cause inductive heating of the sleeve segments 104. The sleeve segments 104 may be sized to have a length $l_{sgmt}$ that results in the eddy currents 98 circulating predominantly along an axial direction of the sleeve segments 104. Advantageously, the end-to-end spacing or gap $d_{sgmt}$ between the sleeve segments 104 allows the magnetic field 96 (FIG. 20) generated by the conductor 80 to reach the outer surface of each sleeve segment 104 resulting in the eddy currents 98 circulating along the directions shown in FIG. 19.

In FIG. 19, in the non-magnetic portion 77 of the heating blanket 54, the single sleeve segment 104 may have attained the Curie temperature prior to the two sleeve segments 104 in the magnetic portion 76 due to lack of a heat sink 28 under the non-magnetic portion 77 of the heating blanket 54. The attainment of the Curie temperature in the sleeve segment 104 in the non-magnetic portion 77 results in the sleeve segment 104 losing its magnetic properties. The non-magnetic condition of the sleeve segment 104 thereby prevents the generation of eddy currents 98 in the sleeve segment 104 resulting in a reduction or cessation of the inductive heating of the sleeve segment 104.

FIG. 20 is a cross section of the heating blanket 54 showing the orientation of the sleeve segments 104 mounted to the conductor 80. The magnetic fields 96 are generated circumferentially around each sleeve segment 104 as a result of the electrical current 106 (FIG. 19) flowing through the conductor 80. Each one of the sleeve segments 104 may be surrounded by the matrix 78 which electrically isolates the sleeve segments 104 from the conductor 80. The matrix 78 absorbs heat from the inductively heated sleeve segments 104 and conducts the heat into the skin 12. Although the sleeve segments 104 are illustrated as being generally coaxially mounted to the conductor 80, one or more of the sleeve segments 104 may be non-coaxially mounted to the conductor 80 such that one side of the sleeve segment 104 may be closer to the conductor 80 than a diametrically opposite side of the same sleeve segment 104. Advantageously, the non-coaxial mounting of one or more of the sleeve segments 104 results in the same net heating of the sleeve segment 104 relative to a coaxially-mounted sleeve segment 104. More specifically, for a non-coaxially mounted sleeve segment 104, one side of the sleeve segment 104 may produce a greater amount of heat than the diametrically opposite side of the sleeve segment 104 with the net result of the same heat output as a coaxially-mounted sleeve segment 104.

Figure 21:
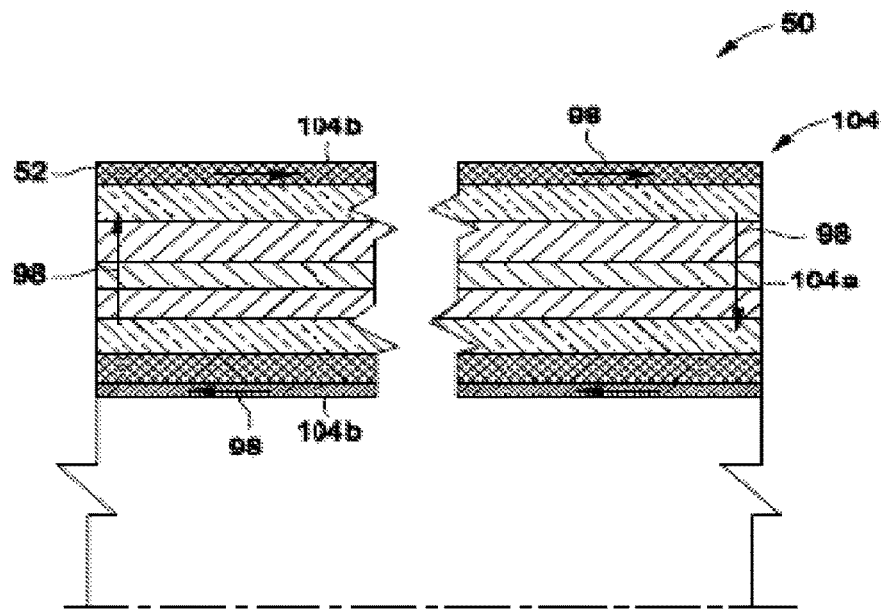
FIG. 21 is a sectional illustration of one of the sleeve segments taken along line 21 of FIG. 19 and illustrating eddy currents circulating predominantly along an axial direction of the sleeve segments.
Figure 22:
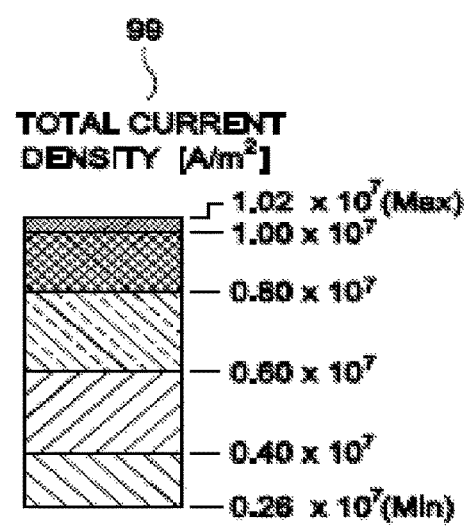
FIG. 22 is a legend illustrating the current density corresponding to the current density distribution in the sleeve segment of FIG. 21.

FIG. 21 is a cross section of the sleeve segment 104 of FIG. 19 and illustrating the distribution of eddy currents 98 through the sleeve segment 104. FIG. 22 is a legend indicating total current density 99 corresponding to different locations through the segment wall thickness $t_{sgmt}$ (FIG. 19) of the sleeve segment 104. A relatively high-frequency alternating electrical current 106 (FIG. 19) flowing through the conductor 80 (FIG. 19) causes the concentration of eddy currents 98 near the segment surfaces 104a of the sleeve segment 104 rather than a uniform current density distribution through the cross section of the sleeve segment 104. During testing of an embodiment of the heating blanket 54 (FIG. 19), it was determined that the segment surfaces 104a of the sleeve segments 104 had a current density of approximately $1.00 \times 10^7$ amps/meter$^2$ (i.e., A/m$^2$). In contrast, the segment interior 104b of the sleeve segments 104 had a current density of approximately $0.26 \times 10^7$ A/m$^2$. Advantageously, because resistance heating in a conductor is proportional to amperage squared times electrical resistance, the high concentration of the eddy currents 98 near the relatively small cross sectional area at the segment surfaces 104a results in increased heating of the segment surfaces 104a relative to the case where the eddy currents 98 are concentrated in the segment interior 104b. When the Curie point of the sleeve segments 104 is attained, the electrical currents are more concentrated in the segment interior 104b of the sleeve segments 104 such that that eddy currents 98 on the segment surfaces 104a interfere with and diminish the eddy currents (not shown) travelling in the opposite direction (not shown) in the segment interior 104b resulting in reduced heating of the sleeve segments 104.

Figure 23:
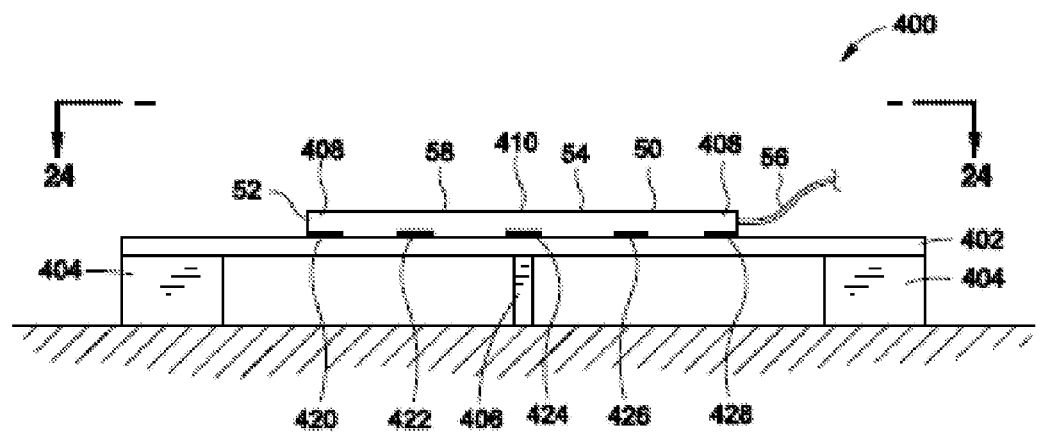
FIG. 23 is a side view schematic illustration of a test setup of a heating blanket having sleeve segments and being mounted to a graphite epoxy panel supported by metallic heat sinks and a graphite/composite heat sink.
Figure 24:
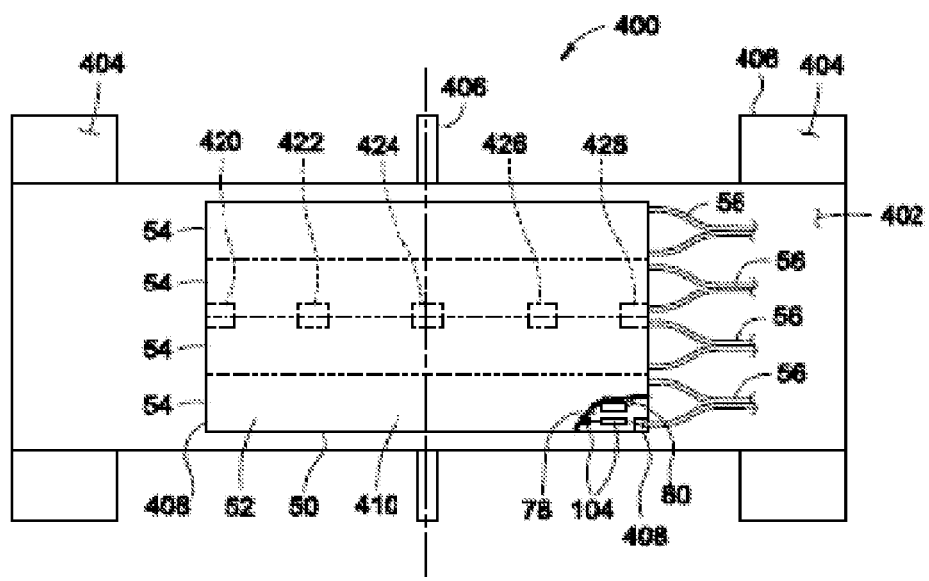
FIG. 24 is a top view schematic illustration of the test set of FIG. 23 showing the location of thermocouples for monitoring the temperature of the heating blanket.

FIGS. 23-24 are schematic illustrations of a test setup 400 for testing an embodiment of the heating blanket 54. The test setup 400 included a 0.1 inch thick graphite/epoxy panel 402 having a width of approximately 6 inches and a length of approximately 18 inches supported at opposing ends 408 by a metallic heat sink 404 to simulate a large structure (not shown). In the test setup 400, a center 410 of the graphite/epoxy panel 402 was supported by a graphite/composite heat sink 406. A heating system 50 comprised of four side-by-side heating blankets 54 was mounted over the graphite/epoxy panel 402. Each heating blanket 54 measured approximately 2 inches in width and 10 inches in length resulting in a combined width of 8 inches and a length of 10 inches.

The heating blankets 54 under test collectively included approximately 1600 sleeve segments (not shown) formed of Alloy 30 (e.g., approximately 30% nickel-70% iron) having a Curie temperature 430 (FIG. 25) of approximately 160° F. Each sleeve segment (not shown) had a wall thickness of approximately 20 mils (i.e., 0.020 inch). The sleeve segments (not shown) were mounted to the conductors (not shown) of each one of the heating blankets 54 similar to the embodiment shown in FIG. 18. In FIGS. 23-24, thermocouples TC101 (reference number 420) and TC105 (reference number 428) were located under the heating blanket 54 at the ends of the heating blanket 54 near the metallic heat sinks 404 for monitoring the temperature of the heating blankets 54. A thermocouple TC3 (reference number 424) was positioned under the heating blanket 54 over the graphite/composite heat sink 406. Thermocouple TC102 (reference number 422) was located between thermocouples TC101 and TC103 (reference numbers 420, 424). Thermocouple TC104 (reference number 426) was located between thermocouples TC103 and TC105 (reference numbers 424, 428). Alternating current (not shown) was applied to the heating blankets 54 to determine the temperature control capability of the heating blankets 54.

Figure 25:
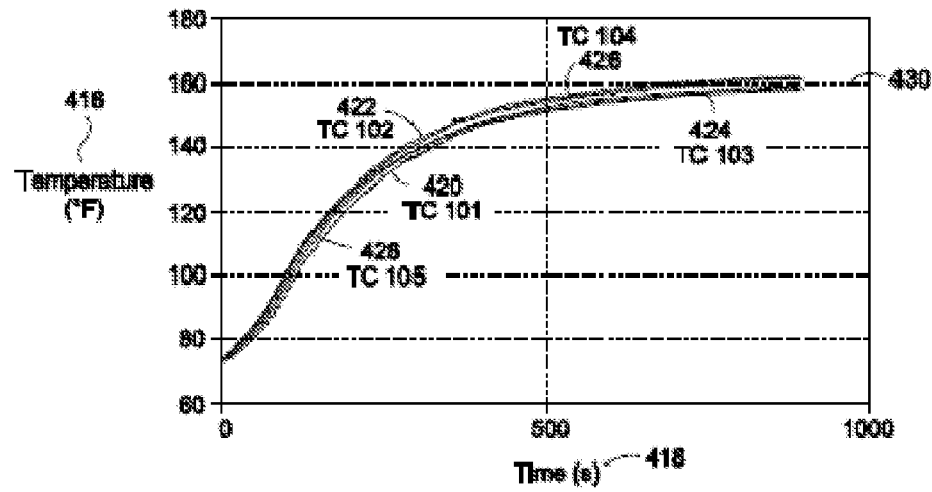
FIG. 25 is an illustration of a plot of experimental temperature data over time as measured by the thermocouples.

FIG. 25 illustrates a plot of the temperature-time 416, 418 history of the graphite/epoxy panel 402 (FIGS. 23-24) as measured by the thermocouples TC101, TC102, TC103, TC104, and TC105 respectively indicated by reference numerals 420, 422, 424, 426, and 428 during an approximate 15 minute time period prior to reaching equilibrium at the Curie temperature 430 at the monitored locations. The plot of FIG. 25 illustrates that equilibrium temperatures of approximately 158° F. were reached at the portions of the heating blanket 54 (FIG. 23-24) near the metallic heat sinks 404 (FIGS. 23-24) as measured by thermocouples TC101 and TC105 respectively indicated by reference numerals 420, 428. An equilibrium temperature of approximately 158° F. was also reached at the portion of the heating blanket 54 (FIG. 23-24) near the graphite/composite heat sink 406 (FIGS. 23-24) as measured by thermocouple TC103 indicated by reference numeral 424. An equilibrium temperature of approximately 161° F. was reached at the location of thermocouples TC102 and TC104 (FIGS. 23-24) respectively indicated by reference numerals 422, 426. In this regard, the plot illustrates the capability of the heating blankets (FIGS. 23-24) to maintain the temperature of the graphite/epoxy panel 402 (FIGS. 23-24) within approximately 3° F. in the presence of heat sinks 404, 406 (FIGS. 23-24) at the center 410 and ends 408 (FIGS. 23-24) of the heating blankets 54 (FIGS. 23-24).

Figure 26:
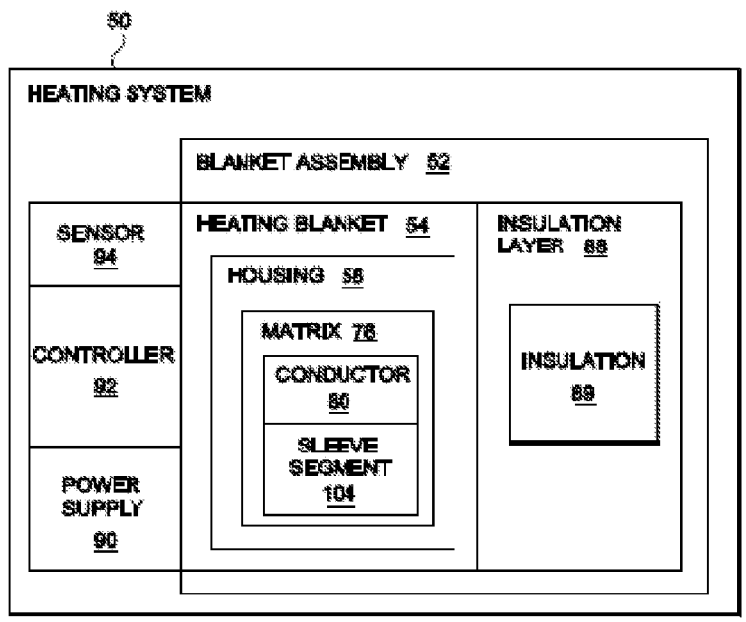
FIG. 26 is an illustration of a functional block diagram of a heating system comprising a heating assembly including a heating blanket having sleeve segments.

Referring to FIG. 26, shown is a block diagram of a heating system 50 comprising a blanket assembly 52 including one or more heating blankets 54. The heating system 50 may include a power supply 90 for powering the heating blanket 54. If more than one heating blanket 54 is included in the heating system 50, a power supply 90 may be provided with each heating blanket 54. The heating system 50 may further include one or more sensors 94 such as a thermal sensor (not shown). A controller 92 may also be included for regulating the operation of each heating blanket 54. Each heating blanket 54 may include a housing 58 for containing a conductor 80 and a plurality of sleeve segments 104 mounted to the conductor 80. The housing 58 may include matrix 78 material for encapsulating the conductor 80 and sleeve segments 104 and for conductively transferring thermal energy from the sleeve segments 104 to a structure (not shown) to which the heating system 50 may be mounted. An insulation layer 88 comprising a suitable insulation 89 may be included with each heating blanket 54 to improve the heating efficiency of the heating blanket 54.

Figure 27:
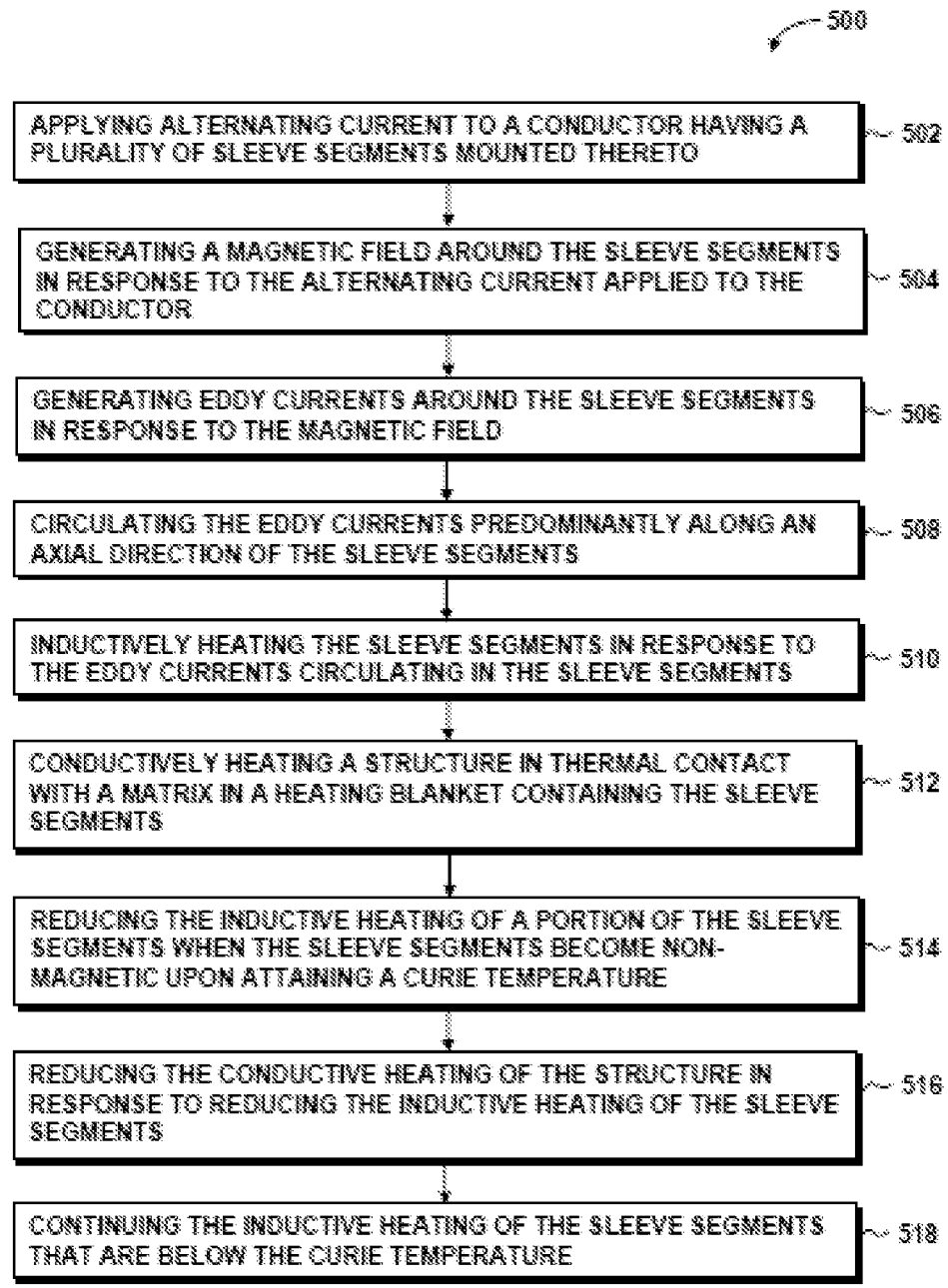
FIG. 27 is an illustration of a flow diagram of a methodology of heating a structure using a heating blanket having sleeve segments mounted to a conductor.

Referring to FIG. 27, shown is a flow diagram illustrating a methodology 500 of heating a structure 10 (FIG. 15) using a heating blanket 54 (FIG. 15). The methodology 500 illustrated in FIG. 27 may further include any of the above-described steps of heating a structure 10 (FIG. 15) for the heating blanket 54 embodiments illustrated in FIGS. 1-12 and FIGS. 28-37. In the methodology 500 of FIG. 27, the heating blanket 54 may include a plurality of sleeve segments 104 (FIG. 15) mounted to a conductor 80 (FIG. 15) housed within a housing 58 (FIG. 15). The housing 58 may include a matrix 78 (FIG. 15) for encapsulating the sleeve segments 104 and the conductor 80.

Step 502 of FIG. 27 may include applying electrical current 106 (FIG. 19) to the conductor 80 (FIG. 19). The electrical current 106 may be an alternating current. The alternating current preferably has a relatively high frequency to improve the heating efficiency of the sleeve segments 104 (FIG. 19) by concentrating the current density at the surfaces of the sleeve segments 104. The alternating current may be provided at a frequency of between approximately 1 kHz and 300 kHz and, more preferably, at a frequency of between approximately 150 kHz and 250 kHz.

Step 504 of FIG. 27 may include generating the magnetic field 96 (FIG. 20) around the sleeve segments 104 (FIG. 20). The magnetic field 96 may be generated in response to the application of electrical current 106 (FIG. 19) to the conductor 80 (FIG. 19).

Step 506 may include generating eddy currents 98 (FIG. 19) around the sleeve segments 104 (FIG. 19) in response to the magnetic field 96 (FIG. 20). The eddy currents 98 are generated in sleeve segments 104 that are at a temperature below the Curie temperature.

Step 508 of FIG. 27 may include circulating the eddy currents 98 (FIG. 19) through the sleeve segments 104 (FIG. 20). The eddy currents 98 may circulate around the sleeve segments 104 predominantly along an axial direction of the sleeve segments 104 as illustrated in FIG. 21. The eddy currents 98 may be concentrated toward the surfaces of the sleeve segments 104 due to the application of relatively high frequency alternating electrical current 106 (FIG. 19).

Step 510 of FIG. 27 may include inductively heating the sleeve segments 104 in response to the eddy currents 98 (FIG. 19) circulating in the sleeve segments 104 (FIG. 20). The inductive heating of the sleeve segment 104 may result from resistive losses in the sleeve segments 104. The inductive heating may be concentrated at the surfaces of the sleeve segment 104 due to the concentration of current density at the surfaces.

Step 512 of FIG. 27 may include conductively heating a structure 10 (FIG. 19) that is in thermal contact with the heating blanket 54. The structure 10 may be heated by conduction of heat from the matrix 78 (FIG. 19) to the lower surface 18 interfacing with the structure 10. The matrix 78 may be conductively heated due to contact between the matrix 78 and the sleeve segments 104 (FIG. 20).

Step 514 of FIG. 27 may include reducing the inductive heating of a portion 77 (FIG. 19) of the sleeve segments 104 (FIG. 20) when such sleeve segments 104 become non-magnetic. The sleeve segment 104 may become non-magnetic upon attaining the Curie temperature of the sleeve segments 104 material. Loss of magnetic properties of the sleeve segments 104 at the Curie temperature results in a reduction or cessation in the flow of eddy currents 98 (FIG. 19) through the sleeve segments 104.

Step 516 of FIG. 27 may include reducing the conductive heating of the structure 10 (FIG. 19) in response to reducing the inductive heating of the sleeve segments 104 (FIG. 20). The reduction in inductive heating of the sleeve segments 104 which reduces thermal conduction of heat from the matrix 78 (FIG. 19) to the structure 10 at the structure-heating blanket 19, 54 interface. For the sleeve segments 104 that have attained the Curie temperature, the inductive heating of the sleeve segments 104 may diminish to a level sufficient to maintain the temperature of the sleeve segments 104 at the Curie temperature.

Step 518 of FIG. 27 may include continuing the inductive heating of the portion 76 of the sleeve segments 104 (FIG. 19) that are below the Curie temperature. For example, FIG. 19 illustrates two of the sleeve segments 104 that may be at a temperature that is below the Curie temperature of the sleeve segment 104 material. Such sleeve segments 104 may continue to have circulating eddy currents 98 (FIG. 19) causing associated resistive heating of the sleeve segments 104 until the sleeve segments 104 attain the Curie temperature.

Figure 28:
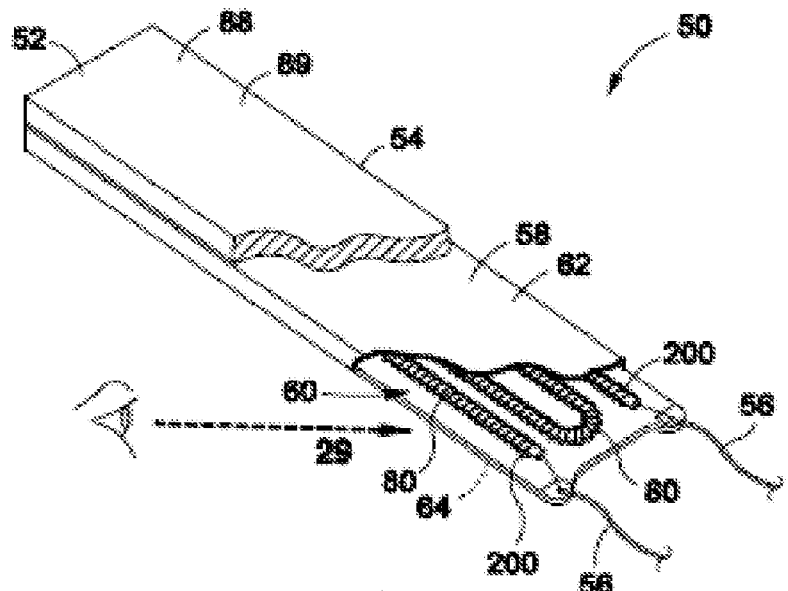
FIG. 28 is a top perspective illustration of a heating blanket in an embodiment having a wire spirally wound around a conductor.

Referring to FIG. 28, shown is a further embodiment of the heating blanket 54 having a wire 200 spirally wound around the conductor 80 instead of the sleeve segments 104 illustrated in the embodiment of FIG. 15. The wire 200 in FIG. 28 may be comprised of magnetic material having a Curie temperature. The wire 200 may be inductively heated to a temperature up to the Curie temperate. The heating blanket 54 may be used for heating a structure 10 (FIG. 31) that may be in thermal contact with the heating blanket 54. The heating blanket 54 embodiment illustrated in FIG. 28 may be similar to the heating blanket embodiment illustrated in FIG. 15 in that the embodiment in FIG. 28 may include the housing 58 formed of flexible material and containing the thermally conductive matrix 78. The heating blanket 54 may optionally include an insulation layer 88 disposed on one of opposing sides of the housing to minimize heat loss and improve the heating efficiency of the heating blanket 54.

The conductor 80 may extend through the matrix 78 (FIG. 30) in a meandering pattern or in other patterns as described above. The conductor 80 may be connected to a power supply 90 (FIG. 30) for generating alternating current. The alternating current may have a frequency of between approximately 1 kHz and 300 kHz and an amperage of between approximately 1 amp and 1000 amps at a voltage of between approximately 10 volts and 300 volts although the current may be provided in frequencies, amperages and voltages outside of such ranges. In a preferred embodiment, the alternating current may have a frequency of between approximately 150 kHz to 250 kHz, an amperage of less than approximately 5 amps, and a voltage of less than approximately 70 volts.

Figure 29:
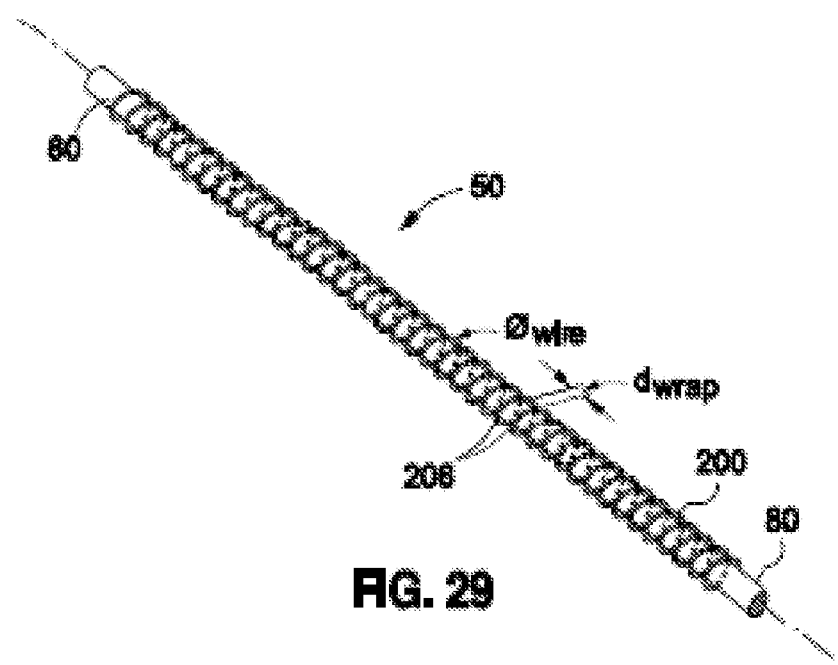
FIG. 29 is a perspective illustration of the wire spirally wound around the conductor.

Referring to FIG. 29, the wire 200 may be spirally wound along the length of the conductor 80 or along any portion thereof. The spirally wound wire 200 may comprise a succession of wire wraps 206 along at least a portion of a length of the conductor 80. The wire 200 may be wound around the conductor 80 such that adjacent ones of the wraps 206 define a gap $d_{warp}$ therebetween of no less than approximately 20 percent of a diameter $\varnothing_{wire}$ of the wire 200. The wire 200 may be provided in a diameter $\varnothing_{wire}$ of between approximately 0.003 and 0.050 inch although the wire 200 may be provided in diameters $\varnothing_{wire}$ outside of the 0.003 to 0.050 inch range.

The wire 200 is preferably electrically isolated from the conductor 80 and may also be substantially coaxially mounted on the conductor 80. However, the wire 200 may be non-coaxially mounted to the conductor 80. The wire 200 may be maintained in fixed position relative to the conductor 80 due to encasement of the wire 200 within the matrix 78 (FIG. 30) material. The wire 200 may be electrically isolated from the conductor 80 by the matrix 78 (FIG. 30) which preferably has a relatively high thermally conductivity and a relatively low electrical conductivity.

The wire in FIG. 29 may be formed of magnetic material having a Curie temperature that may be selected to correspond to the desired heating of a structure 10 (FIG. 31) to which the heating blanket 54 (FIG. 28) may be applied. Non-limiting examples of magnetic material from which the wire 200 may be formed include nickel, iron cobalt, molybdenum, chromium and other materials or combinations thereof having a Curie temperature that is compatible with the heating requirements of the structure 10 (FIG. 31) or application to which the heating blanket 54 (FIG. 28) may be applied. In this regard, the wire 200 may be formed of any of the magnetic materials used in any of the embodiments described above or of any other magnetic materials having the desired Curie temperature. The wire 200 may be formed as single strand of wire, as braided wire (not shown), or in any other embodiment that may be spirally wound around the conductor 80.

Figure 30:
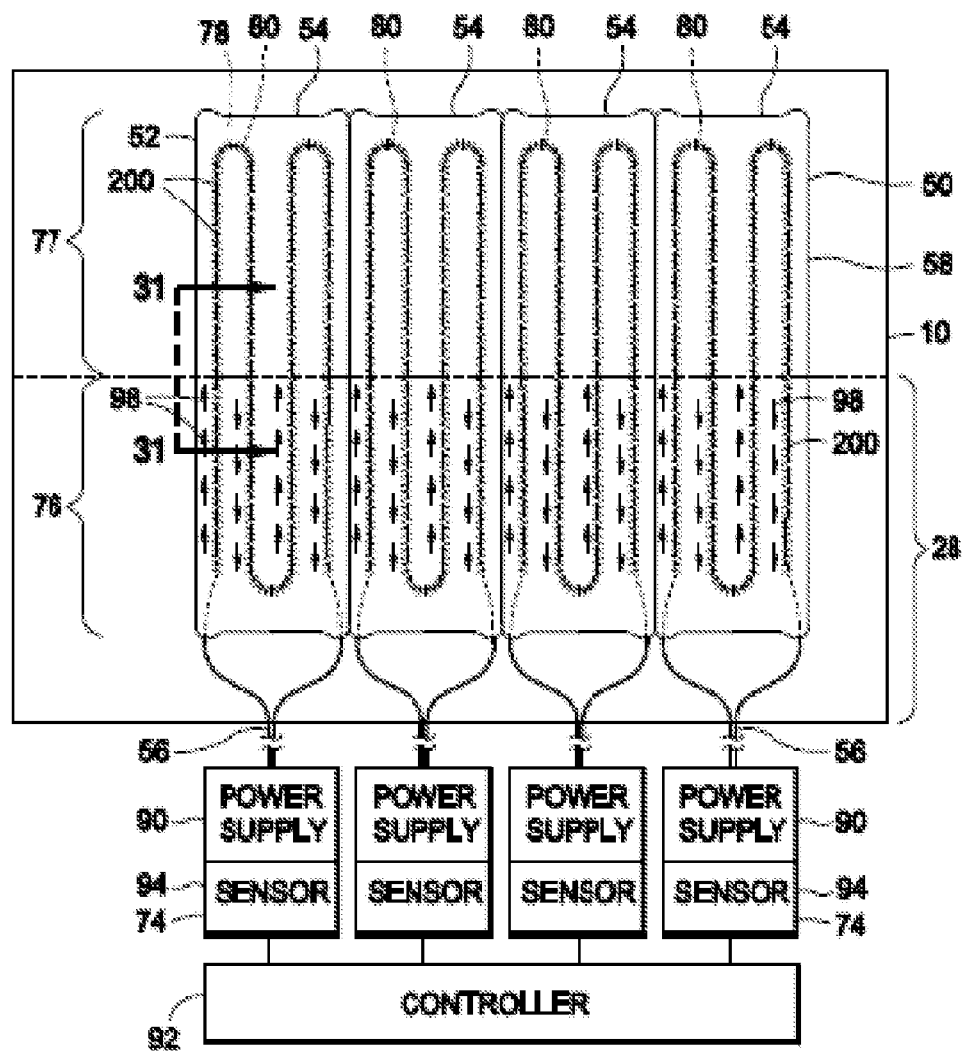
FIG. 30 is a top view schematic illustration of a plurality of the heating blankets of the embodiment shown in FIG. 28 and illustrating the heating blankets connected to power supplies, sensors, and a controller.

Referring to FIG. 30, shown is an embodiment of the heating system 50 comprising a plurality of heating blankets 54 arranged in side-by-side relation to one another to cover an area of the structure 10 to be heated. By providing a plurality of relative small heating blankets 54 each having a separate conductor 80 instead of a single large heating blanket 54 having a single relatively long conductor 80, the voltage in the single conductor 80 of each small blanket 54 may be minimized as described above. The conductor 80 for each heating blanket 54 may receive alternating current 106 (FIG. 31) from the power supply 90. The application of alternating current 106 to the conductor 80 may generate an alternating magnetic field 96 (FIG. 32) around the conductor 80. The wire 200 may be inductively heated in response to the magnetic field 96 generated by the conductor 80.

A single controller 92 may be provided to coordinate the operation of the side-by-side heating blankets 54 although each heating blanket 54 may have a dedicated controller 92. The controller 92 shown in FIG. 30 may be coupled to the power supply 90 for controlling the operation of each heating blanket 54. For example, as described above, the controller 92 may be configured to adjust at least one of an amplitude and a frequency of the alternating current 106 (FIG. 31) to alter a heating rate of one or more of the heating blankets 54.

Figure 31:
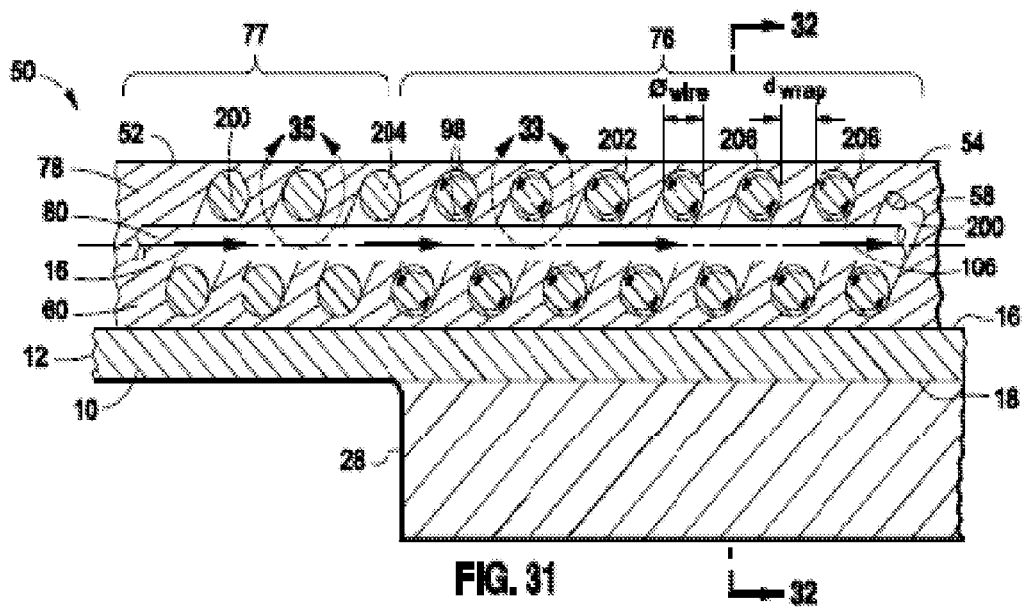
FIG. 31 is a sectional illustration of the heating blanket taken along line 31 of FIG. 30 and illustrating the mounting of the heating blanket on a structure having a heat sink under a portion of the structure.

Referring to FIG. 31, shown is a cross section of the heating blanket 54 mounted on a structure 10. The structure 10 has a heat sink 28 under a portion thereof which may draw a relatively larger amount of heat from the heating blanket 54 that the remaining portion of the structure 10. The heat sink 28 may comprise a thickened portion of the structure 10 or the heat sink 28 may comprise a separate component (not shown) or element (not shown) that may be mounted to the structure 10 or which is in contact with the structure 10 and which may have a larger thermal mass than a remaining portion of the structure 10. Electrical current 106 is shown passing through the conductor 80 in FIG. 31 along the noted direction. The current 106 may be an alternating current provided by the power supply (FIG. 30).

Figure 32:
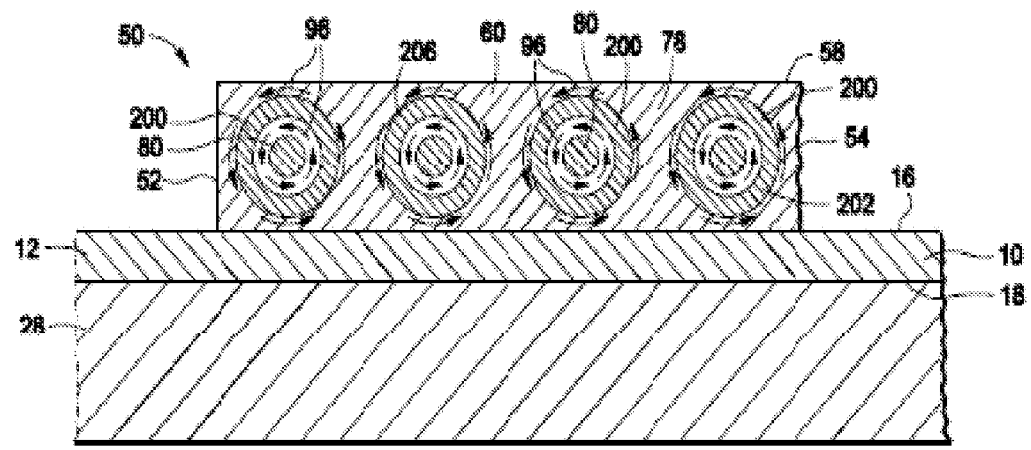
FIG. 32 is a sectional illustration of the heating blanket taken along line 32 of FIG. 31 and illustrating a magnetic field encircling the wire cross section.

FIG. 32 illustrates the orientation of the magnetic field 96 generated as a result of the current 106 (FIG. 31) flowing through the conductor 80. The magnetic field 96 encircles the conductor 80 and the wire 200 in a circumferential direction. More specifically, as shown in FIGS. 31-32, the magnetic field 96 is oriented perpendicularly to the direction of the electrical current 106 (FIG. 31) in the conductor 80. Regardless of the wire 200 embodiment (single strand, braided, etc.), the wire 200 is preferably mounted to the conductor 80 such that each wrap 206 (FIG. 31) of the spirally wound wire 200 is separated by a gap $d_{warp}$ (FIG. 31) of not less than approximately 20 percent of a diameter $\varnothing_{wire}$ (FIG. 31) of the wire 200. However, the wraps 206 (FIG. 31) may be spaced apart at a gap $d_{warp}$ of less than 20 percent of the wire diameter $\varnothing_{wire}$. Advantageously, the gaps $d_{warp}$ between the successive wraps 206 allow the magnetic field 96 to pass between each pair of wire wraps 206 which promotes the flow of eddy currents 98 (FIG. 31) within the wire 200.

Referring again to FIG. 31, shown is a magnetic portion 76 and a non-magnetic portion 77 of the heating blanket 54. The wire wraps 206 in the magnetic portion 76 continue to circulate eddy currents 98 in the wire 200. In contrast, the wire wraps 206 in the non-magnetic portion 77 have reached the Curie temperature such that the magnetic properties of the wire 200 disappear and the magnetic fields (FIG. 32) are no longer concentrated in the wire 200. In the non-magnetic portion 77, eddy currents 98 have ceased to circulate or are circulating with reduced magnitude relative to the eddy currents 98 in the wire wraps 206 within the magnetic portion 76. The wire wraps 206 in the non-magnetic portion 77 may have reduced or minimal magnetic properties such that resistive heating of the wire 200 may diminish to a level sufficient to maintain the wire 200 at the Curie temperature. Once the magnetic portion 76 reaches the Curie temperature, the magnetic material of the wire 200 may also become non-magnetic and the resistive heating may be reduced to a sufficiently low level to maintain the wire 200 at the Curie temperature and thereby maintain the structure 10 (FIG. 31) at the desired temperature.

Referring FIGS. 33 and 35, shown are sectional illustrations of the wire 200 and conductor 80 illustrating eddy currents 98 circulating in the wire 200. FIG. 34 is a legend illustrating current density levels in the wire 200 (FIG. 33, 35). As was earlier indicated, with the application of rela-
tively high-frequency alternating electrical current 106 (FIG. 31) to the conductor 80, the eddy currents 98 may circulate predominantly near the wire surface 202 as shown in FIG. 33. The relatively high concentration of the eddy currents 98 near the wire surface 202 results in increased heating of the wire 200 due to the relatively small cross sectional area near the wire surface 202 through which the eddy current 98 flow. In contrast, FIG. 35 illustrates eddy currents 98 of reduced magnitude circulating in the relatively larger cross-sectional area of the wire interior 204 as a result of a lower frequency alternating current applied to the conductor 80. The reduced eddy currents 98 in FIG. 35 result in reduced heating of the wire 200.

Figure 36:
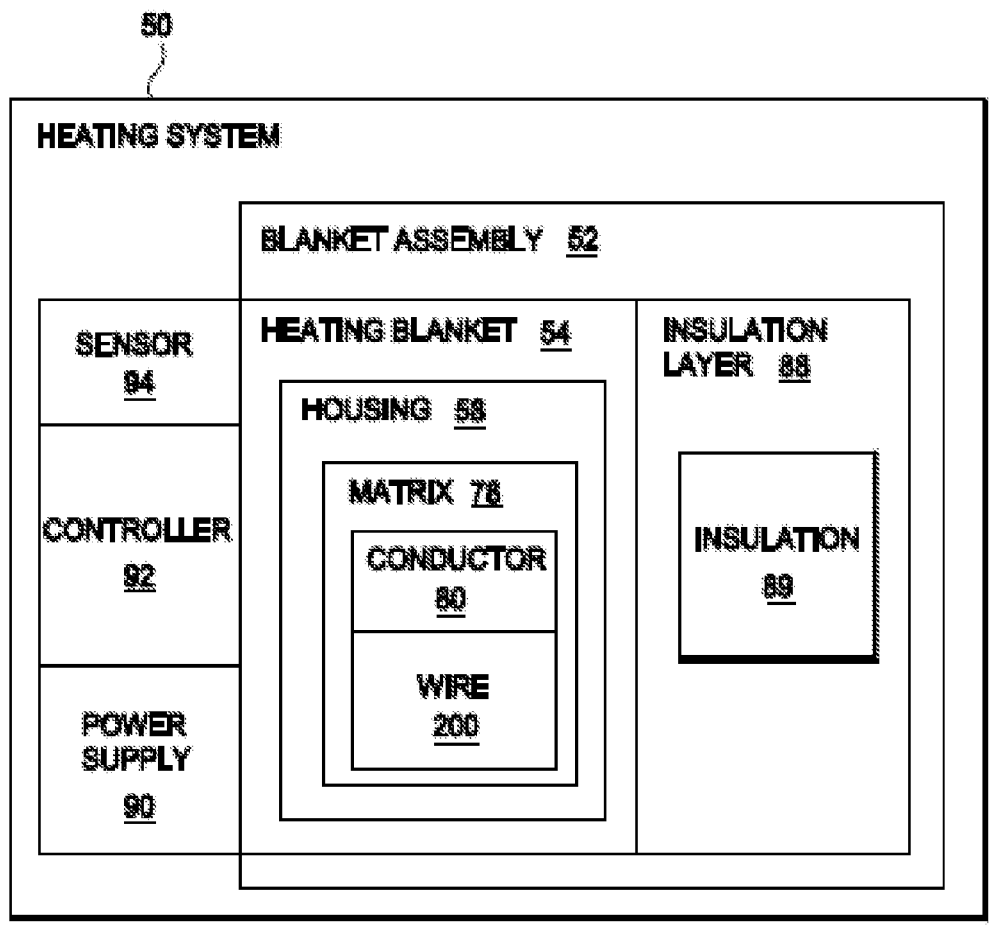
FIG. 36 is an illustration of a functional block diagram of a heating system comprising a heating assembly including a heating blanket having a wire spirally wound along the conductor.

Referring to FIG. 36, shown is a block diagram of the heating system 50 for the heating blanket 54 including the spirally wound wire 200. The heating system 50 may comprise a blanket assembly 52 which may be formed of one or more heating blankets 54. The heating system 50 may include one or more power supplies 90 for powering one or more heating blankets 54. One or more sensors 94 may be included for sensing temperatures of the heating blanket 54 and/or structure (not shown). The heating system 50 may include one or more controllers 92 for regulating operation one or more of the heating blankets 54. The heating blankets 54 may include the housing 58 containing the conductor 80 and the wire 200 spirally wound along a length of the conductor 80. The matrix 78 material may encapsulate the conductor 80 and wire 200 and may conduct thermal energy from the wire 200 to a structure (not shown). An insulation layer 88 may be included with one or more of the heating blankets 54 to improve heating efficiency.

Figure 37:
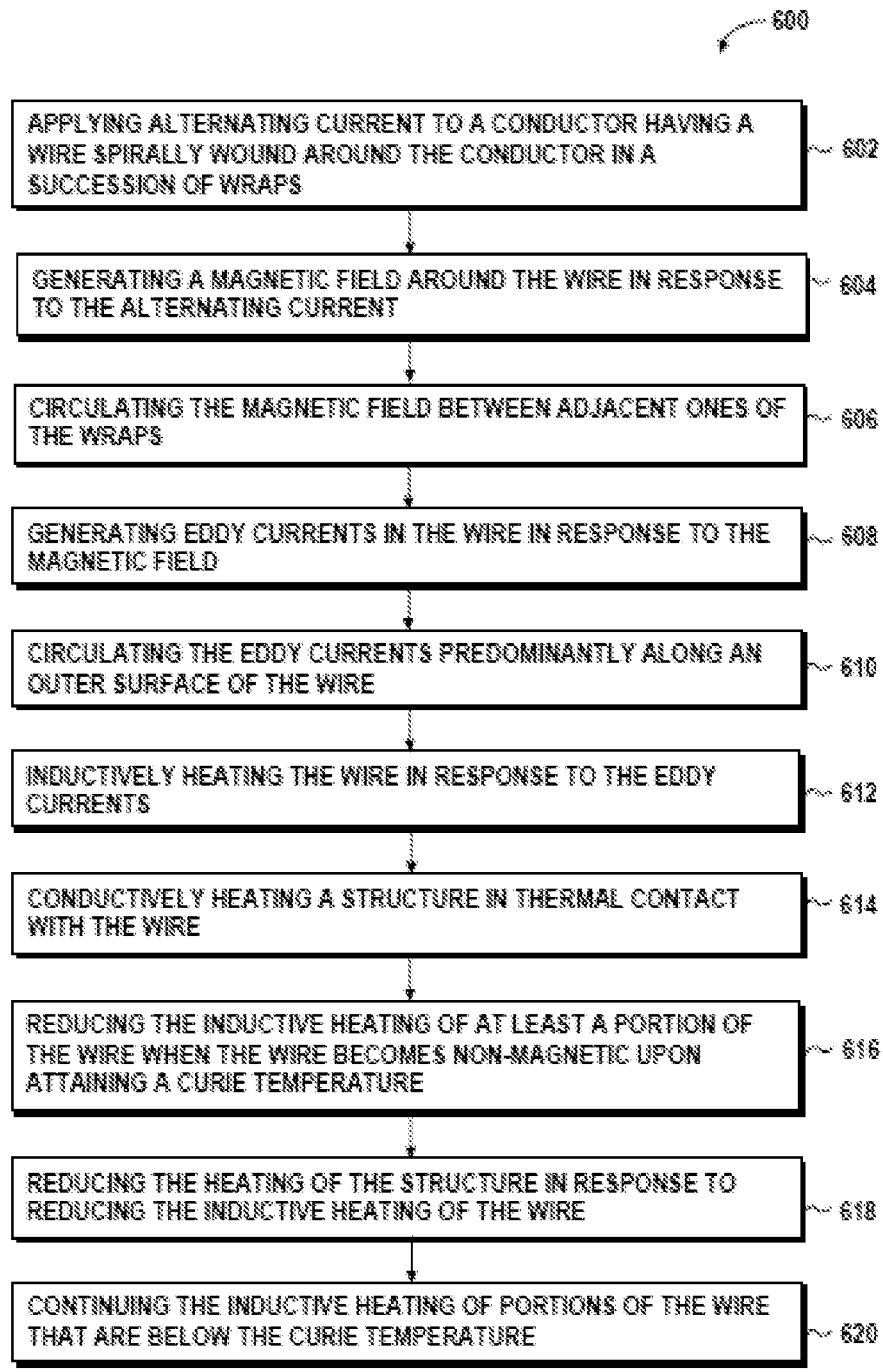
FIG. 37 is an illustration of a flow diagram of a methodology of heating a structure using a heating blanket having a wire spirally wound along the conductor.

Referring to FIG. 37, shown is a methodology 600 for heating a structure 10 (FIG. 31) using the heating blanket configuration illustrated in FIGS. 28-35. The methodology 600 illustrated in FIG. 37 may further include any of the above-described steps of heating a structure for any one of the heating blanket 54 embodiments illustrated in FIGS. 1-27.

Step 602 of the methodology 600 of FIG. 37 may comprise applying alternating current 106 (FIG. 31) to the conductor 80 (FIG. 31). The alternating current 106 (FIG. 31) may be provided with a relatively high frequency to improve the heating efficiency of the wire 200 (FIG. 29). The alternating current 106 may be provided at a frequency of between approximately 1 kHz and 300 kHz and, more preferably, at a frequency of between approximately 150 kHz and 250 kHz.

Step 604 of the methodology 600 of FIG. 37 may comprise generating a magnetic field 96 (FIG. 32) around the wire 200 (FIG. 29). The amplitude and/or frequency of the alternating current may be altered to alter the heating rate of the wire in the same manner as described above for the heating blanket embodiments illustrated in FIGS. 1-27. The magnetic field 96 may be generated as a result of the application of electrical or alternating current 106 (FIG. 31) to the conductor 80 (FIG. 31) in a manner as is also described above.

Step 606 of the methodology 600 of FIG. 37 may comprise circulating the magnetic field 96 (FIG. 32) between adjacent ones of the wraps 206 (FIG. 31). As indicated above, the wire 200 (FIG. 31) may be arranged such that adjacent ones of the wraps 206 are spaced apart from one another at a gap $d_{sgmt}$ (FIG. 31) of no less than approximately 20 percent of the diameter $\varnothing_{wire}$ (FIG. 31) of the wire 200. Such a spacing may allow the magnetic field 96 (FIG.

32) to pass between each pair of wire wraps 206 to promote the generation of eddy current 98 (FIG. 31) in the wire 200 (FIG. 31).

Step 608 of the methodology 600 of FIG. 37 may comprise generating eddy currents 98 (FIG. 31) in the spirally wound wire 200 (FIG. 31). The eddy currents 98 may be generated in response to the magnetic field 96 (FIG. 32) produced by the alternating current 106 (FIG. 31) passing through the conductor 80 (FIG. 31). Advantageously, by passing relatively high-frequency alternating electrical current 106 through the conductor 80, the eddy currents 98 circulating in the wire 200 may flow predominantly near a wire surface 202 (FIG. 33) rather than in the wire interior 204 (FIG. 35).

Step 610 of the methodology 600 of FIG. 37 may comprise inductively heating the wire 200 (FIG. 31) in response to the eddy currents 98 (FIG. 31). The wire 200 may be inductively heated due to resistive losses in the wire 200. The wire 200 may also be inductively heated due to hysteretic losses in the wire 200.

Step 612 of the methodology 600 of FIG. 37 may comprise circulating the eddy currents 98 (FIG. 31) predominantly along the wire surface 202 (FIG. 31) of the wire 200. Advantageously, the high concentration of the eddy currents 98 near the relatively small cross sectional area at the wire surfaces 202 (FIG. 32) results in increased heating of the wire 200 relative to the case where the eddy currents 98 are concentrated in the wire interior 204 (FIG. 35).

Step 614 of the methodology 600 of FIG. 37 may comprise conductively heating a structure 10 (FIG. 31) in thermal contact with the heating blanket 54 (FIG. 31). As indicated above, a structure 10 (FIG. 31) may be heated by conduction of heat from the matrix 78 (FIG. 31) to the lower surface 18 (FIG. 31) mounted to the structure 10. The matrix 78 may be conductively heated due to direct contact with the wire 200.

Step 616 of the methodology 600 of FIG. 37 may comprise reducing the inductive heating of at least a portion of the wire 200 (FIG. 31) when the wire 200 becomes non-magnetic. One or more portions of the wire 200 may become non-magnetic upon attaining a Curie temperature of the wire 200 material. Upon attaining the Curie temperature, the wire 200 loses magnetic properties which may result in a reduction or cessation in the flow of eddy currents 98 (FIG. 31) within the wire 200.

Step 618 of the methodology 600 of FIG. 37 may comprise reducing the heating of the structure 10 (FIG. 31) in response to reducing the inductive heating of at least a portion of the wire 200 (FIG. 31). The reduction in inductive heating of the wire 200 results in reduced thermal conduction of heat by the matrix 78 (FIG. 31) to the structure 10 at the structure-heating blanket 10, 54 interface (FIG. 31). For the wire 200 portions that have attained the Curie temperature, the inductive heating of such wire 200 portions may diminish to a level sufficient to maintain the temperature of the wire 200 at the Curie temperature.

Step 620 of the methodology 600 of FIG. 37 may comprise continuing the inductive heating of portions of the wire 200 (FIG. 31) that are below the Curie temperature. For example, FIG. 31 illustrates the eddy current 98 (FIG. 31) circulating in the portions of the wire 200 located directly above the heat sink 28 (FIG. 31) of the structure 10 (FIG. 31). The heat sink 28 may draw more heat from the heating blanket 54 than the portion of the structure 10 on the left-hand side of the heat sink 28 in FIG. 31 and therefore the heat sink 28 may require a longer period of time to reach the Curie temperature.

Figure 38:
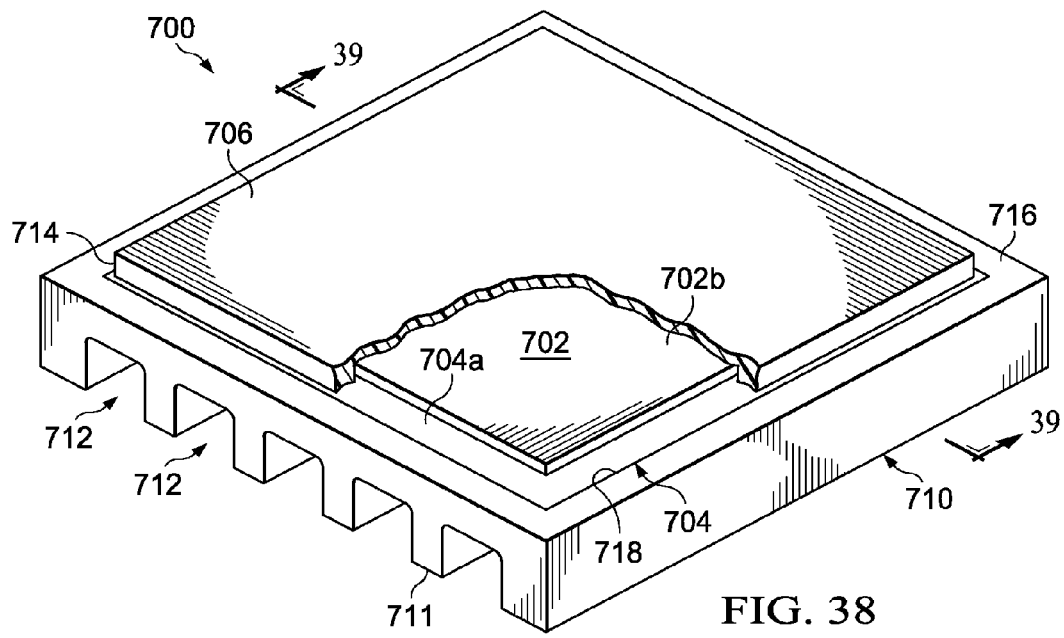
FIG. 38 is an illustration of stand-alone tooling for curing a composite part using inductive heating and smart susceptors, a vacuum bag assembly not shown for clarity and a portion of the heating blanket being broken away to reveal a part being cured.
Figure 39:
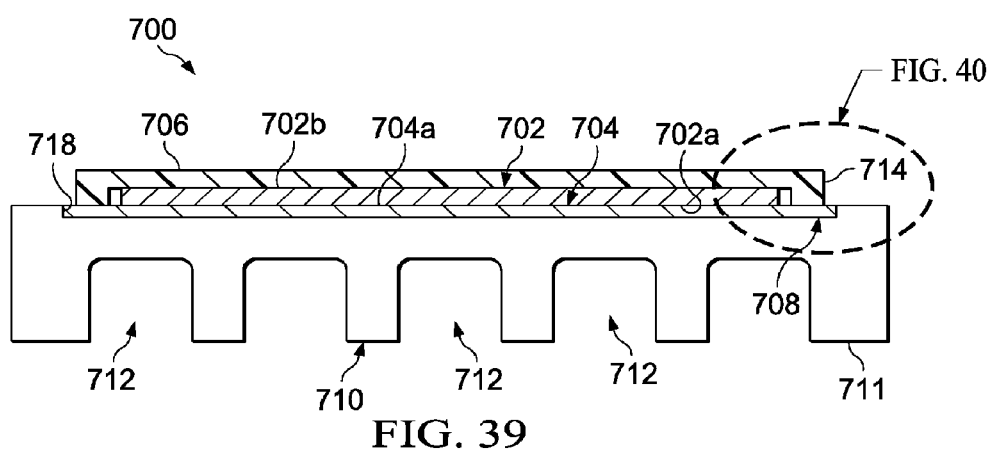
FIG. 39 is an illustration of a cross sectional view taken along the line 39-39 in FIG. 38.

The embodiments of heating blanket 50 (FIG. 4) described may be used in other applications, such as to cure a composite part without the need for an autoclave or oven. For example, referring now to FIGS. 38 and 39, simple, low cost tooling 700 may be used to cure a composite part 702 without the need for an oven, autoclave or similar large, heating enclosure. The tooling 700 broadly comprises a tool 704 supported on a tool base 710, and a heating blanket 706. In the illustrated example, the part 72 is substantially flat, however in other applications, it may have one or more curvatures or contours (not shown). The part 702 may comprise, for example and without limitation, laminated plies of fiber reinforced polymer resin, such as, without limitation, carbon fiber epoxy or other thermosets that must be heated to a preselected temperature in order to effect curing. Not shown in FIGS. 38 and 40 is a vacuum bag assembly, similar to vacuum bag assembly 100 discussed previously in connection with FIGS. 2 and 3., which is placed over the heating blanket 706 and sealed to the tool 704 or the tool base 710 in order to compact the part 702 against the tool 704 during the curing process.

The tool 704 includes an upper tool surface 704a having a shape that substantially matches one side 702a of the part 702 to be cured. The tool 704 is received within a recess 718 on one side 716 of the tool base 710. The tool 704 may be removable from the tool base 710, allowing tools 704 of differing shapes or configurations to be supported on a common tool base 710. The bottom side 711 of the tool base 710 is hollowed out at 712 to facilitate dissipation of heat generated by the tool 704. The heating blanket 706 overlies and thermally contacts a second side 702b of the part 702. The periphery 714 of the blanket 706 extends outwardly beyond the edges of the part 72 and overlies the tool surface 704a.

Figure 40:
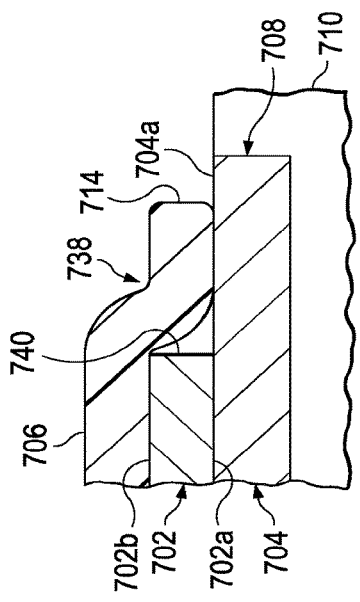
FIG. 40 is an illustration of the area designated as FIG. 40 in FIG. 39.

Referring to FIG. 40, the heating blanket 706 is flexible and conformable to the part 702. Due to the flexible, conformable nature of the heating blanket 706, its outer periphery 714 drapes down over the outer edges 740 of the part 702 and effectively seals against the tool surface 704 substantially completely around the part 702 so as to thermally enclose 738 the part 702. As will be discussed below in more detail, the tool 704 and the heating blanket 706 are each inductively heated in order to heat the part 702 from opposite sides 702a, 702b of the part 702.

Figure 41:
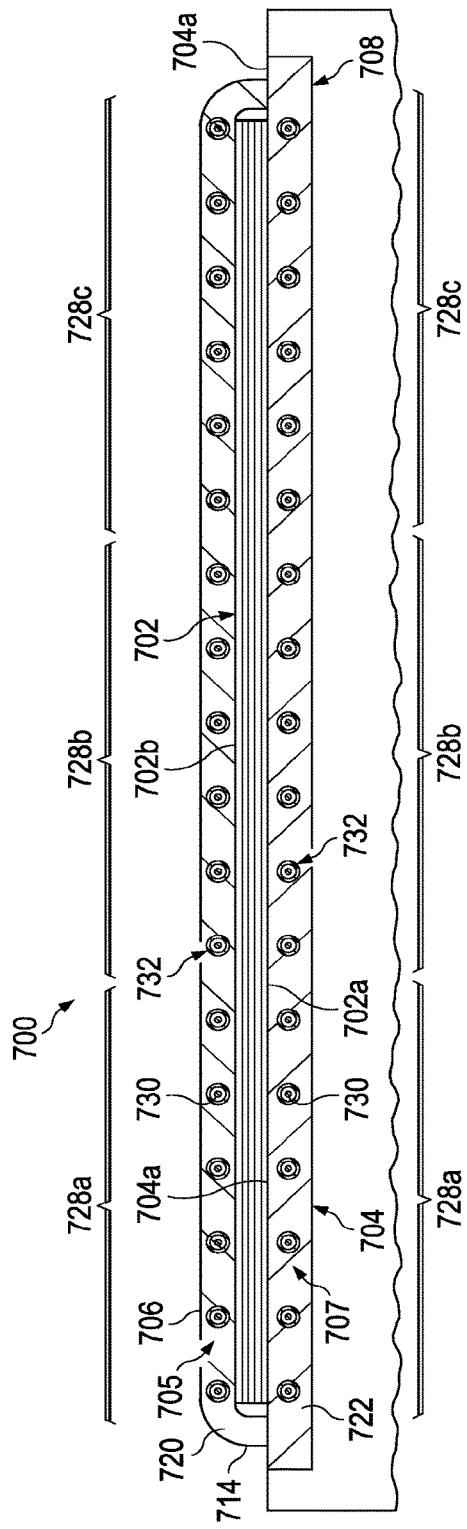
FIG. 41 is an illustration similar to FIG. 39 but showing additional details of the tool and the heating blanket.

Attention is now directed to FIG. 41 which illustrates additional details of the tool 704 and the heating blanket 706. The heating blanket 706 may generally be similar to the heating blanket 50 previously described in connection with FIGS. 4-6a, 8-8f, 15-25 and 28-35. The heating blanket 706 is inductively heated to a desired temperature by an induction heating circuit 705 contained within the blanket 706. The heating circuit comprises a plurality of inductive coil circuits 728a-728c covering separate sections (not shown) of the blanket 706 and arranged in serpentine or other patterns similar to those previously described. Each of the inductive coil circuits 728a-728c comprises a inductive coil 730 surrounded by a susceptor 732. Other embodiments of the susceptors 732 are possible, as previously described. The inductive coil circuits 728a-728c are embedded within a matrix 720 which may comprise, for example and without limitation, a castable elastomeric material which provides the blanket 706 with flexibility, and the ability to readily conform to the upper surface 702b of the part 702 and drape over the edges 740 so that the periphery 714 of the blanket 706 lies against the upper tool surface 704a.

The tool 704 may comprise a rigid layer of a suitable resin such as epoxy or BMI that encases an induction heating circuit 707, however, other resins may be employed to fabricate the tool 704, including but not limited to BXA and polybenzoxazine. The induction heating circuit 707 comprises plurality of the inductive coil circuits 728a-728c. The rigid layer of resin forms the upper surface 704a of the tool 704 which, as previously described, may be configured to match that of the part 702 to be cured. From the forgoing, it may be appreciated that one side 702b of the part 702 is heated by contact with the heating blanket 706 while the other side 702a of the part 702 is heated by contact with the tool 704.

Figure 42:
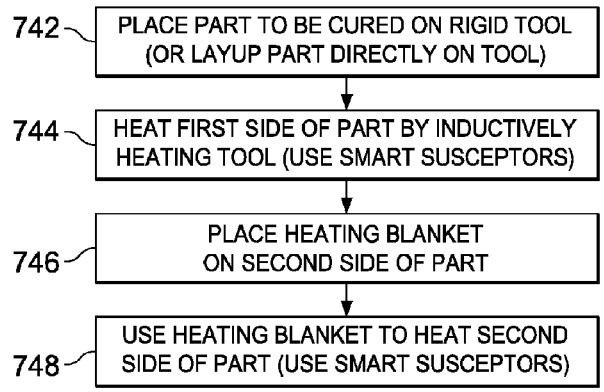
FIG. 42 is an illustration of a flow diagram of a method of curing a composite part out-of-autoclave using the tooling shown in FIGS. 38-41.

Attention is now directed to FIG. 42 which illustrates the overall steps of a method of curing a composite part 702 using the tooling 700 described above. Beginning at 742, a part 702 to be cured is placed on the surface 704a of a rigid tool 704. If desired, the part 702 may be laid up on the tool surface 704a using automated or hand layup techniques. At step 744, a first side 702a of the part 702 is heated by heating the tool 704 using induction coils 730 and smart susceptors 732. At 746, a heating blanket 706 is placed on the second side 702b of the part 702 following which, at 748, the heating blanket 706 is used to heat the second side 702b of the part 702 using inductive heating coils and smart susceptors to heat the matrix 720 which in turn thermally conducts heat to the second side 702b of the part 702.

Figure 43:
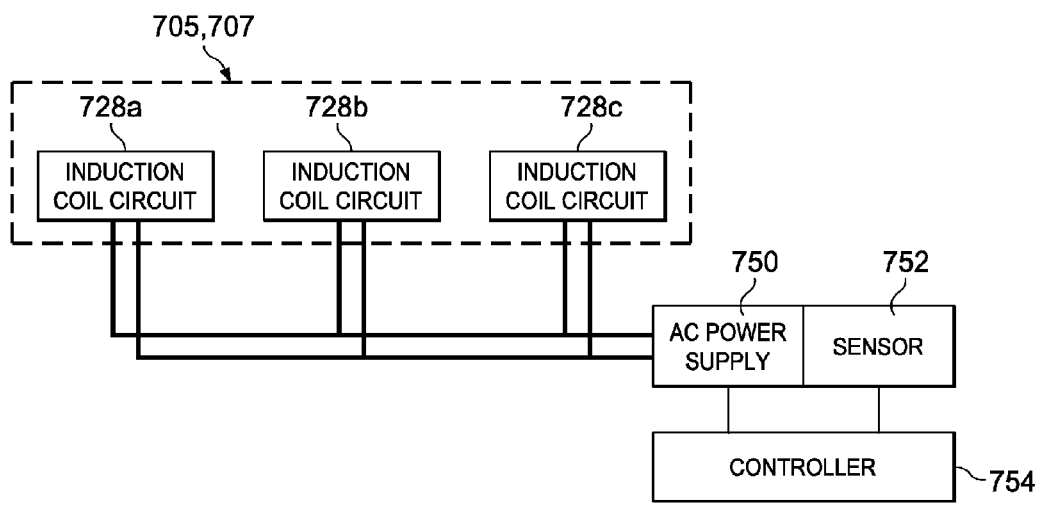
FIG. 43 is an illustration of a block diagram of the induction heating circuit forming part of the heating blanket.

The disclosed cure tooling 700 may be used to cure relatively large parts such as, for example and without limitation, wing skins (not shown) used in aircraft. Large parts may be cured with the tooling 700 by separating the each of the induction heating circuits 705, 707 into multiple induction coil circuits 728a-728c that are distributed over the area of the tool 704 and the heating blanket 706, as previously described. FIG. 43 illustrates one arrangement for powering and controlling either of the induction heating circuits 705, 707. Each of the inductive heating coils 730 along with its associated susceptor 732 forms a corresponding inductive coil circuit 728a-728c. The inductive coil circuits 728-728c of the tool 704 and/or the heating blanket 706, are coupled in parallel with each other, and in series with an AC power supply 750 that supplies alternating current to each of the circuits 728-728c. While three of the inductive coil circuits 728a-728c have been shown coupled in parallel with each other, other embodiments may utilize more than three or as few as two of the circuits 728a-728c to inductively heat the tool 704 and/or the blanket 706.

The AC power supply 750 may be configured as a portable or a fixed power supply 750, and functions to supply alternating current at a frequency and voltage that is suitable for the application. For example and without limitation, the frequency of the supplied AC current may range from approximately 1 kHz to 300 kHz, but is preferably more than about 20 kHz in order to minimize unwanted inductive heating of material such as graphite composites in the part 702. The tool 704 and/or the heating blanket 706 may incorporate one or more sensors 752 which may comprise thermal sensors such as thermocouples for monitoring the heat at various locations across either the tool 704 or the heating blanket 706. Alternatively, the sensor 752 may comprise a thermal sensor or other device coupled with the power supply 750 to indicate the voltage being applied to the inductive coil circuits 728a-728c. A controller 754, which may comprise a programmed computer or a PLC (programmable logic controller), is coupled with the power supply and the sensor 752, and is operative to adjust the applied alternating current over a predetermined range in order to adapt the tool 704 and the heating blanket 706 to a wide range of parts and structures having different heating requirements. The controller 754 may further function to rebalance the alternating current applied to the inductive heating coil circuits 728a-728c as one or more of these circuits reaches its Curie temperature and ceases drawing current.

Where the sensor 52 comprises a thermal sensor, such as thermocouples, data from the thermocouples may be provided to the controller 754 in order to monitor the power supply 750 and/or regulate the magnitude or frequency of the supplied alternating current. As will be discussed later in more detail, the alternating current applied to each of the inductive coil circuits 728a-728c is intrinsically regulated such that more energy is applied to the circuit 728a-728c whose susceptors 732 are below their Curie points and less power is applied to the circuits 728a-728c whose susceptors 732 are above the Curie point. Power is shunted to the circuits 728a-728c where the smart susceptor 732 is still magnetic and has not reached its Curie point. Essentially induction coil circuits 728a-728c are self-balancing to provide a more uniform temperature distribution over the part 702 to be cured.

Figure 44:
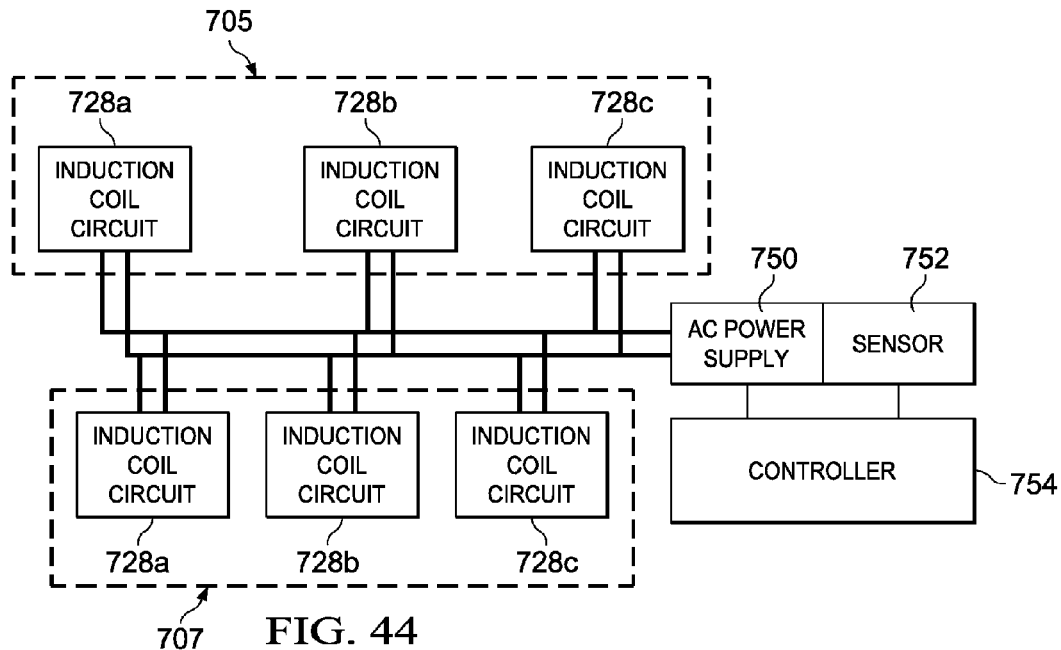
FIG. 44 is an illustration of a block diagram showing the heating circuits of the heating blanket and the tool driven by a common power supply forming an alternative embodiment.

FIG. 44 illustrates an alternate arrangement for driving the induction heating circuits 705, 707 forming part of the tool 704 and the blanket 706, respectively. In this example, the inductive coil circuits 728a-728c of both heating circuits 705, 707 are coupled in series with a common AC power supply 750 and a controller 754.

Figure 45:
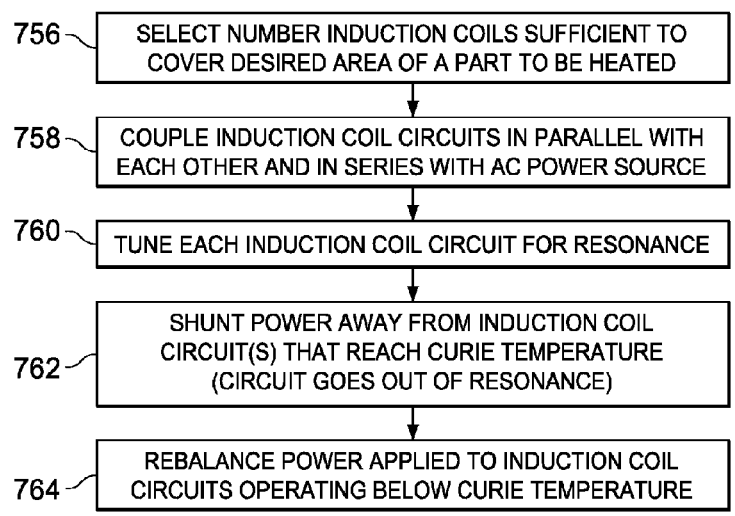
FIG. 45 is an illustration of a flow diagram of a method of induction heating using a multiple induction coil circuits.

FIG. 45 illustrates the steps of a method of induction heating using multiple inductive coils 730 in combination with smart susceptors 732. Beginning at step 756, a number of inductive heating coils 730 is selected that is sufficient to collectively cover a desired area of a part 702 to be heated. At step 758 the inductive coils 730 are placed in circuits 728a-728c that are coupled in parallel with each other and in series with an AC power supply 750 that delivers an alternating current to each of the inductive coil circuits 728a-728c. At step 760, each of the inductive coil circuits 728a-728c is tuned and driven at a resonant frequency corresponding to the frequency of the alternating current. At step 762, when the susceptor 732 in an inductive coil circuit 728a-728c reaches its Curie temperature, that inductive coil circuit 728a-728c goes out of tune (i.e., out of resonance) and power is shunted away from that particular circuit to the remaining circuits 728a-728c that have not yet reached their Curie temperatures. At step 764, the power being supplied to the tool 704 and the heating blanket 706 by the AC power supply 750 is rebalanced to supply substantially equal amounts of power to those induction coil circuits 728a-728c that are operating below their Curie temperatures.

Figure 46:
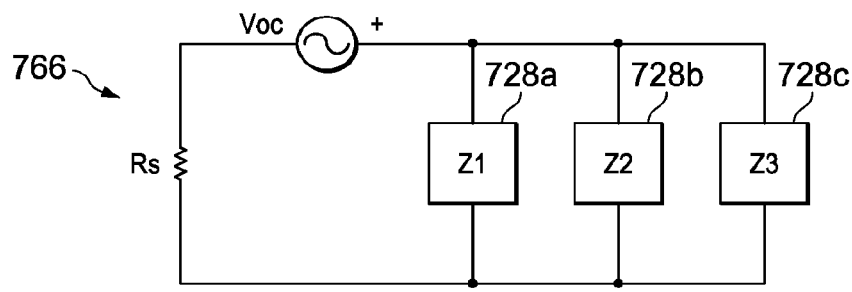
FIG. 46 is an illustration of an equivalent circuit diagram of an induction heating device employing multiple induction coil circuits.

FIG. 46 is an equivalent circuit corresponding to the series-parallel circuit arrangements in FIGS. 43 and 44 in which the inductive coil circuits 728a-728c may be represented as corresponding impedance Z1, Z2 and Z3, which are coupled in parallel with each other, and in series with an AC voltage source Voc. From FIG. 46, it may be appreciated that since the induction heating circuits are each divided into separate inductive coil circuits 728a-728c that are coupled in parallel represented by impedances Z1, Z2, Z3, the voltage required to drive the induction heating circuit 705, 707 is reduced by number of the separate coils 730. The series circuit shown at 766 includes an inherent resistance Rs, and each of the impedances Z1-Z3 includes a resistance, and a reactance which inductive and capacitive components, as will be discussed below.

When the susceptor 732 in one of the inductive coil circuits 728a-728c, for example induction coil circuit 728b represented by impedance Z2, approaches its Curie point, then the permeability of the associated susceptor 732 diminishes substantially, causing a corresponding drop in resistive and inductive reactance components of the impedance Z2. Essentially, the coil 730 in circuit 728b becomes predominately non-magnetic and draws much less power than the coils 730 in the other circuits 728a-728c because the coil 730 does not completely couple into the associated susceptor 732, and the power delivered to the circuit 728b drops off. Provided that the decrease in resistance is approximately 90% or more, and the inductance decreases by about 50%, the induction coil circuit 728b will draw very little power while the other two circuits 728a, 728c will draw about half of the input power. To maintain a good match, the input circuit 766 may be retuned accordingly.

Figure 47:
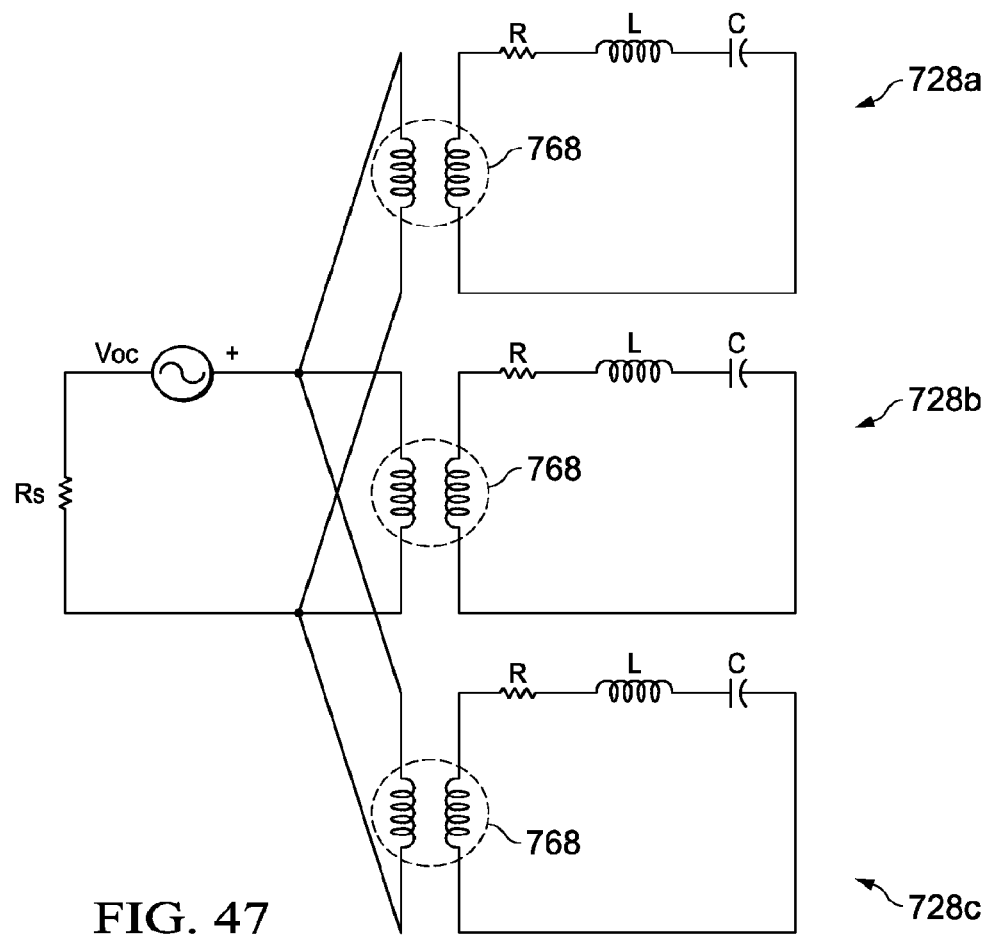
FIG. 47 is an illustration of a detailed schematic diagram of an induction heating device.

FIG. 47 illustrates additional details of each of the inductive coil circuits 728a-728c respectively represented by the impedances Z1, Z2, Z3 in FIG. 46. Each of the circuits 728a-728c comprises an RLC circuit. R in each of the circuits 728a-728c represents the resistance of the inductive coil 730 in addition to coupled resistance with its associated susceptor 732. The inductance L of the circuit 728a-728c is governed by the configuration of the coil 730, including its layout geometry, the number of turns of the coil 730 and the magnetic properties of the associated susceptor 732. A majority of the resistance R may be that of the susceptor 732 in the circuit 728a-728c. The capacitance C of the circuit 728a-728c is that of a tuning capacitor C that tunes the circuit 728a-728c to resonate at the frequency of the applied alternating current. The particular value of the tuning capacitor C is selected such that it results in a capacitive reactance that substantially equals and cancels the inductive reactance of the circuit 728a-728c. This tuning minimizes the associated impedance Z1-Z3 of the circuit 728a-728c and results in maximum current flow through the circuit. The tuning capacitor C may be a discrete capacitor device or may be a distributed capacitance that is inherent in the overall design of the induction coil heating circuit 728a-728c.

The voltage that is required to drive each of the circuits 728a-728c is dependent on the impedances Z1, Z2, Z3 of the circuits and amount of current that is needed to drive the associated coils 730 (L), calculated according to Ohms Law. Thus, the power supply voltage output Voc of the power supply 750 (FIGS. 43-44) should be selected to supply the needed drive voltage. In some embodiments, where the power supply voltage output Voc does not match the voltage needed to drive the circuits 728a-728c at the desired levels of current, transformers 768 may be used to respectively transform the output voltage Voc to the needed voltage level.

As previously mentioned, the inductive coil circuits 728a-728c are self-balancing. The input impedance Z of a coil 730 exciting a smart susceptor 732 has a relatively large reactance which must be matched with the narrow band, tuned AC power supply Voc. As a susceptor 732 heats up, both inductance L and resistance R of the circuit 728a-728c change appreciably, requiring real time adjustment of the AC power supply voltage Voc. In the vicinity of the Curie temperature, both the inductance L and the resistance R drop dramatically. If two or more inductive coil circuits of the circuit 728a-728c are appropriately coupled in parallel with each other and in series with the AC power supply Voc as previously described, it is possible to exploit this sharp impedance reduction to shunt power from the Curie state susceptor 732 which is already sufficiently heated. The tuning capacitor C tunes the coil 730 to match the power supply input resistance, and cancels the inductive reactance, while the transformer 768 may be used to scale the remaining resistance to match the power supply input.

When a smart susceptor 732 in one of the induction heating coil circuits of the circuit 728a-728c reaches its Curie temperature and becomes non-magnetic, then the associated induction coil circuit of the circuit 728a-728c goes out of tune with the resonant drive frequency due to the change of inductance and essentially blocks current from flowing through the unloaded (non-magnetic coil) circuit of the circuit 728a-728c. It should be noted here that although the resistance drops substantially which would ordinarily result in higher current flow through a circuit that has reached its Curie temperature, the fact that value of the capacitor C does not appreciably change results in detuning of the circuit of the circuit 728a-728c which substantially prevents current flow to the circuit of the circuit 728a-728c.

Figure 48:
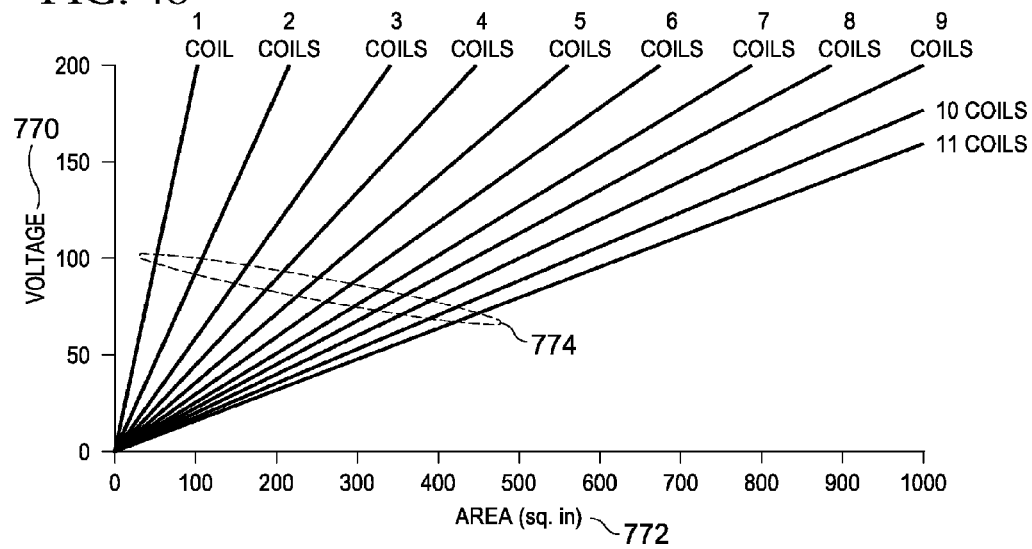
FIG. 48 is an illustration of a graph showing the number of coils required to cover various surface areas of a part when driven at pre-selected voltages.

FIG. 48 is a graph showing the relationship between the applied voltage 770 and the area being heated 772 when multiple inductive coil circuits 728a-728c are placed in parallel with each other and in series with the applied voltage 770. The example shown in the graph of FIG. 48 is for a drive frequency of 250 kHz. As can be seen from the plots 774, at a given level of applied voltage 770, larger areas 772 of a part 702 may be heated by using heating circuit that is divided into a larger number of inductive heating coil circuits of the circuit 728a-728c coupled in parallel with each other, and in series with the applied voltage 770.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A method of out-of-autoclave curing a composite part, comprising:
   placing the composite part to be cured on a tool comprising a substantially rigid base;
   heating a first side of the composite part via:
      coupling a plurality of inductive coil circuits in parallel with each other, such that each circuit in the plurality of inductive coil circuits comprises, respectively, an inductive coil and a susceptor comprising a Curie temperature;
      driving each of the plurality of inductive coil circuits with an alternating electrical current; and
      shunting power away from a circuit in the plurality of inductive coil circuits when the susceptor in the circuit reaches the Curie temperature;
   placing a heating blanket on a second side of the composite part; and
   using the heating blanket to heat the composite part from the second side thereof.

2. The method of claim 1, wherein inductively heating the tool includes:
   flowing electrical current through at least one conductor passing through the tool;
   using electrical current flow to heat the susceptor within the tool; and
   conducting heat from the susceptor through a matrix in the heating blanket to a surface of the tool in contact with the first side of the composite part.

3. An out-of-autoclave method of curing of a part of a composite aircraft, comprising:
   fabricating a tool by encasing a plurality of first induction heating coil circuits in a layer of polymer resin, including coupling the first induction heating coil circuits in parallel with each other, each of the first induction heating coil circuits including an induction coil and a susceptor having a first Curie temperature;

supporting the tool on a tool base;

hollowing out one side of the tool base to dissipate heat used to cure the part;

placing the part to be cured on the tool with a first side of the part in contact with the layer of polymer resin;

heating the first side of the part using the tool, including using the plurality of first induction heating coil circuits to heat the layer of polymer resin and shunting power away from at least one of the first induction heating coil circuits to the other of the first induction heating coil circuits when the susceptor in the one of the first induction heating coil circuits reaches the first Curie temperature;

fabricating a heating blanket by embedding a plurality of second induction heating coil circuits in an elastomeric matrix, each of the second induction heating coil circuits including a second induction coil and a second susceptor comprising a second Curie temperature;

placing the heating blanket on the tool and in contact with a second side of the part, including conforming the heating blanket to the second side of the part;

coupling an AC power supply in series with the plurality of first induction heating coil circuits and in series with the plurality of second induction heating coil circuits; and using the heating blanket to heat the second side of the part including using the plurality of second induction heating coil circuits to heat the elastomeric matrix, and shunting power away from at least one of the second induction heating coil circuits to the other of the second induction coil heating circuits when the susceptor in the one of the second induction heating coil circuits reaches the second Curie temperature.

4. The method of claim 1 further comprising:
prior to placing, fabricating the tool by encasing a plurality of first induction heating coil circuits in a layer of polymer resin.

5. The method of claim 4, wherein fabricating further comprises:
coupling the first induction heating coil circuits in parallel with each other.

6. The method of claim 5, further comprising:
hollowing out one side of the tool to form a hollow; and using the hollow to dissipate heat while using the heating blanket to heat the composite part.

7. The method of claim 6, wherein placing the composite part further comprises:
placing the composite part with a first side of the composite part in contact with the layer of polymer resin.

8. The method of claim 7 further comprising:
driving each of the first induction heating coil circuits with an alternating electrical current; and
shunting power away from one of the first induction heating coil circuits when the susceptor reaches its Curie temperature.

9. The method of claim 8 further comprising;
prior to placing the heating blanket, fabricating the heating blanket by embedding a plurality of second induction heating coil circuits in a thermally conductive elastomeric matrix.

10. The method of claim 9, further comprising:
conforming the heating blanket to the second side of the composite part.

11. The method of claim 10 further comprising:
coupling an AC power supply in series with the plurality of first induction heating coil circuits and in series with the plurality of second induction heating coil circuits.

12. The method of claim 11, wherein using the heating blanket to heat the composite part comprises:
using the plurality of second induction heating coil circuits to heat the thermally conductive elastomeric matrix.

13. The method of claim 12 further comprising:
shunting power away from at least one of the second induction heating coil circuits to another of the second induction coil heating circuits when a second susceptor reaches its Curie temperature.

14. The method of claim 3, wherein the layer of polymer resin comprises a rigid layer of polymer resin.

15. The method of claim 14, wherein the heating blanket comprises a flexible heating blanket.

16. The method of claim 15, wherein the elastomeric matrix comprises a thermally conductive elastomeric matrix.

17. The method of claim 15, wherein fabricating the heating blanket comprises forming a susceptor sleeve extending over a conductor for inductive heating of the susceptor sleeve.

18. The method of claim 1, further comprising a heat sink adjacent to the susceptor.

19. The method of claim 4, further comprising the layer of polymer resin comprising a rigid layer of polymer resin.

20. The method of claim 3, further comprising the tool base comprising a rigid form.

* * * * *